(12) United States Patent
Ando et al.

(10) Patent No.: US 8,395,634 B2
(45) Date of Patent: Mar. 12, 2013

(54) METHOD AND APPARATUS FOR PROCESSING INFORMATION

(75) Inventors: Katsutoshi Ando, Kanagawa (JP); Takahiro Fukuhara, Kanagawa (JP)

(73) Assignee: Sony Corporation, Tokyo (JP)

( * ) Notice: Subject to any disclaimer, the term of this patent is extended or adjusted under 35 U.S.C. 154(b) by 1103 days.

(21) Appl. No.: 12/111,421

(22) Filed: Apr. 29, 2008

(65) Prior Publication Data

US 2008/0284788 A1 Nov. 20, 2008

(30) Foreign Application Priority Data

May 17, 2007 (JP) ................................ 2007-131283

(51) Int. Cl.
*G06T 9/00* (2006.01)
*G09G 5/36* (2006.01)
*G06K 9/36* (2006.01)
*H04N 7/12* (2006.01)
*H04B 1/66* (2006.01)

(52) U.S. Cl. ..... 345/555; 345/545; 345/557; 348/390.1; 348/398.1; 382/232; 382/234; 375/240

(58) Field of Classification Search .......................... None
See application file for complete search history.

(56) References Cited

U.S. PATENT DOCUMENTS

| 6,009,205 | A | * | 12/1999 | Yoshida | 382/246 |
| 6,100,931 | A | | 8/2000 | Mihara | |
| 6,560,369 | B1 | * | 5/2003 | Sato | 382/239 |
| 2006/0072841 | A1 | * | 4/2006 | Terao | 382/240 |
| 2007/0165959 | A1 | * | 7/2007 | Takada | 382/240 |
| 2007/0269122 | A1 | | 11/2007 | Fukuhara et al. | |
| 2007/0286510 | A1 | | 12/2007 | Fukuhara | |
| 2008/0013845 | A1 | | 1/2008 | Fukuhara et al. | |
| 2008/0013846 | A1 | | 1/2008 | Fukuhara et al. | |

FOREIGN PATENT DOCUMENTS

| JP | 9-84004 | 3/1997 |
| JP | 9-182072 | 7/1997 |
| JP | 2000-184204 | 6/2000 |
| WO | WO 2005/081539 A1 | 9/2005 |

OTHER PUBLICATIONS

U.S. Appl. No. 11/814,257, filed Jul. 18, 2007, Takahiro Fukuhara, et al.
Wim Sweldens, "The Lifting Scheme: A Custom-Design Construction of Biorthogonal Wavelets", Applied and Computational Harmonic Analysis, vol. 3, No. 2, 1996, pp. 186-200.
Christos Chrysafis, et al., "Line-Based, Reduced Memory, Wavelet Image Compression", IEEE Transactions on Image Processing, vol. 9, No. 3, Mar. 2000, pp. 378-389.

* cited by examiner

Primary Examiner — Tize Ma
(74) Attorney, Agent, or Firm — Oblon, Spivak, McClelland, Maier & Neustadt, L.L.P.

(57) ABSTRACT

An information processing apparatus for encoding image data, includes a filter unit for performing a filtering operation on the image data in a layer fashion to generate a plurality of subbands including coefficient data segmented on a per frequency band basis, an intermediate data storage unit for storing intermediate data generated in the middle of the filtering operation of the filter unit, a coefficient storage unit for storing the coefficient data generated in the filtering operation of the filter unit, and a coefficient rearranging unit for performing a rearranging operation to rearrange the coefficient data stored on the coefficient storage unit so that the coefficient data is output in a predetermined order. The intermediate data storage unit writes and reads data thereon at a speed higher than the coefficient storage unit and being smaller in storage capacity than the coefficient storage unit.

11 Claims, 41 Drawing Sheets

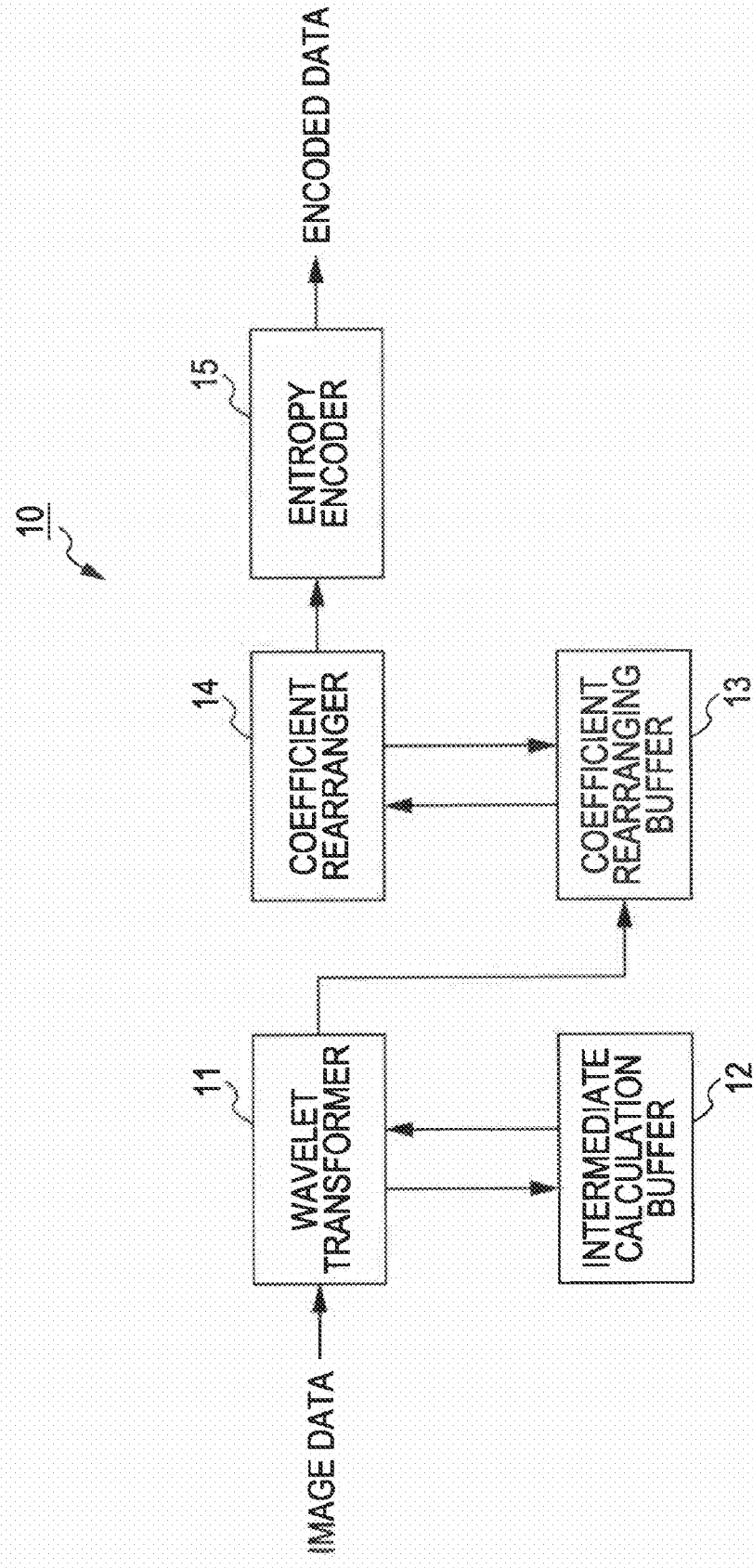

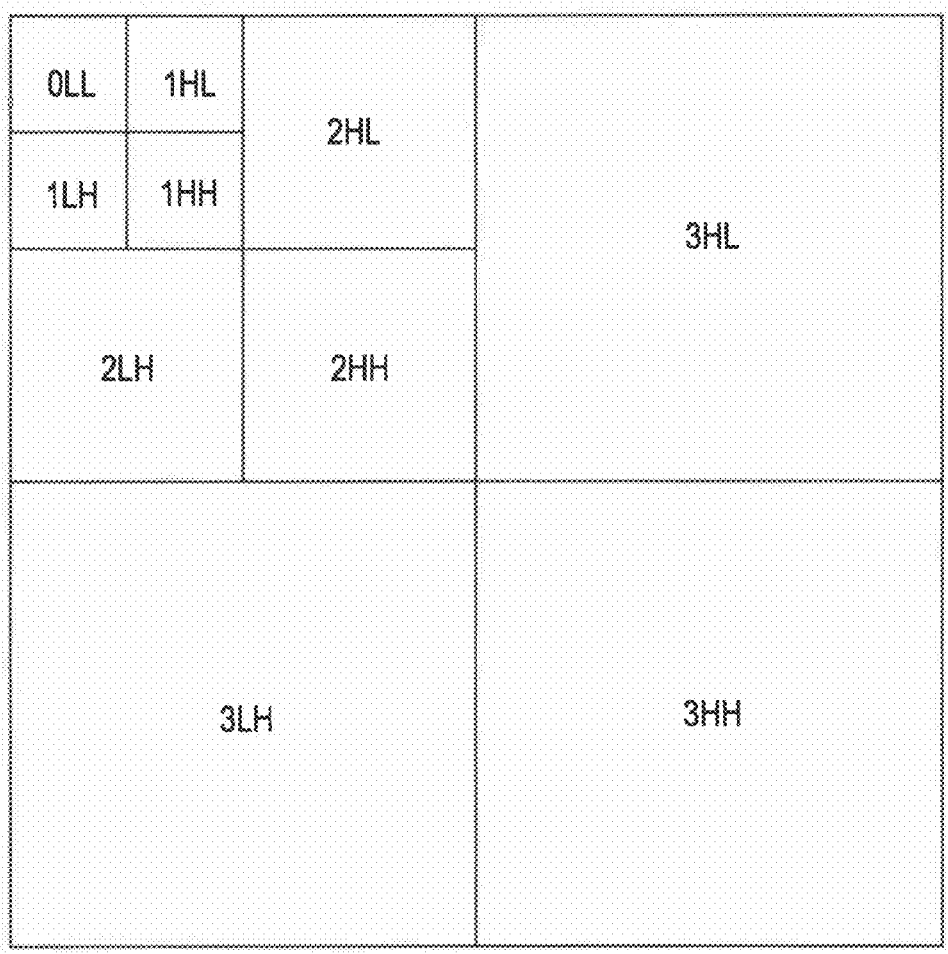

SEGMENTATION LEVEL = 1

SEGMENTATION LEVEL = 3

INPUT IMAGE

WAVELET TRANSFORM RESULTS (ANALYSIS)

OUTPUT IMAGE

| SEGMENTATION LEVEL | 5×3 FILTER | 9×7 FILTER |
|---|---|---|
| 1 | 4 | 6 |
| 2 | 6 | 9 |
| 3 | 7 | 10.5 |
| 4 | 7.5 | 11.25 |
| 5 | 7.55 | 11.325 |

| SEGMENTATION LEVEL | 5×3 FILTER | 9×7 FILTER |
|---|---|---|
| 1 | 2 | 2 |
| 2 | 7 | 13 |
| 3 | 18.5 | 39.5 |
| 4 | 42.25 | 94.75 |
| 5 | 90.125 | 206.375 |

METHOD AND APPARATUS FOR PROCESSING INFORMATION

CROSS REFERENCES TO RELATED APPLICATIONS

The present invention contains subject matter related to Japanese Patent Application JP 2007-131283 filed in the Japanese Patent Office on May 17, 2007, the entire contents of which are incorporated herein by reference.

BACKGROUND OF THE INVENTION

1. Field of the Invention

The present invention relates to an information processing apparatus and an information processing method and, in particular, to an information processing apparatus and an information processing method for incorporating a software encoder and a software decoder in a computer.

2. Description of the Related Art

Japanese Unexamined Patent Application Publication No. 9-261633 discloses an encoder for encoding image data. The encoder may be implemented not only in hardware but also in a software computer program. In the software encoder that is implemented in a software computer program, the program is loaded onto a personal computer, for example, and each process contained in the program is executed by a central processing unit (CPU) of the computer. Encoded image data, encoding data generated in the process of encoding, and a variety of data generated in the process of encoding are stored on a random-access memory (RAM) as necessary.

SUMMARY OF THE INVENTION

In standard personal computers, a CPU and a RAM are connected via a shared bus. Generally speaking, an operating clock frequency of the shared bus is lower than an operating clock frequency of the CPU and the shared bus is used to exchange data with another device. The RAM arranged external to the CPU is large in memory capacity but slow in speed in the reading and writing of data. A large latency can result depending on the workload of the shared bus.

A cache memory arranged internal to the CPU includes a high-speed static random access memory (SRAM). The cache memory operates typically at a clock frequency higher than the shared bus and can read and write data faster than the RAM external to the CPU. The cache memory dedicated to the host CPU reads and writes data at a high speed in a manner free from the exchange of data with another device.

The cache memory is limited in size in comparison with the RAM external to the CPU for cost reasons. Memory allocation needs to be appropriately performed. For example, only data frequently used is stored on the cache memory in order to prevent an excessive efficiency drop in an encoding process and an excessive increase in latency. Data that is not used for the time being is temporarily stored onto the RAM.

In currently available computers, a plurality of CPUs run in parallel. In such computers, CPU allocation is also performed.

In the software encoder, hardware resources such as the CPU and the memory are allocated. As a structure of the hardware resources such as the CPU and the memory becomes complicated, an allocation process thereof also becomes complicated.

The efficiency of the encoding process can greatly change depending on how the hardware resources are allocated. There is a need for appropriate resource allocation as the structure of the hardware resources becomes complicated.

It is thus desirable to allocate appropriately the hardware resources to allow the software encoder and the software decoder to operate appropriately.

In accordance with one embodiment of the present invention, an information processing apparatus for encoding image data, includes a filter unit for performing a filtering operation on the image data in a layer fashion to generate a plurality of subbands including coefficient data segmented on a per frequency band basis, an intermediate data storage unit for storing intermediate data generated in the middle of the filtering operation of the filter unit, a coefficient storage unit for storing the coefficient data generated in the filtering operation of the filter unit, and a coefficient rearranging unit for performing a rearranging operation to rearrange the coefficient data stored on the coefficient storage unit so that the coefficient data is output in a predetermined order, the intermediate data storage unit writing and reading data thereon at a speed higher than the coefficient storage unit and being smaller in storage capacity than the coefficient storage unit.

The filter unit may perform the filtering operation on the image data on a per lineblock basis, each lineblock including the image data of the number of lines used to generate the coefficient data of one line of a subband of at least a lowest frequency component. The intermediate data storage unit may store the intermediate data on a per lineblock basis. The coefficient storage unit may store the coefficient data on a per lineblock basis.

The coefficient rearranging unit may rearrange the coefficient data in the order in accordance with which the coefficient data of a plurality of subbands segmented in frequency on a per lineblock basis is synthesized to generate the image data.

The coefficient rearranging unit may rearrange the coefficient data on a per lineblock basis in the order from a low-frequency component to a high-frequency component.

The information processing apparatus may further include an encoding unit for encoding the coefficient data rearranged in order by the coefficient rearranging unit.

The information processing apparatus may further include a control unit for controlling the filtering operation of the filter unit and the rearranging operation of the coefficient rearranging unit in order to perform successively the filtering operation and the rearranging operation.

The control unit may controls processing a luminance component of the image data and processing a color difference component of the image data so that the luminance component and the color difference component are processed in parallel.

The information processing may further include a control unit, the control unit controlling the filtering operation of the filter unit, the rearranging operation of the coefficient rearranging unit and an encoding operation of encoding unit in order to perform the filtering operation, the rearranging operation and the encoding operation in parallel.

The control unit may control processing a luminance component of the image data and processing a color difference component of the image data so that the luminance component and the color difference component are processed in parallel.

In accordance with one embodiment of the present invention, an information processing method for encoding image data, includes steps of performing a filtering operation on the image data in a layer fashion to generate a plurality of subbands including coefficient data segmented on a per frequency band basis, storing intermediate data generated in the middle of the filtering operation, storing the coefficient data generated in the filtering operation; and rearranging the stored coefficient data in order so that the coefficient data is output in a predetermined order, the step of storing the intermediate data including writing and reading data at a speed higher than in the step of storing the coefficient data with a storage capacity smaller than in the step of storing the coefficient data.

In accordance with embodiments of the present invention, the filtering operation is performed in a layer fashion on the image data. The plurality of subbands of coefficient data segmented on a per frequency band basis are generated. The intermediate data generated in the middle of the filtering operation is stored on a first storage medium that writes and reads data at a speed higher than a second storage medium. The coefficient data generated in the filtering operation is stored on the second storage medium having a memory capacity larger than that of the first storage medium. The coefficient rearranging unit rearranges the coefficient data stored on the second storage unit so that the coefficient data is output in the predetermined order. The order rearranged coefficient data is then entropy encoded.

In accordance with embodiments of the present invention, encoded data is entropy decoded. Coefficient data of a plurality of subbands, obtained by performing a filtering operation on the image data in a layer fashion and segmented on a per frequency band basis, is generated. The generated coefficient data is stored. The coefficient data is read and the filtering operation is performed on the read coefficient data. The coefficient data of a plurality of subbands segmented on a per frequency band basis is synthesized into image data.

In accordance with embodiments of the present invention, the software encoder and the software decoder are incorporated in the computer to be operable in an appropriate manner.

BRIEF DESCRIPTION OF THE DRAWINGS

FIG. 1 is a block diagram of an encoder in accordance with one embodiment of the present invention;

FIG. 2 diagrammatically illustrates wavelet transform;

FIG. 31 illustrates a wavelet transform related table;

FIG. 32 illustrates a coefficient rearrangement related table;

DESCRIPTION OF THE PREFERRED EMBODIMENTS

Figure 3A:
FIGS. 3A and 3B diagrammatically illustrates the wavelet transform.

FIG. 1 is a block diagram of the encoder 10. The encoder 10 of FIG. 1 is implemented in a software program. More specifically, the encoder 10 is implemented when a software encoder encoding image data is executed by a central processing unit (CPU) of an information processing apparatus. As shown in FIG. 1, the encoder 10 includes a wavelet transformer 11, an intermediate calculation buffer 12, a coefficient rearranging buffer 13, a coefficient rearranger 14 and an entropy encoder 15.

The image data input to the encoder 10 is temporarily stored on the intermediate calculation buffer 12 via the wavelet transformer 11. The wavelet transformer 11 wavelet-transforms the image data stored on the intermediate calculation buffer 12. More specifically, the wavelet transformer 11 reads the image data from the intermediate calculation buffer 12, filters the read image data through analyzing filters to generate coefficient data of a high frequency region and a low frequency region, and then stores the generated coefficient data on the intermediate calculation buffer 12. The encoder 10, including a horizontal analyzing filter and a vertical analyzing filter, filter analyzes image data groups in both an image horizontal direction and an image vertical direction. The wavelet transformer 11 reads again the coefficient data of the low frequency region from the intermediate calculation buffer 12, and performs a filtering process on the read coefficient data using the analyzing filters, thereby generating further data of coefficients in a high frequency region and a low frequency region. The generated coefficient data is stored on the intermediate calculation buffer 12.

Upon reaching a predetermined segmentation level through repeating the above process, the wavelet transformer 11 reads the coefficient data and writes the read coefficient data on the coefficient rearranging buffer 13.

The coefficient rearranger 14 reads the coefficient data written on the coefficient rearranging buffer 13 in a predetermined order, and then supplies the read coefficient data to the entropy encoder 15. The entropy encoder 15 quantizes the supplied coefficient data in a predetermined method, for example, entropy encodes the supplied coefficient data through a predetermined entropy encoding method such as the Huffman coding or arithmetic coding. The entropy encoder 15 outputs the generated encoded data from the encoder 10.

The process of the wavelet transformer 11 of FIG. 1 is described in detail. The wavelet transform is described first. As diagrammatically illustrated in FIG. 2, in the wavelet transform to the image data, the image data is segmented into a high spatial frequency region and a low spatial frequency. Segmentation is recursively repeated to resulting low-frequency data. Efficient compression encoding is performed by segmenting each region of the low spatial frequency data into a smaller region.

As shown in FIG. 2, the lowest frequency component region of image data is segmented into a low frequency component region L and a high frequency component region H. This segmentation process is repeated three times with segmentation level=3. As shown in FIG. 2, "L" and "H" represent a low frequency region and a high frequency region, respectively. The position of "L" and "H" represents that a forward position means a band as a result of segmentation in a horizontal direction and that a backward position means a band as a result of segmentation in a vertical direction. A number preceding "L" and "H" represents a segmentation level of each region. The lower the component layer, the smaller the number. The maximum value of the layer represents a segmentation level (number of segmentations) at the wavelet transform.

As shown in FIG. 2, the segmentation process is successively performed from a lower right region to an upper left region on the screen toward a low frequency component. In the example of FIG. 2, the bottom right region on the screen is a region 3 HH having the least amount of low frequency component (i.e., having the most amount of high frequency component). The screen is segmented into four regions, and the top left region is further segmented into four. The top left region of the four regions is further segmented into four regions. The resulting top left region is 0 LL having the most amount of low frequency component.

Figure 3B:
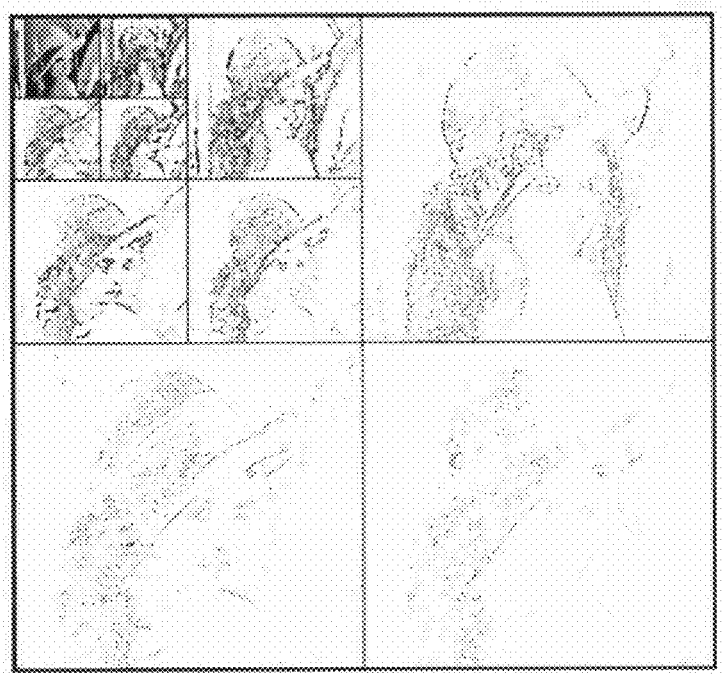

Transform and segmentation are performed on the low frequency component because energy of image concentrates on a low frequency component. This may be understood because sub bands are formed as shown in FIG. 3B as segmentation level is increased from an example of segmentation level=1 shown in FIG. 3A to an example of segmentation level=3 shown in FIG. 3B. For example, the segmentation level of the wavelet transform of FIG. 2 is 3, and as a result, 10 sub bands are generated.

The wavelet transformer 11 performs the above-described process using a filter bank containing high-frequency filters and low-frequency filters. Since a digital filter has typically an impulse response having a plurality of tap lengths, namely, a filter factor, input image data or factor data enough to perform a filtering process needs to be buffered. When the wavelet transform is performed in multiple stages, wavelet transform factors generated in a preceding stage of the number enough to perform the filtering process need to be buffered.

A specific wavelet transform method using a 5×3 filter in accordance with one embodiment is described below. The method of using the filter 5×3 filter, adopted in JPEG 2000 standard previously discussed with reference to the known art, is an excellent method enabling wavelet transform to be performed on image data with a small number of filter taps.

The impulse response (Z transform expression) of the 5×3 filter is composed of a low frequency filter $H_0(z)$ and a high frequency filter $H_1(Z)$ as represented in the following equations (1) and (2).

$$H_0(z)=(-1+2z^{-1}+6z^{-2}+2z^{-3}-z^{-4})/8 \qquad (1)$$

$$H_1(z)=(-1+2z^{-1}-z^{-2})/2 \qquad (2)$$

The coefficients of the low frequency region and the high frequency region are directly calculated using equations (1) and (2). Using the lifting technique, an amount of calculation for filtering process is reduced.

Figure 4:
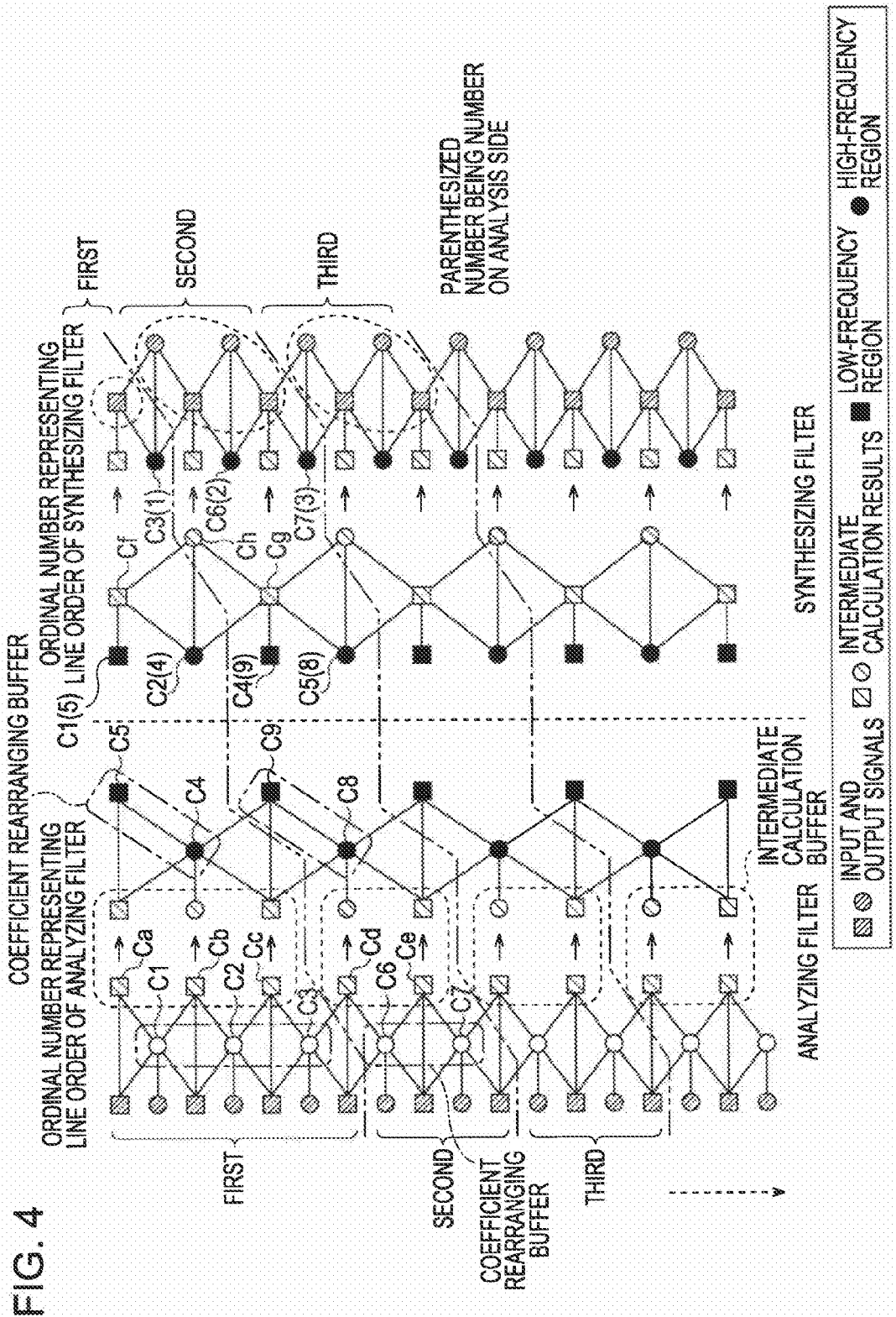
FIG. 4 diagrammatically illustrates a lifting filtering operation of a 5×3 filter to a segementation level=2.

The wavelet transform is described more specifically. FIG. 4 illustrates a lifting filtering process of the 5×3 filter performed to a segmentation level of 2. An analyzing filter shown in the left portion of FIG. 4 is the filter of the wavelet transformer 11 of FIG. 1. A synthesis filter shown in the right portion of FIG. 4 is an inverse wavelet transform filter to be discussed later.

In the discussion that follows, a display device scans a top line of pixels from left to right, starting with a pixel at a top left corner of the screen, then scans a next line after completing the top line, and repeats each line until a bottom line. The display device thus presents one screen.

As shown in FIG. 4, a left-end column is composed of vertically arranged pixel data at positions on each line of original image data. More specifically, in the filtering process of the wavelet transformer 11, the vertical filter is used to scan the pixels vertically on the screen. First column through third column represent a filtering process of segmentation level=1, and fourth column through sixth column represent a filtering process of segmentation level=2. The second column from the left represents a high frequency output based on the pixels of the left end original image data. The third column from the left represents a low frequency output based on the original image data and the high frequency component output. As shown in the fourth through sixth columns, the filtering process of segmentation level=2 is performed on the output of the filtering process of segmentation level=1.

In a first phase in the filtering process of segmentation level=1, coefficient data of the high frequency component is calculated based on the image of the original image data. In a second phase, coefficient data of the low frequency component is calculated based on the coefficient data of the high frequency component calculated in the first phase, and the pixel of the original image data. The filtering process of segmentation level=1 is illustrated in the first column through third column on the left side (analyzing filter side) in FIG. 4. The calculated coefficient data of the high frequency component is stored on the coefficient rearranging buffer 13 discussed with reference to FIG. 1. The coefficient data of the low frequency component is stored on the intermediate calculation buffer 12 of FIG. 1.

As shown in FIG. 4, the coefficient rearranging buffer 13 is represented as a box defined by dot-and-dash chain line, and the intermediate calculation buffer 12 is represented as a box defined by broken line.

The filtering process of segmentation level=2 is performed based on the result of the filtering process of segmentation level=1 stored on the intermediate calculation buffer 12. In the filtering process of segmentation level=2, the coefficient data calculated as the coefficient of the low frequency component in the filtering process of segmentation level=1 is regarded as the coefficient data containing the low frequency component and the high frequency component, and then a filtering process similar to the filtering process of segmentation level=1 is performed. The coefficient data of the high frequency component and the coefficient data of the low frequency component, calculated in the filtering process of segmentation level=2, are stored on the coefficient rearranging buffer 13.

The wavelet transformer 11 performs the above-described filtering process in both the horizontal direction and the vertical direction on the screen. For example, the filtering process of segmentation level=1 is first performed in the horizontal direction, and the generated coefficient data of the high frequency component and the low frequency component is stored on the intermediate calculation buffer 12. The filtering process of segmentation level=1 is then performed in the vertical direction on the coefficient data stored on the intermediate calculation buffer 12. The filtering process of segmentation level=1 in both the horizontal direction and the vertical direction results in four regions, namely, regions HH and HL, and regions LH and LL. The regions HH and HL are coefficient data that is obtained by further segmenting the high frequency component into a high frequency component and a low frequency component and the regions LH and LL are coefficient data that is obtained by further segmenting the low frequency component into a high frequency component and a low frequency component.

In segmentation level=2, the filtering process is performed in each of the horizontal direction and the vertical direction on the coefficient data of the low frequency component generated in segmentation level=1. More specifically, in segmentation level=2, the region LL segmented at segmentation level=1 is further segmented into four regions. The region LL thus contains a region HH, a region HL, a region LH, and a region LL.

The wavelet transformer 11 performs the filtering process using the wavelet transform on the screen in a vertical direction in a stepwise manner by several times, each time with several lines processed. As shown in FIG. 4, seven lines are processed at a first time starting with a first line on the screen, and four lines are processed at a second time starting with an eighth line on the screen. The number of lines is the number of lines required to generate the low frequency component of one line after each region is divided into a high frequency component and a low frequency component.

In the discussion that follows, a set of lines, containing other sub bands, required to generate one line of the lowest frequency component (coefficient data of one line of sub bands containing the lowest frequency component) is referred to as a precinct (or line block). The line herein refers to one row of pixel data or coefficient data formed in a picture, a field, or a sub band corresponding to the image data prior to wavelet transform. More specifically, the line block (precinct) is several lines of a pixel data group, in the original image data prior to the wavelet transform, required to generate one line of sub band of coefficient data in the lowest frequency component subsequent to wavelet transform, or the line block (precinct) is a coefficient data group of each sub band obtained by wavelet transforming the pixel data group.

As shown in FIG. 4, a coefficient C5 obtained as a result of the filtering process of segmentation level=5 is calculated from a coefficient $C_a$ stored on the intermediate calculation buffer 12 and a coefficient C4. The coefficient C4 is calculated from the coefficient $C_a$, a coefficient $C_b$, and a coefficient $C_c$ all stored on the intermediate calculation buffer 12. The coefficient $C_c$ is calculated from coefficients C2 and C3 stored on the coefficient rearranging buffer 13, and image data on a fifth line. The coefficient C3 is calculated from image data on the fifth line through the seventh line. To obtain the coefficient C5 at segmentation level=2, the image data on the first line through the seventh line is required.

In contrast, the filtering process at the second time thereafter may use the coefficient data previously calculated in the preceding filtering process and stored on the coefficient rearranging buffer 13. A smaller number of lines thus works.

More specifically, as shown in FIG. 4, from among the coefficients of the low frequency component obtained as a result of filtering process of segmentation level=2, a coefficient C9 subsequent to the coefficient C5 is calculated from the coefficients C4 and C8 and the coefficient $C_c$ stored on the intermediate calculation buffer 12. The coefficient C4 is previously calculated in the first filtering process, and already stored on the coefficient rearranging buffer 13. Similarly, the coefficient $C_c$ is previously calculated in the first filtering process and already stored on the intermediate calculation buffer 12. In the second filtering process, only a filtering process for calculating the coefficient C8 is performed. This new filtering process further uses the eight through eleventh lines.

The second and subsequent filtering processes can use data calculated in the preceding filtering process and stored on the intermediate calculation buffer 12 and the coefficient rearranging buffer 13, and simply calculate four lines per process.

If the number of lines on the screen fails to match the number of lines in encoding, the filtering process is performed by copying a line of the original image data to equalize the number of lines to the number of lines in encoding.

The filtering process to obtain the coefficient data of one of the lowest frequency component is performed several times in a stepwise manner (by precinct) to cover the lines of the entire screen as will be described in detail later. This arrangement allows the image to be decoded with short delay time involved when the encoded data is transmitted.

To perform the wavelet transform, a first buffer and a second buffer are used. The first buffer is used to perform the wavelet transform and the second buffer stores the coefficient generated when the filtering process is performed to a predetermined segmentation level. The first buffer corresponds to the intermediate calculation buffer 12 and is enclosed by broken line in FIG. 4. The second buffer corresponds to the coefficient rearranging buffer 13 and is enclosed by dot-and-dash chain line in FIG. 4. The coefficient stored on the second buffer is to be entropy encoded in a later entropy encoding process.

The process of the coefficient rearranger 14 of FIG. 1 is described below. As previously discussed, the encoded data calculated by the wavelet transformer 11 is stored on the coefficient rearranging buffer 13, rearranged in order by the coefficient rearranger 14, and transferred to the entropy encoder 15.

As previously discussed, the coefficients are generated from the high frequency component to the low frequency component in the wavelet transform. As shown in FIG. 4, the filtering process of segmentation level=1 generates successively the coefficient C1, the coefficient C2, and the coefficient C3 from the image data of the original image in the first process. The filtering process of segmentation level=2 is performed on the coefficient data of the low frequency component obtained in the filtering process of segmentation level=1 and the coefficient C4 and the coefficient C5 of the low frequency component are successively generated. More specifically, in the first process, the coefficient data is generated in the order of the coefficient C1, the coefficient C2, the coefficient C3, the coefficient C4 and the coefficient C5. This generation order of the coefficient data is natural (from high frequency component to low frequency component) due to the principle of the wavelet transform.

In contrast, on the decoder side, the image needs to be generated and output from the low frequency component to the high frequency component in order to decode immediately with a small amount of delay. The coefficient data generated on the encoder side is preferably rearranged in a direction from the low frequency component to the high frequency component and then supplied to the decoder side.

This arrangement is described more specifically with reference to FIG. 4. The synthesis filter for performing the inverse wavelet transform is illustrated on the right side of FIG. 4. A first synthesizing process for the first line and other lines of the output image data (inverse wavelet transform) is performed using the coefficient C4 and the coefficient C5 of the low frequency component generated in the first filtering process on the encoder side and the coefficient C1.

More specifically, in the first synthesis process, the encoder side supplies the decoder side with the coefficient data in the order of the coefficient C5, the coefficient C4 and the coefficient C1. The decoder side performs the synthesis process on the coefficient C5 and the coefficient C4 in a synthesize level=2 corresponding to segmentation level=2, thereby generating and storing a coefficient $C_f$. In a synthesis level=1 corresponding to the segmentation level=1, the synthesis process is performed on the coefficient $C_f$ and the coefficient C1 and the synthesis result is output as a first line.

In the first synthesis process, the coefficient data, generated and stored on the coefficient rearranging buffer 13 in the order of the coefficient C1, the coefficient C2, the coefficient C3, the coefficient C4 and the coefficient C5, is rearranged in the order of the coefficient C5, the coefficient C4, the coefficient C1, . . . , and then supplied to the decoder side.

As for synthesis filter illustrated on the right side of FIG. 4, the coefficient supplied from the encoder side has a parenthesized number on the encoder side, and an unparenthesized number indicating a line number in the synthesis filter. For example, the coefficient C1(5) means the coefficient C5 on the analyzing filter on the left side in FIG. 4 and the first line in the synthesis filter side.

The synthesis process of the decoder side is performed on the coefficient data processed in the second and subsequent filtering process on the encoder side using the coefficient data synthesized in the preceding synthesis process or supplied from the encoder side. As shown in FIG. 4, the second synthesis process of the decoder side to be performed using the coefficient C8 and the coefficient C9 of the low frequency component generated in the second filtering process on the encoder side further needs the coefficient C2 and the coefficient C3 generated in the first filtering process on the encoder side. The second line through the fifth line are thus decoded.

In the second synthesis process, the encoder side supplies to the decoder side the coefficient data in the order of the coefficient C9, the coefficient C8, the coefficient C2, and the coefficient C3. The decoder side generates a coefficient $C_g$ in the process of synthesis level=2 using the coefficient C8 and the coefficient C9 and the coefficient C4 supplied from the encoder side at the first synthesis process, and stores the coefficient $C_g$ on the buffer. The decoder side generates a coefficient $C_h$ using the coefficient $C_g$, the coefficient C4, and the coefficient $C_f$ generated in the first synthesis process and stored on the buffer, and then stores the coefficient $C_h$ on the buffer.

The decoder side performs the synthesis process of synthesis level=1 using the coefficient $C_g$ and the coefficient $C_h$ generated in the synthesis process of synthesis level=2 and stored on the buffer, the coefficient C2 (referred to as a coefficient C6(2) in the synthesis filter) and the coefficient C3 (referred to as a coefficient C7(3) in the synthesis filter) supplied from the encoder side. The decoder side thereby decodes the second line through the fifth line.

In the second synthesis process, the coefficient data generated on the encoder side in the order of the coefficient C2, the coefficient C3, (coefficient C4 and coefficient C5), the coefficient C6, the coefficient C7, the coefficient C8, and the coefficient C9 is rearranged in the order of the coefficient C9, the coefficient C8, the coefficient C2, the coefficient C3, . . . before being transferred to the decoder side.

In the third and subsequent synthesis analysis processes, the coefficient data stored on the coefficient rearranging buffer 13 is also rearranged and then transferred to the decoder side. The decoder side decodes the lines with four lines at a time.

In a synthesis process on the decoder side responsive to the filtering process for the other lines including the bottom line on the screen on the encoder side (hereinafter referred to as final filtering process), the coefficient data generated and stored heretofore on the buffer in the preceding processes is all output. The number of output lines becomes large. As shown in FIG. 4, eight lines are output at the final process.

The coefficient rearranger 14 may rearrange the coefficient data by setting, in a predetermined order, read addresses in the reading of the coefficient data stored on the coefficient rearranging buffer 13.

Figure 5A:
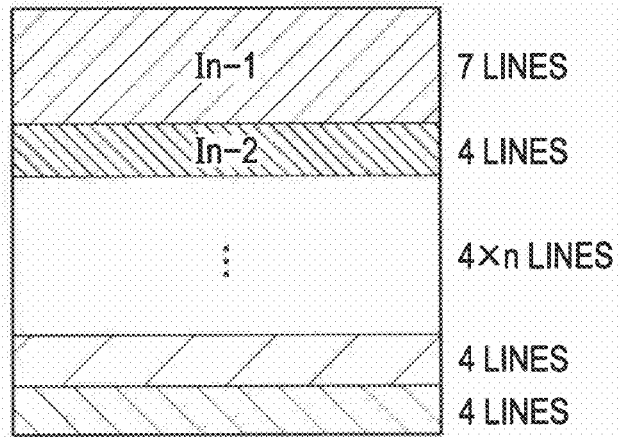
FIGS. 5A-5C illustrate processes of wavelet transform and inverse wavelet transform.
Figure 5B:
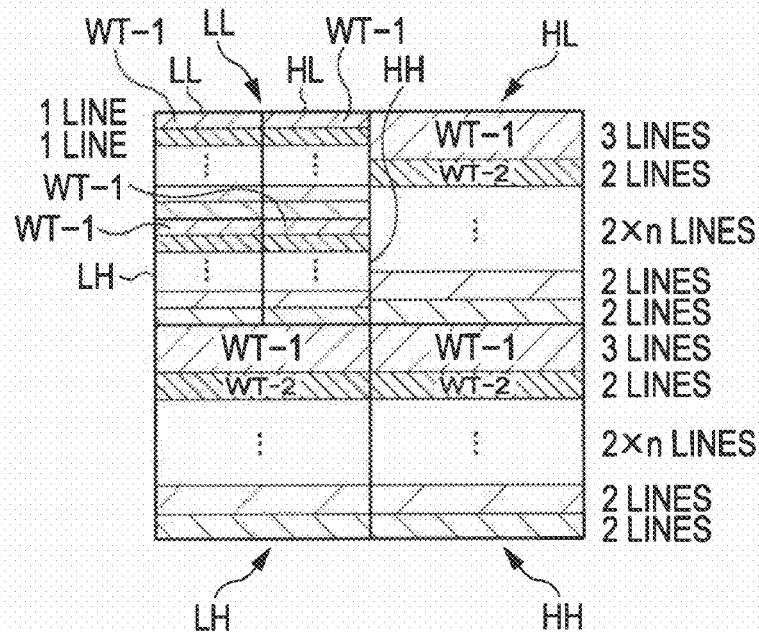
Figure 5C:
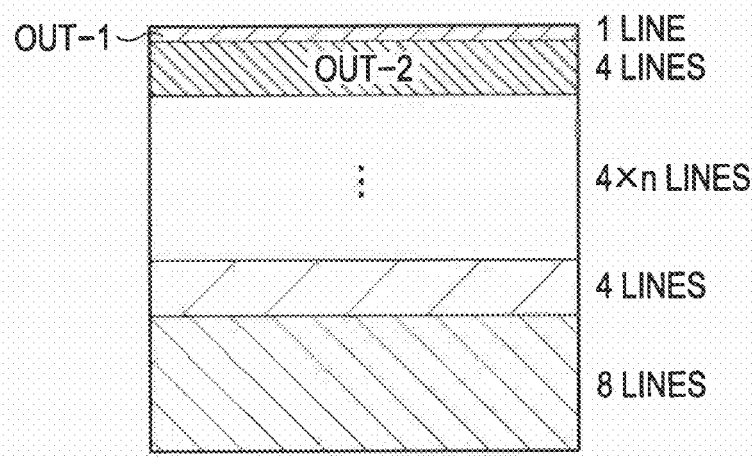

The above-referenced process is specifically described with reference to FIGS. 5A-5C. FIGS. 5A-5C illustrate a wavelet transform filtering process to segmentation level=2 using the 5×3 filter. As shown in FIG. 5A, the wavelet transformer 11 performs the first filtering process on the input image data of the first line to the seventh line in the horizontal direction and the vertical direction (In-1 in FIG. 5A).

In the first filtering process of segmentation level=1, the coefficient data of three lines including the coefficient C1, the coefficient C2 and the coefficient C3 is generated, and arranged in the region HH, the region HL, and the region LH formed at segmentation level=1 as shown in FIG. 5B (WT-1 in FIG. 5B).

The region LL formed at segmentation level=1 is further segmented into four regions in the filtering process of segmentation level=2 in the horizontal direction and the vertical direction. As for the coefficient C5 and the coefficient C4 generated at segmentation level=2 and arranged in the region LL of segmentation level=1, one line of the coefficient C5 is arranged in the region LL, and one line of the coefficient C4 is arranged in each of the region HH, the region HL, and the region LH.

In the second and subsequent filtering processes by the wavelet transformer 11, each filtering process is performed on four lines at a time (In-2 in FIG. 5A), two lines of coefficient data are generated at a time at segmentation level=1 (WT-2 of FIG. 5B), and one line of coefficient data is generated at segmentation level=2.

In the second process of FIG. 4, two lines of coefficient data of the coefficient C6 and the coefficient C7 are generated at the filtering process of segmentation level=1, and arranged subsequent to the coefficient data generated at the first filtering process in the region HH, the region HL, and the region LH formed at segmentation level=1 as shown in FIG. 5B. Similarly, in the region LL of segmentation level=1, one line of coefficient C9 generated in the filtering process of segmentation level=2 is arranged in the region LL, one line of coefficient C8 is arranged in each of the region HH, the region HL and the region LH.

When the wavelet transformed data is decoded as shown in FIG. 5B, the decoder side performs the first synthesis process in response to the first filtering process of the encoder side on the first line through the seventh line, thereby outputting the first line (Out-1 of FIG. 5C). The decoder side outputs four lines at a time in response to the filtering process of the encoder side from the second to the final filtering process (Out-2 of FIG. 5C). In response to the final round of filtering process on the encoder side, the decoder side outputs eight lines.

The coefficient data generated by the wavelet transformer 11 from the high frequency component to the low frequency component is successively stored on the coefficient rearranging buffer 13. When the coefficient data is stored on the coefficient rearranging buffer 13 to the extent that allows the coefficient data to be rearranged, the coefficient rearranger 14 reads the coefficient data in the rearranged order for the synthesis process. The coefficient data read is successively supplied to the entropy encoder 15.

The entropy encoder 15 encodes the supplied coefficient data and outputs the generated encoded data from the encoder 10.

Figure 6:
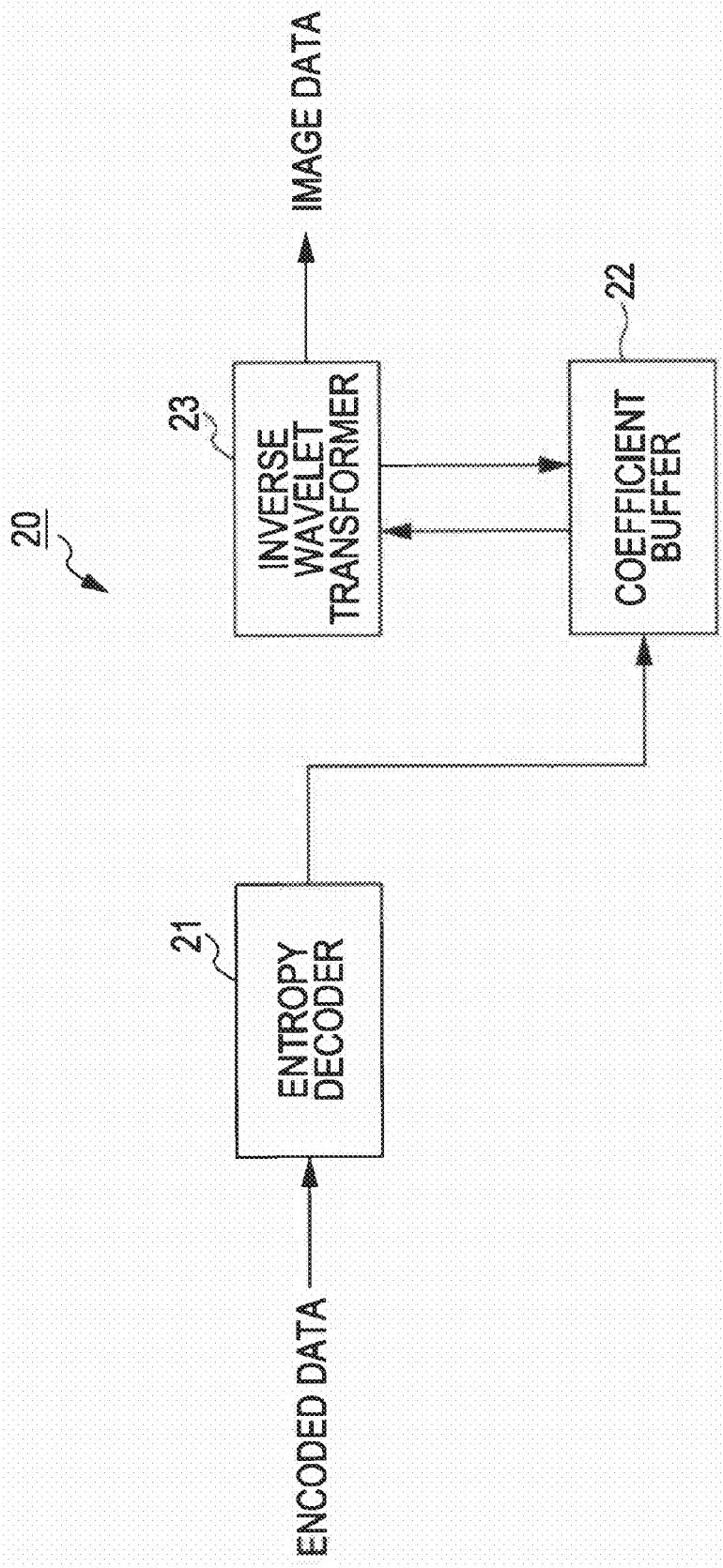
FIG. 6 is a block diagram illustrating a decoder in accordance with one embodiment of the present invention.

A decoder 20 corresponding to the encoder 10 of FIG. 1 is described below. FIG. 6 is a block diagram illustrating the decoder 20 in accordance with one embodiment of the present invention. The decoder 20 of FIG. 6 is implemented in a software program. More specifically, the decoder 20 is implemented when a software encoder decoding image data is executed by a central processing unit (CPU) of an information processing apparatus. As shown in FIG. 6, the decoder 20 includes an entropy decoder 21, a coefficient buffer 22 and an inverse wavelet transformer 23.

The entropy decoder 21 decodes the supplied encoded data in a decoding method corresponding to the encoding method of the entropy encoder 15, thereby resulting in coefficient data. The coefficient data is stored onto the coefficient buffer 22. The inverse wavelet transformer 23 performs a synthesis filtering process (inverse wavelet transform) through a synthesis filter using the coefficient data stored on the coefficient buffer 22 and stores the synthesis filtering results onto the coefficient buffer 22. The inverse wavelet transformer 23 repeats the filtering process in accordance with the segmentation level. Upon obtaining decoded image data (output image data), the inverse wavelet transformer 23 outputs the decoded image data to the outside.

Figure 7:
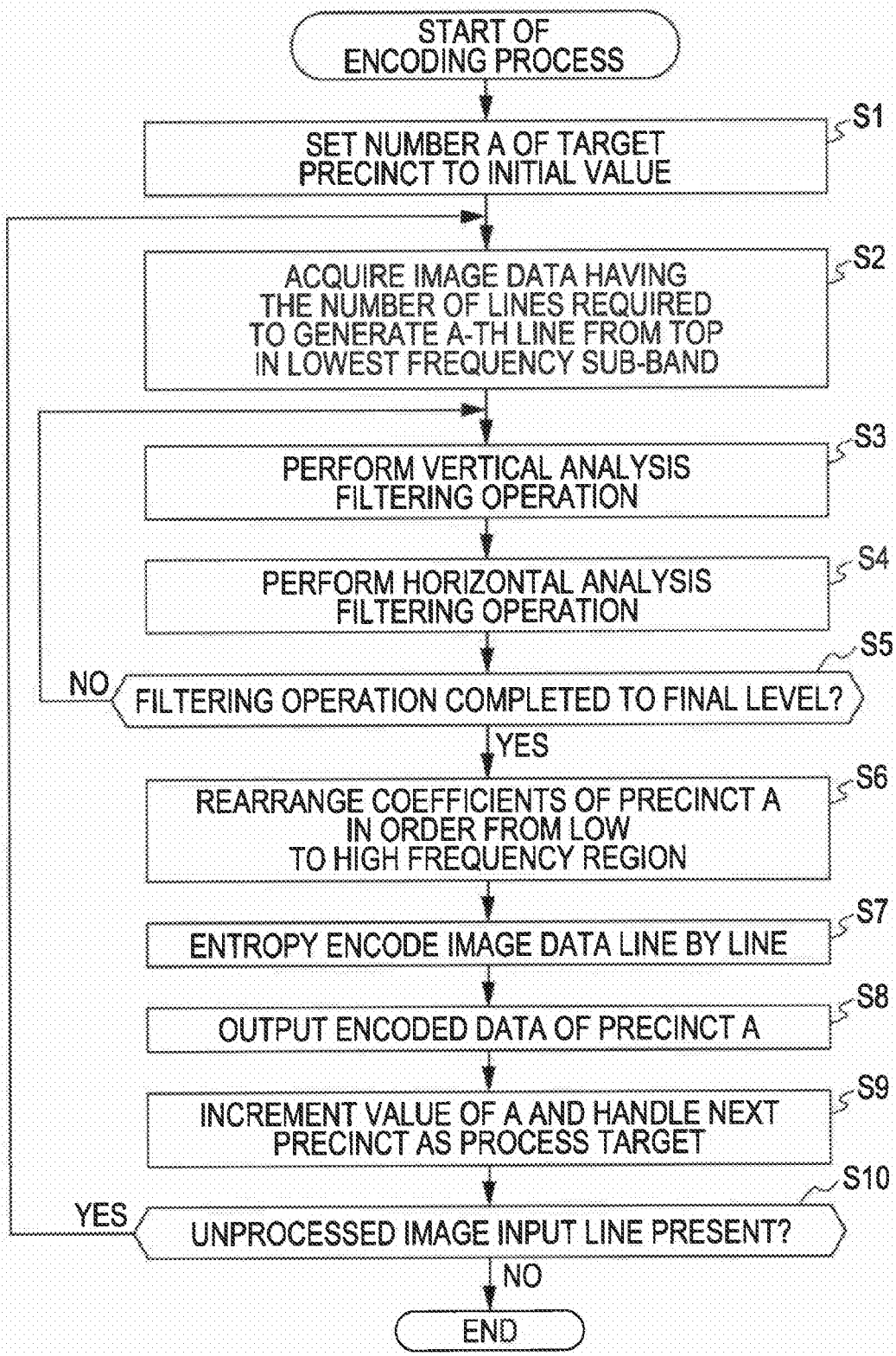
FIG. 7 is a flowchart illustrating an encoding process in accordance with one embodiment of the present invention.

The processes of the encoder 10 and the decoder 20 are described below. The encoding process of the encoder 10 is described with reference to a flowchart of FIG. 7.

When the encoding process starts, the wavelet transformer 11 sets a number A of a target precinct to an initial value in step S1. The number A is typically set to "1." Upon completing the setting, the wavelet transformer 11 acquires image data of lines of the number required to generate one line at A-th line from the top in the lowest frequency sub band (i.e., one precinct) in step S2. In step S3, the wavelet transformer 11 performs a vertical analysis filtering operation to the image data arranged in a vertical direction on the screen. In step S4, the wavelet transformer 11 performs a horizontal analysis filtering operation to the image data arranged in a horizontal direction on the screen.

In step S5, the wavelet transformer 11 determines whether the analysis filtering operation has reached the final level. If it is determined in step S5 that the final level has not been reached, processing returns to step S3. The wavelet transformer 11 performs the analysis filtering operation at the current segmentation level in steps S3 and S4.

If it is determined in step S5 that the analysis filtering operation has reached the final level, the wavelet transformer 11 proceeds to step S6.

In step S6, the coefficient rearranger 14 rearranges the coefficients of the precinct A (A-th precinct from the top of a picture (field in the case of interlace)) from the low frequency to high frequency order. In step S7, the entropy encoder 15 entropy encodes the coefficient line by line. Upon completing the entropy encoding, the entropy encoder 15 transmits the encoded data of the precinct A to outside in step S8.

In step S9, the wavelet transformer 11 increments the value of the number A by one to set the next precinct as a target. In step S10, the wavelet transformer 11 determines whether an unprocessed image input line is present in the target picture (field in the case of interlace system). If it is determined in step S10 that an unprocessed image input line is present, processing returns to step S2 to process a new target precinct.

Steps S2 through S10 are cycled through to encode each precinct. If it is determined in step S10 that no unprocessed image input line is present, the wavelet transformer 11 ends the encoding process on that picture. A new encoding process starts on a next picture.

The wavelet transformer 11 in the encoder 10 performs consecutively the vertical analysis filtering operation and the horizontal analysis filtering operation to the final level as described above. In comparison with the known method, the amount of data to be stored (buffered) at a time (at the same time) is small. The required buffer having a substantially small memory capacity sufficiently works. Since the analysis filtering operation is performed to the final level, the coefficient rearrangement, entropy encoding, etc. to be performed subsequently are also performed (i.e., the coefficient rearrangement and entropy encoding are performed by precinct). The delay time involved is substantially short in comparison with the known art.

Figure 8:
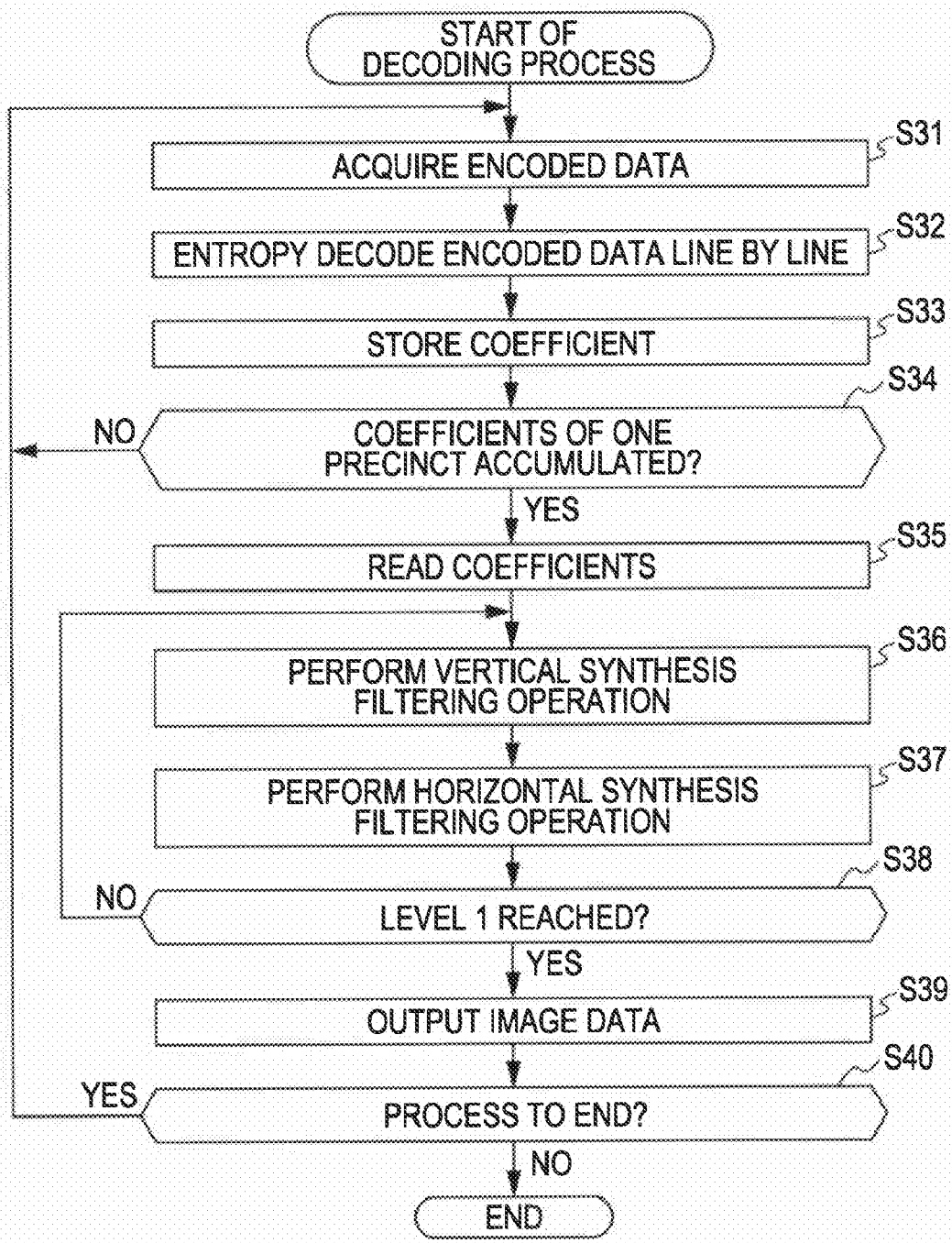
FIG. 8 is a flowchart illustrating a decoding process in accordance with one embodiment of the present invention.

The decoding process performed by the decoder 20 is described below with reference to a flowchart of FIG. 8.

When the decoding process starts, the entropy decoder 21 acquires the encoded data in step S31. In step S32, the entropy decoder 21 entropy decodes the encoded data line by line. In step S33, the coefficient buffer 22 stores the coefficient obtained as a result of decoding. In step S34, the inverse wavelet transformer 23 determines whether the coefficient buffer 22 has stored one precinct of coefficients. If it is determined in step S34 that one precinct of coefficients is not stored, processing returns to step S31 to perform step S31 and subsequent steps. The inverse wavelet transformer 23 thus waits on standby until the coefficient buffer 22 has stored one precinct of coefficients.

If it is determined in step S34 that the coefficient buffer 22 has stored one precinct of coefficients, the inverse wavelet transformer 23 proceeds to step S35 to read the one precinct of coefficients stored on the coefficient buffer 22. In step S36, the inverse wavelet transformer 23 performs a vertical synthesis filtering operation on the coefficients arranged in a vertical line on the screen. In step S37, the inverse wavelet transformer 23 performs a horizontal synthesis filtering operation on the coefficients arranged in a horizontal line on the screen. In step S38, the inverse wavelet transformer 23 determines whether the synthesis filtering operation has reached level=1 (with segmentation level being "1"), namely, whether inverse transform has been performed to the state prior to wavelet transform. If it is determined in step S38 that the synthesis filtering level has not reached level=1, processing returns to step S36 to repeat steps S36 and S37.

If it is determined in step S38 that the synthesis filtering operation has reached level=1, the inverse wavelet transformer 23 proceeds to step S39 to output the image data obtained as a result of inverse transform.

In step S40, the entropy decoder 21 determines whether the decoding process has been completed. If it is determined in step S40 that the decoding process has not been completed with the encoded data continuously input, processing returns to step S31 to repeat step S31 and subsequent steps. If it is determined in step S40 that the decoding process is to be completed with the inputting of the encoded data stopped, the entropy decoder 21 ends the decoding process.

In the inverse wavelet transform of the related art, the horizontal synthesis filtering operation is performed on all coefficients at a target segmentation level in a screen horizontal direction and then the vertical synthesis filtering operation is performed in a screen vertical direction. At each synthesis filtering process, the results thereof need to be stored on a buffer. The buffer is forced to store the synthesis filtering results at the segmentation level at that point of time and all coefficients at a next segmentation level. The buffer requires a large memory capacity (to store a large amount of data).

The image data is not output until all inverse wavelet transform has been completed in the picture (field in the case of interlace system). A long delay time from input to output results.

In contrast, the inverse wavelet transformer 23 in the decoder 20 consecutively performs the vertical synthesis filtering operation and the horizontal synthesis filtering operation by precinct to level 1 as described above. In comparison with the known method, the amount of data to be stored (buffered) at a time (at the same time) is small. The required buffer having a substantially small memory capacity sufficiently works. The image data is successively output (by precinct) with the synthesis filtering operation performed to level 1 (inverse wavelet transform) before all image data of a picture is obtained. The delay time involved is substantially short in comparison with the related art.

The processes described above are performed in parallel as shown in FIG. 9.

Figure 9:
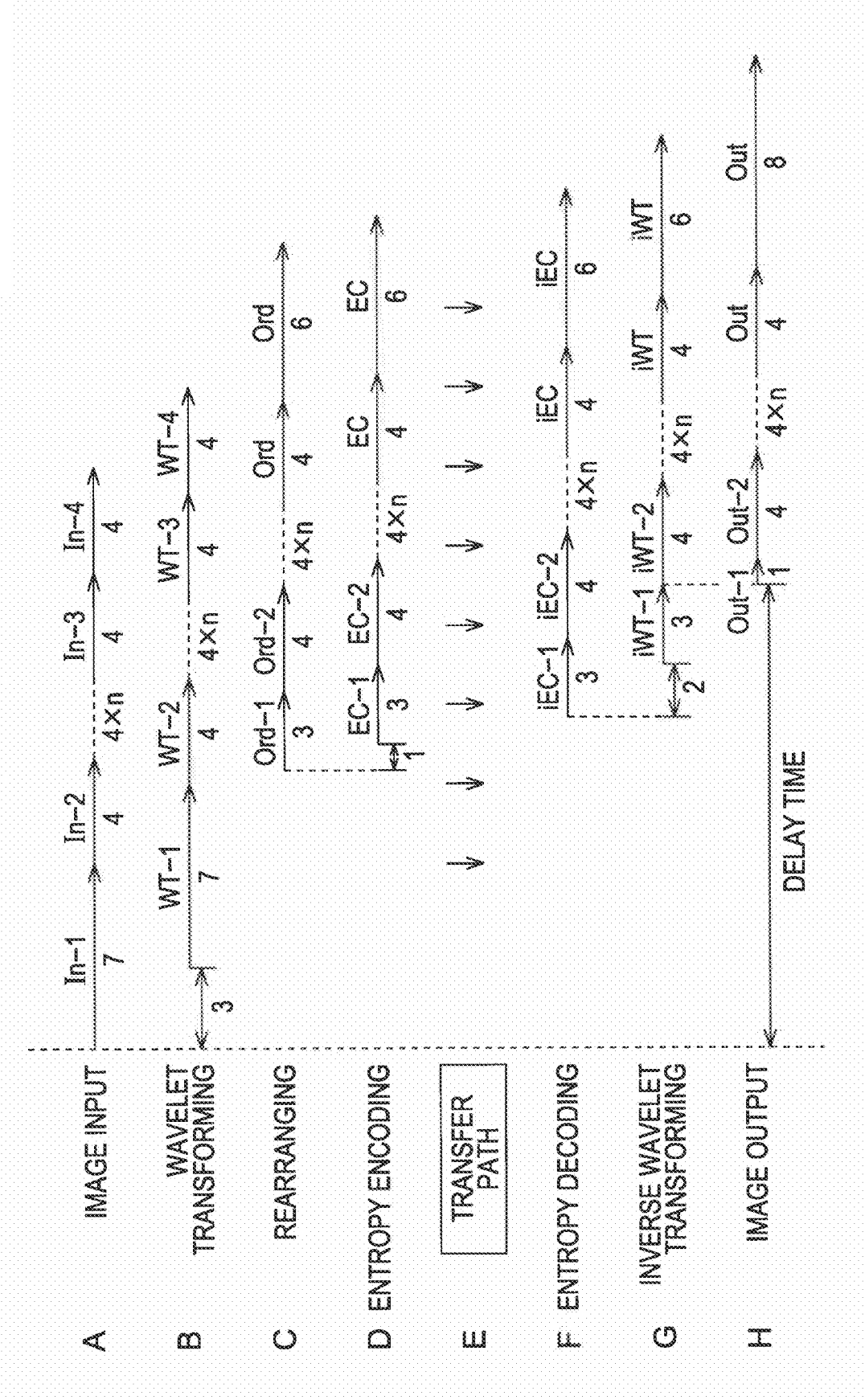
FIG. 9 diagrammatically illustrates parallel operations performed by the encoder and the decoder.

FIG. 9 illustrates a concept of the parallel operations of the elements of the encoder 10 of FIG. 1 and the decoder 20 of FIG. 6. FIG. 9 corresponds to FIGS. 5A-5C. The entropy encoder 15 performs a first wavelet transform WT-1 on input In-1 (B of FIG. 9) of the image data (A of FIG. 9). With reference to FIG. 4, the first wavelet transform WT-1 starts in response to the inputting of three lines and a coefficient C1 is generated. A delay time of three lines is caused from the input of the image data In-1 to the start of the wavelet transform WT-1.

The generated coefficient data is stored on the coefficient rearranging buffer 13 of FIG. 1. The wavelet transform is performed on the image data. When the first wavelet transform is completed, a second wavelet transform WT-2 starts.

The coefficient rearranger 14 performs a rearrangement order Ord-1 on the coefficient C1, the coefficient C4 and the coefficient C5 in parallel with the input of the image data In-2 to be used in the second wavelet transform WT-2 and the process of the second wavelet transform WT-2 (C of FIG. 9).

The delay time between the end of the wavelet transform WT-1 and the start of the rearrangement Ord-1 includes delays of apparatuses and system structure, such as a delay caused in the transfer of a control signal to instruct the coefficient rearranger 14 to perform a rearrangement process, a delay involved in the start of the rearrangement process by the coefficient rearranger 14, and a delay in program processing. These delay times are not essential in the encoding process.

The coefficient data is read by the coefficient rearranging buffer 13 in the order of the ending of the rearrangement process, and supplied to the entropy encoder 15. An entropy encoding operation EC-1 is then performed (D of FIG. 9). The entropy encoding process EC-1 can be started without waiting for the end of the rearrangement of the three coefficients, namely, the coefficient C1, the coefficient C4 and the coefficient C5. For example, when the rearrangement of one line of the first output coefficient C5 is completed, the entropy encoding can be started on the coefficient C5. The delay from the start of the rearrangement Ord-1 to the start of the entropy encoding EC-1 is one line.

The encoded data, on which the entropy encoder 15 has completed the entropy encoding EC-1, is transmitted to the decoder 20 of FIG. 6 via a transmission line (E of FIG. 9).

The encoder 10 receives successively the image data to the bottom line of the screen in succession to the seven lines of the image data input for the first process. In response to the input In-n (n is 2 or greater) of the image data, the encoder 10 performs the wavelet transform WT-n, the rearrangement Ord-n, and entropy encoding EC-n for four lines at a time as described above. The rearrangement Ord and the entropy encoding performed by the encoder 10 at the final process are performed on six lines. These processes are performed in parallel as shown in A of FIG. 9 through D of FIG. 9.

The data entropy encoded in EC-1 by the encoder 10 is transmitted to the decoder 20 via the transmission line, and then supplied to the entropy decoder 21. The entropy decoder 21 performs successively entropy decoding iEC-1 on the data encoded in the entropy encoding EC-1, thereby restoring the coefficient data (F of FIG. 9). The restored coefficient data is successively stored on the coefficient buffer 22. When the coefficient data sufficient to perform the inverse wavelet transform is stored on the coefficient buffer 22, the inverse wavelet transformer 23 reads the coefficient data from the coefficient buffer 22, and performs the inverse wavelet transform iTW-1 on the read coefficient data (G of FIG. 9).

As described with reference to FIG. 4, the inverse wavelet transformer 23 can start the inverse wavelet transform iWT-1 when the coefficient C4 and the coefficient C5 are stored on the coefficient buffer 22. The delay time from the start of the decoding iEC-1 by the entropy decoder 21 to the start of the inverse wavelet transform iWT-1 by the inverse wavelet transformer 23 is 2 lines.

When the inverse wavelet transformer 23 completes the inverse wavelet transform iWT-1 on the three lines processed in the first wavelet transform, the image data generated in the inverse wavelet transform iWT-1 is output as Out-1 (H of FIG. 9). The output Out-1 is the first line of image data as described with reference to FIGS. 4 and 5.

The decoder 20 receives successively the coefficient data encoded in the entropy encoding EC-1 (n is 2 or greater) in succession to the three lines of coefficient data encoded in the first process by the encoder 10. As described above, the decoder 20 performs the entropy decoding iEC-n and the inverse wavelet transform iWT-n on four lines of input coefficient data at a time and outputs the image data Out-n decoded in the inverse wavelet transform iWT-n. The encoder 10 performs the entropy decoding iEC and the inverse wavelet transform iWT as the final process on six lines. The encoder 10 outputs Out on eight lines. These processes are also performed in parallel by the decoder 20 as shown in F of FIG. 9 and H of FIG. 9.

As described above, the encoder 10 and the decoder 20 perform the processes thereof from top to bottom on the screen in order, and the image compression process and the image decoding process are thus performed with short delay.

The delay time from image input to image output in the wavelet transform performed to segmentation level=2 using the 5×3 filter is calculated with reference to FIG. 9. The delay time from the input of the first line of image data to the encoder 10 to the output of the first line of image data from the decoder 20 is a sum of factors described below. Delays different from system structure to system structure, such as a delay in the transmission line and a delay in actual process timing of elements in the apparatus, are excluded from the factors.

(1) Delay D_WT from the input of the first line to the end of the wavelet transform WT-1 performed on the seven lines, (2) Time D_Ord involved in the counting and the rearrangement of the three lines, (3) Time D_EC for the entropy encoding EC-1 on the three lines, (4) Time D_iEC for the entropy decoding iEC-1 on the three lines, (5) Time D_iWT for the inverse wavelet transform iWT-1 on the three lines.

The delays in the factors listed above are calculated with reference to FIG. 9. (1) Delay D_WT is for 10 lines. (2) time D_Ord, (3) time D_EC, (4) time D_iEC, and (5) time D_iWT are those for the three lines. One line after the start of the rearrangement Ord-1, the encoder 10 starts the entropy encoding EC-1. Similarly, two lines after the start of the entropy decoding iEC-1, the decoder 20 starts the inverse wavelet transform iWT-1. The entropy decoding iEC-1 can be started at the moment the encoding of the one line ends in the entropy encoding EC-1.

As shown in FIG. 9, the delay time from the input of the first line of coefficient data to the encoder 10 to the output of the first line of image data from the decoder 20 is 17 lines=10+1+1+2+3.

The delay time is further specifically described. If the input image data is an HDTV (High Definition Television) interlace video signal, one frame has a resolution of 1920 pixels×1080 lines, and one field has a resolution of 1920×540 lines. With a frame frequency of 30 Hz, the encoder 10 receives one field of 540 lines for 16.67 ms (1 s/60 fields).

The delay time involved in the input of seven lines of data is 0.216 ms (=16.67 ms×7/540 lines), and extremely short with respect to update time of one field. The sum of (1) delay D_WT, (2) time D_Ord, (3) time D_EC, (4) time D_iEC, and (5) time D_iWT is short because the number of lines to be processed is small. If the elements performing each process are implemented using hardware, the process time is further shortened.

Figure 10:
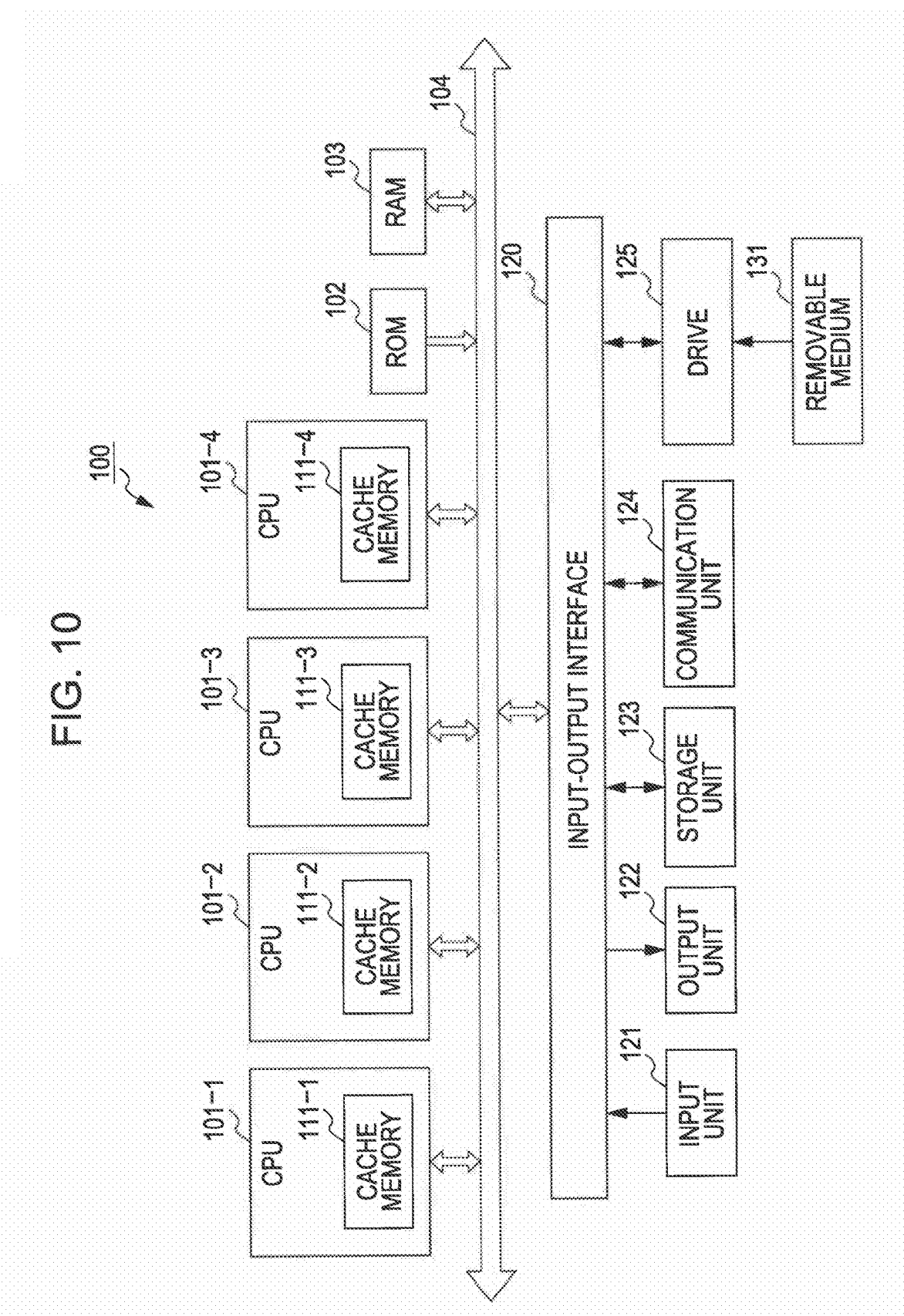
FIG. 10 is a block diagram illustrating a personal computer.

Hardware resources allocated to the software encoder and the software decoder are described. FIG. 10 is a block diagram of a personal computer 100.

As shown in FIG. 10, the personal computer 100 includes CPUs 101-1, 101-2, 101-3 and 101-4, each performing a variety of processes in accordance with a software program. The CPUs 101-1 through 101-4 are represented by a CPU 101 if there is no need to discriminate between the CPUs 101-1 through 101-4. The CPU 101 is connected to each of a read-only memory (ROM) 102 and a random-access memory (RAM) 103 via a bus 104. The ROM 102 pre-stores a software program and data. The RAM 103 stores the software program and data, stored on the ROM 102 and a storage unit 123.

The CPU 101-1 includes a cache memory 111-1, the CPU 101-2 includes a cache memory 111-2, the CPU 101-3 includes a cache memory 111-3 and the CPU 101-4 includes a cache memory 111-4. The cache memories 111-1 through 111-4 are represented by a cache memory 111 if there is no need to discriminate between the cache memories 111-1 through 111-4.

The cache memory 111, working at a high speed, is a static random-access memory (SRAM). The cache memory 111, hosted by the CPU 101, is exclusively used by the CPU 101. The cache memory 111 is costly per memory capacity unit. The cache memory 111 is contained in the CPU 101. If the memory capacity of the cache memory 111 is increased, the circuit scale of the CPU 101 is also increased. To reduce cost and to control an increase in the circuit scale, the cache memory 111 is limited to a range of from several hundred kilobytes to several megabytes. The cache memory 111 is smaller than in memory capacity than the RAM 103 external to the CPU 101 and having typically a memory capacity ranging from several hundred megabytes to several gigabytes.

Any type of memory may be used for the cache memory 111 and a memory capacity of any range may be acceptable for the cache memory 111. The cache memory 111 is used exclusively by the CPU 101 and writes and reads data at a data rate higher than the RAM 103. However, the cache memory 111 smaller in memory capacity than the RAM 103 can handle a limited amount of information.

The RAM 103, shared by the CPUs 101-1 through 101-4, has a slow data rate in data writing and reading. The RAM 103 is large in memory capacity than the cache memory 111. In practice, the RAM 103 has also a limitation on memory capacity. For convenience of explanation, the RAM 103 has a sufficiently large memory capacity and the memory capacity limitation is not particularly considered.

The cache memory 111 inputs and outputs programs and data at a high speed. However, the cache memory 111 has difficulty in storing all software programs, such as the software encoder and the software decoder, and data because of the limitation thereof on memory capacity. On the other hand, the RAM 103 can store any software program and data but the data rate thereof is low.

The CPU 101 loads the program and data onto one of the cache memory 111 thereof and the RAM 103, and performs the encoding process and the decoding process using the program and data.

The bus 104 is connected to an input-output interface 120. Also connected to the input-output interface 120 are an input unit 121 including a keyboard, a mouse, etc., an output unit 122 including a display such as a cathode ray tube (CRT) or a liquid-crystal display (LCD), and a loudspeaker, a storage unit 123 including a hard disk, and a communication unit 124 including a modem. The communication unit 124 performs a communication process via a network such as the Internet.

A drive 125 is connected to the input-output interface 120, as necessary. A removable medium 131, such as a magnetic disk, an optical disk, a magneto-optical disk or a semiconductor memory, is loaded onto the drive 125. A software program read from the removable medium 131 is installed onto the storage unit 123, as necessary. The software program can be installed onto the storage unit 123 via the communication unit 124.

As shown in FIG. 10, the personal computer 100 includes four CPUs 101. But any number of CPUs 101 may be used. However, there is a limitation on the minimum number of CPUs 101 depending on how the software encoder and software decoder to be discussed later are installed. Two CPUs 101 may be used or four CPUs 101 may be used. One CPU 101 may include four CPUs 101-1 through 101-4 having respectively four cores. In such a case, each CPU core (CPUs 101-1 through 101-4) may be accompanied by the cache memories 111-1 through 111-4, respectively. A single cache memory 111 shared by the CPU cores may include regions assigned the cache memories 111-1 through 111-4 respectively for the CPU cores.

The encoder 10 of FIG. 1 and the decoder 20 of FIG. 6 are installed on the personal computer 100 in a manner such that process efficiency is not reduced and that delay time is not increased. To this end, hardware resources of the personal computer 100 including the CPU 101 and the RAM 103 need to be allocated to each process of the encoder 10 and the decoder 20. Allocation examples are described below.

Figure 11:
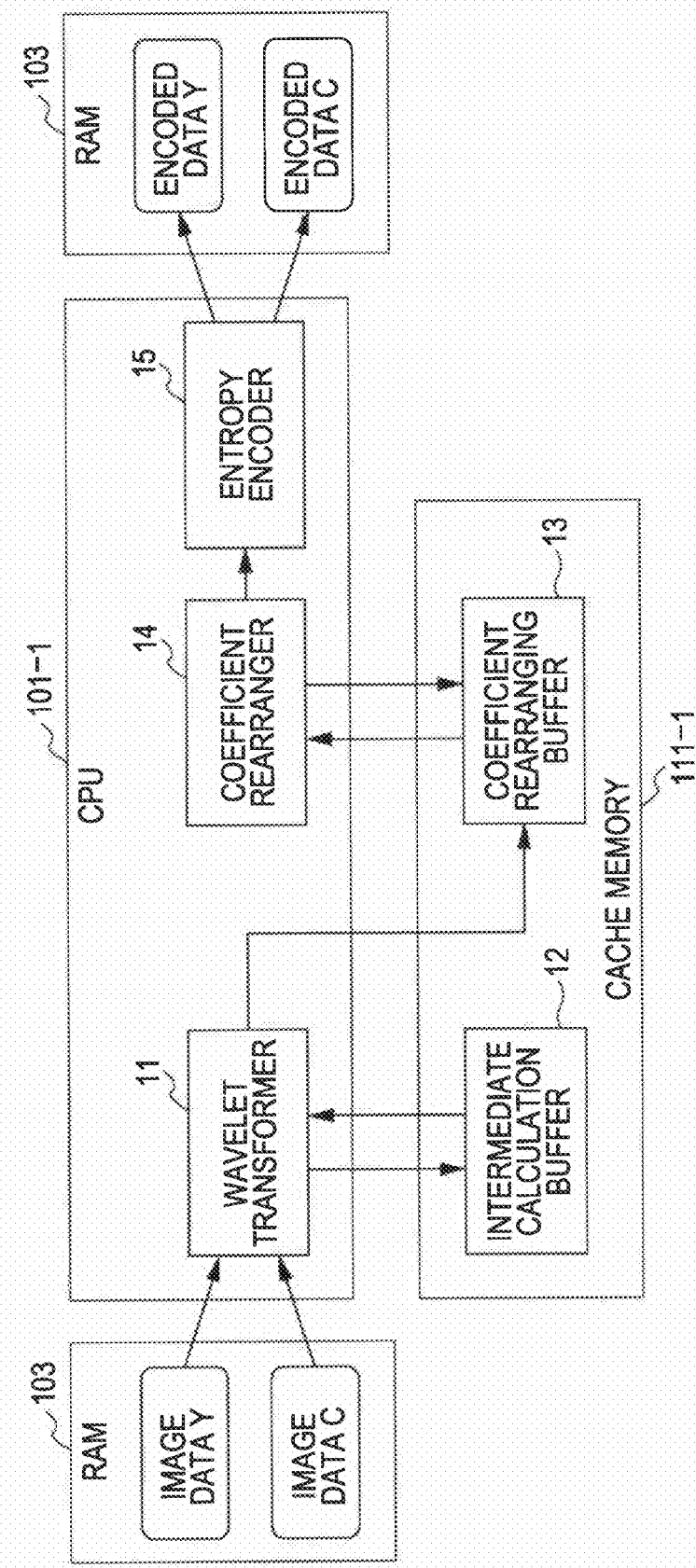
FIG. 11 illustrates an allocation of a hardware resource to the encoder.

FIG. 11 illustrates an allocation example of the hardware resource to the encoder 10 of FIG. 1. As shown in FIG. 11, the CPU 101-1 is allocated to all the processes of the wavelet transformer 11, the coefficient rearranger 14 and the entropy encoder 15 in the encoder 10. The intermediate calculation buffer 12 and the coefficient rearranging buffer 13 are arranged in the cache memory 111-1.

A software program performing the process of each of the wavelet transformer 11, the coefficient rearranger 14 and the entropy encoder 15 is loaded onto the cache memory 111-1. The CPU 101-1 reads and executes a function of the software program from the cache memory 111-1.

Image data Y to be encoded as a luminance component of the image data and image data C to be encoded as a color difference component are stored on the RAM 103. The color component includes Cb and Cr. For simplicity of explanation, Cb and Cr are represented by C. A YC (YCbCr) component containing the luminance component Y and the color difference component C is described below. The same discussion is also applicable to the case of RGB components containing an R component, a G component and a B component.

As shown in FIG. 11, the image data Y and the image data C are encoded by the CPU 101-1. More specifically, the wavelet transformer 11 in the CPU 101-1 performs a wavelet transform process by reading the image data Y from the PAM 103. The CPU 101-1 uses a portion of the storage area of the cache memory 111-1 as the intermediate calculation buffer 12, i.e., stores intermediate data (for example, a low-frequency component at an intermediate segmentation level) on the intermediate calculation buffer 12. The intermediate data is generated in a vertical analysis filtering operation and a horizontal analysis filtering operation in the wavelet transform. The CPU 101-1 uses another portion of the storage area of the cache memory 111-1 as the coefficient rearranging buffer 13 and stores coefficient data generated in the wavelet transform on the coefficient rearranging buffer 13.

The CPU 101-1 causes the coefficient rearranger 14 thereof to rearrange and read the coefficient data stored on the coefficient rearranging buffer 13 in the cache memory 111-1. The CPU 101-1 causes the entropy encoder 15 to encode the coefficient data that has been rearranged and read from the cache memory 111-1 by the coefficient rearranger 14. The CPU 101-1 thus generates the image data Y. The CPU 101-1 supplies the generated image data Y to the RAM 103 for storage.

The CPU 101-1 performs on the image data C a process similar to the process performed on the image data Y.

When the encoder 10 is installed onto the personal computer 100 as shown in FIG. 11, all processes of the encoder 10 are performed by a single CPU 101. The intermediate data and the coefficient data of the wavelet transform, generated in the middle of the encoding process, are all stored on the cache memory 111 in the CPU 101.

The remaining CPUs 101-2 through 101-4 may also be allocated to the encoder 10 as the CPU 101-1. More specifically, in the same manner as the CPU 101-1 of FIG. 11, a software program for performing the process of each of the wavelet transformer 11, the coefficient rearranger 14 and the entropy encoder 15 may be loaded onto each of the remaining CPUs 101-2 through 101-4. The CPUs 101-2 through 101-4 read and execute respective programs from the respective cache memories 111, thereby executing the process of each of the wavelet transformer 11, the coefficient rearranger 14 and the entropy encoder 15 in the encoder 10. As the cache memory 111-1, each of the cache memories 111-2 through 111-4 forms the intermediate calculation buffer 12 and the coefficient rearranging buffer 13.

Figure 12:
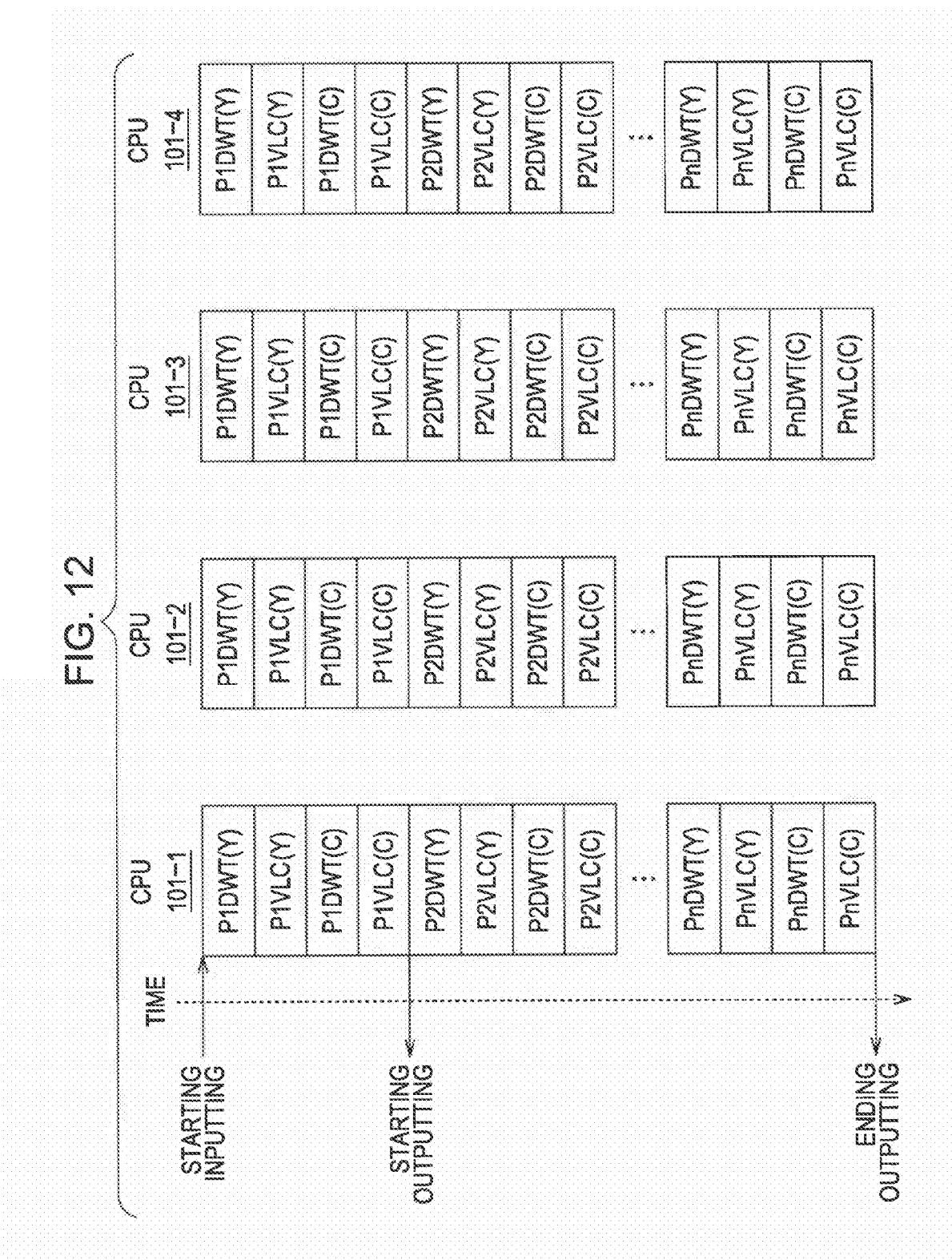
FIG. 12 diagrammatically illustrates the flow of the process of FIG. 11.

The CPUs 101-1 through 101-4 form four encoders 10. Encoding processes of moving image data to be encoded are assigned to the encoders 10 on a per picture basis. The CPUs 101-1 through 101-4 perform in parallel the encoding processes thereof on different pictures. FIG. 12 diagrammatically illustrates the flow of the process.

In FIG. 12, an arrow-headed broken line looking downward represents the flow of time and each process performed by each CPU is represented a rectangle.

As shown in FIG. 12, the CPU 101-1 reads from the RAM 103 the image data Y as the luminance component Y of a first precinct of a leading picture. The CPU 101-1 performs the wavelet transform (P1DWT(Y)) on the image data Y while storing the intermediate data on the cache memory 111-1. The CPU 101-1 causes the cache memory 111-1 to store resulting coefficient data. The CPU 101-1 performs an order rearrangement process and an entropy encoding process on the coefficient data (P1VLC(Y)). The encoded data Y resulting from the entropy encoding process is stored on the RAM 103. The CPU 101-1 reads from the RAM 103 the image data C as the color difference component C of the first precinct (P1). The CPU 101-1 performs the wavelet transform on the image data C (P1DWT(C)) while causing the cache memory 111-1 to store the intermediate data. After causing the cache memory 111-1 to store the resulting coefficient data, the CPU 101-1 performs a coefficient rearrangement process and an entropy encoding process on the coefficient data (P1VLC(C)). The encoded data C resulting from the entropy encoding process is stored on the RAM 103.

The RAM 103 stores the encoded data Y and the encoded data C of at least one precinct, and the CPU 101-1 starts outputting the encoded data Y and the encoded data C.

The wavelet transformer 11 through the entropy encoder 15, formed by the CPU 101-1 and the cache memory 111-1, perform similar processes to both the image data Y and the image data C and then store data. In other words, the CPU 101-1 and the cache memory 111-1 perform the similar processes to each of the image data Y and the image data C and stores the resulting data.

Upon completing the process to the first precinct, the CPU 101-1 reads from the RAM 103 the image data Y of a second precinct (P2) of the leading picture. The CPU 101-1 performs the wavelet transform on the image data Y while storing the intermediate data on the cache memory 111-1 (P2DWT(Y)). After causing the cache memory 111-1 to store the resulting coefficient data, the CPU 101-1 performs a coefficient rearrangement process and an entropy encoding process on the coefficient data (P2VLC(C)). The encoded data C resulting from the entropy encoding process is stored on the RAM 103 and then output. The CPU 101-1 reads from the RAM 103 the image data C of the second precinct (P2) and performs the wavelet transform on the image data C while storing the intermediate data on the cache memory 111-1 (P2DWT(C)). After causing the cache memory 111-1 to store the resulting coefficient data, the CPU 101-1 performs an order rearrangement process and an entropy encoding process on the coefficient data (P2VLC(C)). The encoded data C resulting from the entropy encoding process is stored on the RAM 103 and then output.

The CPU 101-1 performs the same process on a third precinct and subsequent precincts of the leading picture. The CPU 101-1 then performs the wavelet transform, the coefficient rearrangement process and the entropy encoding process on each of the image data Y and the image data C of a last n-th precinct (Pn) (PnSWT(Y), PnVLC(Y), PnDWT(C), and PnVLC(C)). The resulting encoded data Y and encoded data C are stored on the RAM 103 and then output. When the encoded data C of the n-th precinct is output, all encoded data of the leading picture has been output. The outputting of the encoded data of the leading picture has been thus completed.

As shown in FIG. 12, the CPU 101-2, the CPUs 101-3 and 101-4 perform similar processes respectively on a second picture, a third picture and fourth picture in parallel with the CPU 101-1. More specifically, the CPU 101-2, the CPUs 101-3 and 101-4 perform the wavelet transform, the coefficient rearrangement process and the entropy encoding process on the first precinct to the n-th precinct of the first through fourth picture in a manner similar to the process of the CPU 101. The encoded data Y and the encoded data C are thus generated from the image data Y and the image data C respectively and then stored on the RAM 103.

As the CPU 101-1 and the cache memory 111-1, the CPU 101-2 and the cache memory 111-2, the CPU 101-3 and the cache memory 111-3 and the CPU 101-4 and the cache memory 111-4 perform the encoding process to each of the image data Y and the image data C and then store data.

Upon completing the process to the leading picture, the CPU 101-1 performs the encoding process on a fifth picture. In parallel with the process of the CPU 101-1, the CPU 101-2 through the CPU 101-4 performs the encoding process on a sixth through eighth pictures, respectively. A ninth picture and subsequent pictures are processed in the same manner.

In the allocation of FIG. 11, the encoder 10 performs concurrently the encoding process on the four pictures, and no CPU switching is required in a series of encoding process steps. The encoding process is performed with the cache memory 111 but without the RAM 103. The wavelet transformer 11 and the coefficient rearranger 14 can perform data writing and reading at a high speed to the intermediate calculation buffer 12 and the coefficient rearranging buffer 13, respectively. With such a hardware resource allocation, the encoder 10 encodes the image data at a high speed. In other words, the allocation method of FIG. 11 allows the encoder 10 to encode the image data at a high throughput. The encoder 10 may be incorporated in the personal computer 100 regardless of the number of CPUs 101 (even a single CPU 101 is acceptable).

The cache memory 111 has a limitation on an amount of storage data because of the small memory capacity thereof. Depending on the content and data size of the image data to be encoded, an overflow occurs on the cache memory 111. The allocation of FIG. 11 may not be applicable if an amount of data to be buffered in the encoding process is excessively large.

Both the image data Y and the image data C are encoded by the single CPU 101. A period of time from the start of the encoding process to the outputting of the encoded data from the encoder 10, namely, a delay time in the encoding process is long. A delay time from the start of decoding of the encoded data at the decoder 20 to the displaying of restored image data on a monitor also becomes long. For the same reason, a period of time before the displaying of the leading picture on the monitor is also long.

Figure 13:
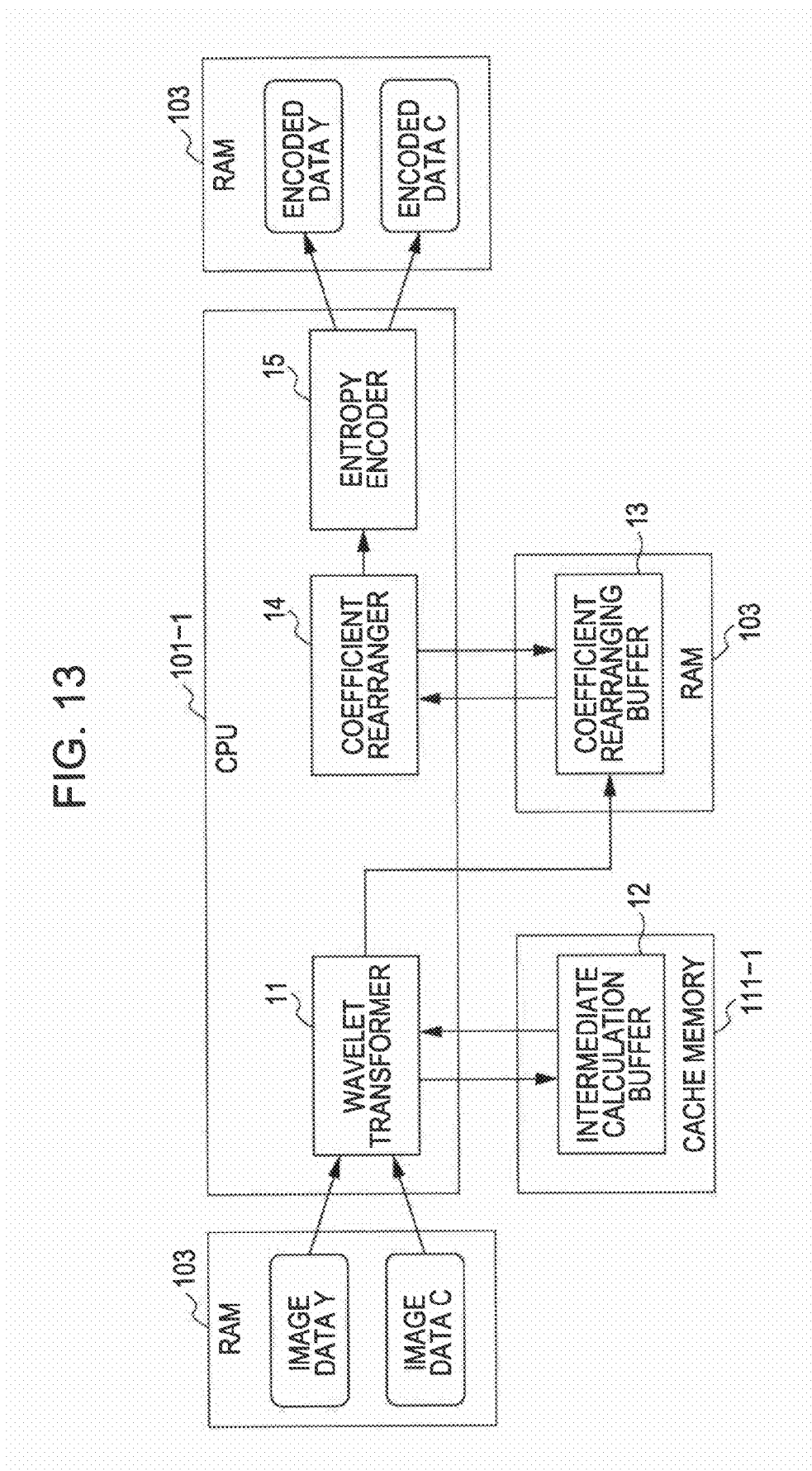
FIG. 13 illustrates another example of allocation of the hardware resource to the encoder.

FIG. 13 illustrates another example of the hardware resource allocation to the encoder 10 of FIG. 1. As in the case of FIG. 11, the CPU 101-1 is allocated to all processes of the wavelet transformer 11, the coefficient rearranger 14 and the entropy encoder 15 in the encoder 10. The intermediate calculation buffer 12 is formed in the cache memory 111-1 but the coefficient rearranging buffer 13 is formed in the RAM 103.

A software program performing the process of each of the wavelet transformer 11, the coefficient rearranger 14 and the entropy encoder 15 is loaded on the cache memory 111-1. The CPU 101-1 performs the software program by reading a function of the software program.

As in FIG. 11, the CPU 101-1 encodes the image data Y and the image data C in FIG. 13. More specifically, the CPU 101 performs the process of the wavelet transformer 11, thereby reading the image data Y from the RAM 103 and performing the wavelet transform. The CPU 101-1 uses a portion of the storage area of the cache memory 111-1 as the intermediate calculation buffer 12. The CPU 101-1 causes the intermediate calculation buffer 12 to store intermediate data (for example, a low-frequency component at an intermediate segmentation level) generated in a vertical analysis filtering operation and a horizontal analysis filtering operation in the wavelet transform.

Unlike the case of FIG. 11, the CPU 101-1 uses a portion of the storage area of the RAM 103 as the coefficient rearranging buffer 13 and causes the coefficient rearranging buffer 13 to store the coefficient data generated in the wavelet transform as shown in FIG. 13.

The CPU 101-1 performs the process of the coefficient rearranger 14, thereby rearranging in a predetermined order the coefficient data stored on the coefficient rearranging buffer 13 in the RAM 103 and then reading the rearranged coefficient data. The CPU 101-1 performs the process of the entropy encoder 15, thereby encoding the coefficient data rearranged by the coefficient rearranger 14 and read from the RAM 103. The encoded data Y is thus generated. The CPU 101-1 supplies the generated encoded data to the RAM 103 for storage.

The CPU 101-1 performs on the image data C a process similar to the process performed on the image data Y.

When the encoder 10 is installed on the personal computer 100 as shown in FIG. 13, all processes of the encoder 10 are performed by a single encoder 10. The information of the wavelet transform generated in the middle of the encoding process is stored on the fast operating the cache memory 111 of the CPU 101 and the coefficient data generated in the wavelet transform is stored on the RAM 103.

For example, the remaining CPUs 101-2 through 101-4 may be allocated to the encoder 10. In the same manner as illustrated in FIG. 13, the software program for performing the process of each of the wavelet transformer 11, the coefficient rearranger 14 and the entropy encoder 15 is loaded onto each of the cache memories 111-2 through 111-4. The CPUs 101-2 through 101-4 read and perform the software programs thereof from the respective cache memories 111, thereby performing the processes of the wavelet transformer 11, the coefficient rearranger 14 and the entropy encoder 15 in the encoder 10. As the cache memory 111-1, each of the cache memories 111-2 through 111-4 contains the intermediate calculation buffer 12 therein, and the coefficient rearranging buffer 13 is formed in the RAM 103.

The CPUs 101-1 through 101-4 form four encoders 10. The moving image data to be encoded is allocated to the encoder 10 on a per picture basis. The CPUs 101-1 through 101-4 perform in parallel the encoding processes thereof on different pictures. The flow of the process in this case is also diagrammatically illustrated in FIG. 12.

In the allocation of FIG. 13, the coefficient rearranging buffer 13 is formed in the RAM 103. A larger portion of the storage area of the cache memory 111 than in the allocation of FIG. 11 is used as the coefficient intermediate calculation buffer 12. In other words, the intermediate calculation buffer 12 has a larger memory capacity. The coefficient rearranging buffer 13 can also be enlarged in memory capacity. The encoder 10 in the allocation of FIG. 13 controls a buffer overflow more than in the allocation of FIG. 11. The encoder 10 in the allocation of FIG. 13 is applicable to a wider range of applications.

However, the coefficient rearranging buffer 13 is constructed of a portion of the RAM 103 that operates at a speed slower than the cache memory 111 in writing and reading. The throughput of the allocation of FIG. 13 is lower than the throughput of the allocation of FIG. 11. Since the intermediate calculation buffer 12 performing frequently data writing and reading is formed in the fast operating the cache memory 111, a drop in the throughput is marginal.

Figure 14:
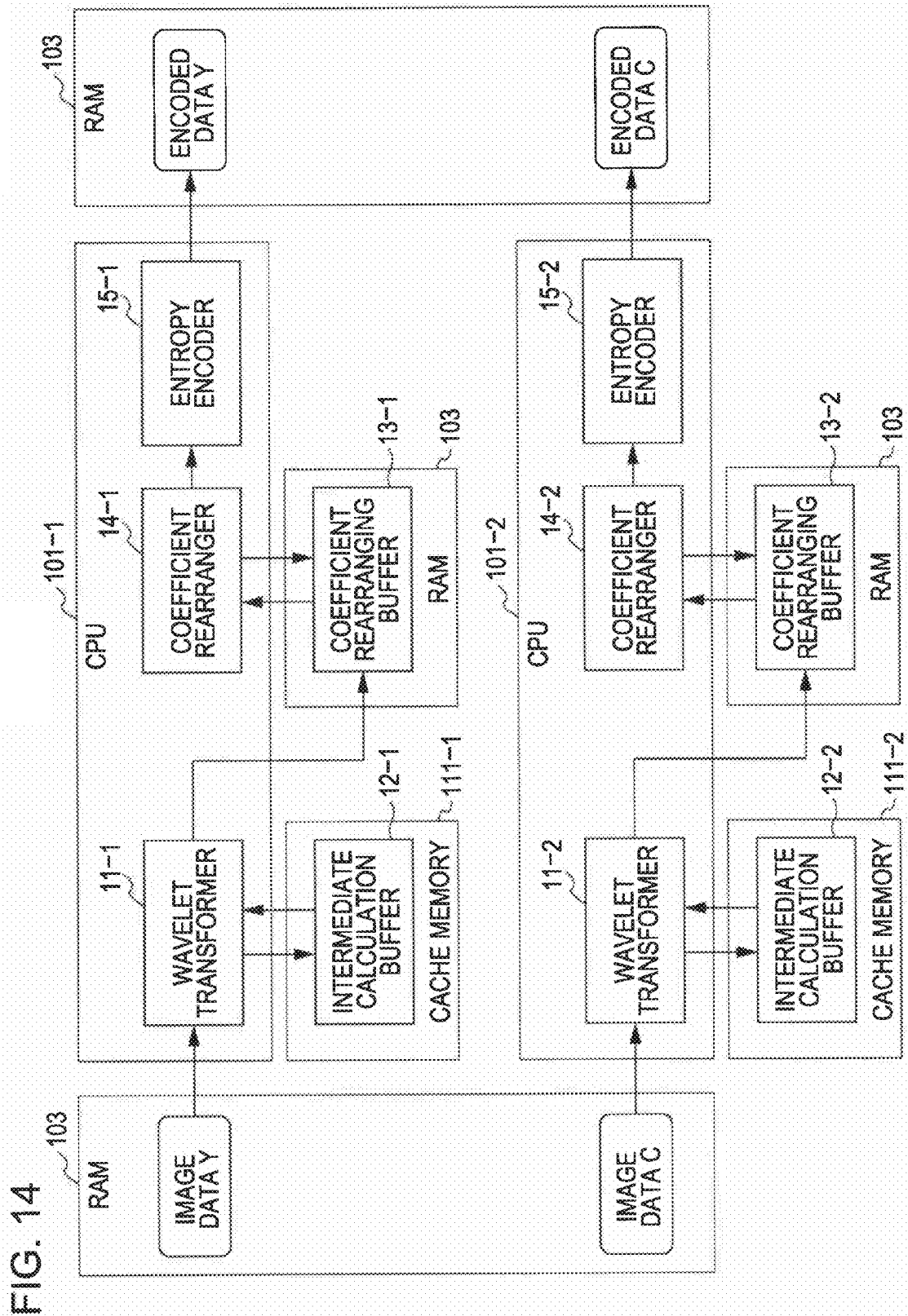
FIG. 14 illustrates yet another example of allocation of the hardware resource to the encoder.

FIG. 14 illustrates another example of the allocation of the hardware resource to the encoder 10 of FIG. 1. As shown in FIG. 14, different CPUs are allocated to an encoder encoding the image data Y and an encoder encoding the image data C. More specifically, the CPU 101-1 is allocated to all processes of the wavelet transformer 11-1, the coefficient rearranger 14-1 and the entropy encoder 15-1 in the encoder encoding the image data Y. An intermediate calculation buffer 12-1 is formed in the cache memory 111-1 and a coefficient rearranging buffer 13-1 is formed in the RAM 103. The CPU 101-2 is allocated to a wavelet transformer 11-2, a coefficient rearranger 14-2 and an entropy encoder 15-2 in the encoder encoding the image data C. An intermediate calculation buffer 12-2 is formed in a cache memory 111-2 and a coefficient rearranging buffer 13-2 is formed in the RAM 103.

The software program for performing the process of each of the wavelet transformer 11, the coefficient rearranger 14 and the entropy encoder 15 is loaded to each of the cache memory 111-1 and the cache memory 111-2. The CPU 101-1 and the CPU 101-2 read the software programs respectively from the cache memory 111-1 and the cache memory 111-2 and perform functions of the software programs.

As shown in FIG. 14, the CPU 101-1 encodes the image data Y and the CPU 101-2 encodes the image data C. In the same way as in the allocation of FIG. 13, the CPU 101-1 performs the process of the wavelet transformer 11-1, thereby reading the image data Y from the RAM 103 and performing the wavelet transform on the read image data Y. The CPU 101-1 uses a portion of the storage area of the cache memory 111-1 as the intermediate calculation buffer 12 and causes the intermediate calculation buffer 12 to store the intermediate data generated in each of the vertical analysis filtering operation and the horizontal analysis filtering operation in the wavelet transform.

In the same way as in the allocation of FIG. 13, the CPU 101-1 uses a portion of the storage area of the RAM 103 as the coefficient rearranging buffer 13 and causes the coefficient rearranging buffer 13 to store the coefficient data generated in the wavelet transform. The CPU 101-1 performs the process of the coefficient rearranger 14, thereby rearranges the coefficient data stored on the coefficient rearranging buffer 13 in the RAM 103 in a predetermined order while reading the rearranged coefficient data. The CPU 101-1 performs the process of the entropy encoder 15, thereby encoding the coefficient data rearranged in order by the coefficient rearranger 14 and read from the RAM 103. The encoded data Y is thus generated. The CPU 101-1 supplies the generated encoded data Y to the RAM 103 for storage.

The allocation of FIG. 14 is different from the allocation of FIG. 13 in that the CPU 101-2 performs on the image data C the wavelet transform, the coefficient rearrangement process and the entropy encoding process in parallel with the process of the CPU 101-1.

When the encoder 10 is installed on the personal computer 100 as shown in FIG. 14, all processes of the encoder 10 on the image data Y and the image data C are respectively performed by two different CPUs 101. The intermediate data of the wavelet transform generated in the middle of the encoding process is stored on the cache memory 111 of the respective CPU 101. The coefficient data generated in the wavelet transform is stored together on the RAM 103. In other words, the two CPUs are used as a set to perform the encoding process.

The remaining CPUs 101-3 and 101-4 may be allocated to the encoder 10 in a manner similar to the way the CPU 101-1 and the CPU 101-2 are allocated. As in the allocation of FIG. 14, the software program for performing the process of each of the wavelet transformer 11, the coefficient rearranger 14 and the entropy encoder 15 is loaded onto each of the cache memories 111-3 through 111-4. The CPUs 101-3 and 101-4 read the software programs thereof from the respective cache memories 111, thereby performing the processes of the wavelet transformer 11, the coefficient rearranger 14 and the entropy encoder 15 in the encoder 10. The intermediate calculation buffer 12-1 for the image data Y is then formed in the cache memory 111-3 and the intermediate calculation buffer 12-2 for the image data C is formed in the cache memory 111-4. The coefficient rearranging buffer 13-1 for the image data Y and the coefficient rearranging buffer 13-2 for the image data C are formed in the RAM 103.

Figure 15:
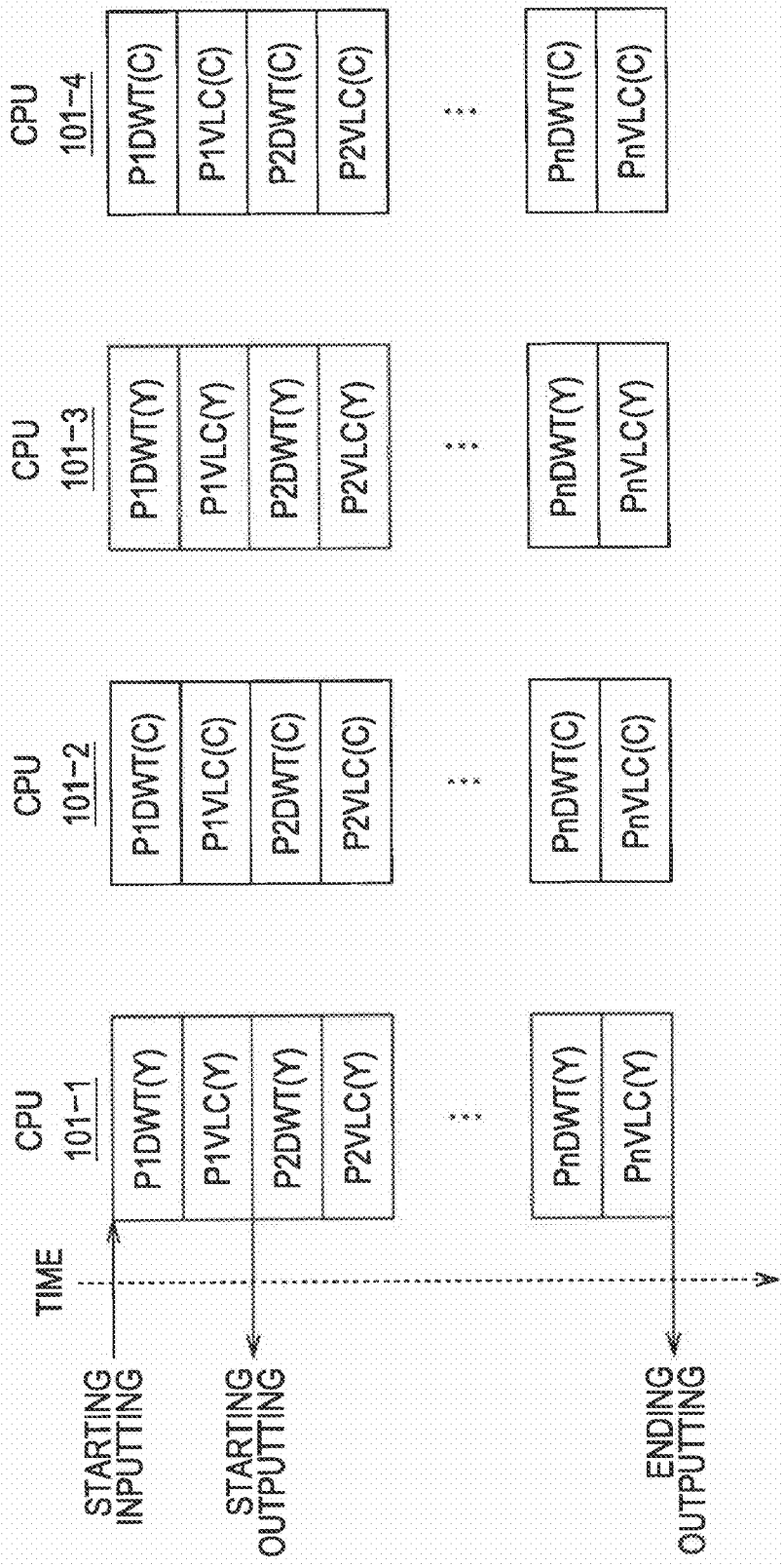
FIG. 15 diagrammatically illustrates the flow of the process of FIG. 14.

In this case, the CPUs 101-1 through 101-4 form two encoders 10. The encoding processes are allocated to the encoders 10 on a per picture basis in the moving image data to be encoded. For example, the CPU 101-1 and the CPU 101-2 performs the encoding process on odd-numbered pictures and the CPUs 101-3 and 101-4 perform the encoding process on even-numbered pictures. FIG. 15 illustrates the flow of the process in such a case.

As shown in FIG. 15, the CPU 101-1 reads from the RAM 103 the image data Y as the luminance component Y of the leading precinct (P1) of the leading picture. The CPU 101-1 performs the wavelet transform (P1DWT(Y)) on the image data Y while storing the intermediate data on the cache memory 111-1. The CPU 101-1 causes the cache memory 111-1 to store resulting coefficient data. The CPU 101-1 performs an order rearrangement process and an entropy encoding process on the coefficient data (P1VLC(Y)). The encoded data Y resulting from the entropy encoding process is stored on the RAM 103. The CPU 101-2 reads from the RAM 103 the image data C as the color difference component C of the leading precinct (P1). The CPU 101-2 performs the wavelet transform on the image data C (P1DWT(C)) while causing the cache memory 111-2 to store the intermediate data. After causing the RAM 103 to store the resulting coefficient data, the CPU 101-1 performs a coefficient rearrangement process and an entropy encoding process on the coefficient data (P1VLC(C)). The encoded data C resulting from the entropy encoding process is stored on the RAM 103.

When the CPU 101-1 and the CPU 101-2 completes the entropy encoding process on the leading precinct, the encoder 10 stores encoded data of at least one precinct (including the encoded data Y and the encoded data C). The encoder 10 can thus output the encoded data.

Similarly, the CPU 101-1 encodes the encoded data Y of the second and subsequent precincts. In parallel, the CPU 101-2 encodes the image data C. The image data Y and the image data C of the last n-th precinct (Pn) are encoded. When the encoded data Y and the encoded data C of the n-th precinct is output, all encoded data of the leading picture has been output. The outputting of the encoded data of the leading picture has been completed.

As shown in FIG. 15, the CPUs 101-3 and 101-4 perform on a second picture the encoding process similar to the process of the CPU 101-1 and the CPU 101-2 in parallel with the CPU 101-1 and the CPU 101-2. More specifically, the CPU 101-3 encodes the image data Y of the second picture and the CPU 101-4 encodes the image data C of the second picture.

Upon completing the process to the leading picture, the CPU 101-1 and the CPU 101-2 performs a decoding process on a third picture. In parallel with the CPU 101-1 and the CPU 101-2, the CPUs 101-3 and 101-4 performs the decoding process on a fourth picture. A fifth and subsequent pictures are also similarly processed.

In the allocation of FIG. 14, the image data Y and the image data C are encoded in parallel. The start timing of the encoded data, namely, the output timing of the encoded data Y and the encoded data C of the leading precinct are set to be earlier than in the allocations of FIGS. 11 and 13. The delay time in the encoding process is thus reduced. For the same reason, the allocation of FIG. 14 completes the encoding of the leading picture earlier than the allocations of FIG. 11 and FIG. 13. When the data encoded in the encoder 10 is successively decoded by the decoder 20 and the restored image data is displayed on the monitor, the delay time from the start of encoding to the start of displaying the leading picture on the monitor is shorter in the allocation of FIG. 14 than in the allocations of FIGS. 11 and 13.

In the same way as in the allocation of FIG. 13, the intermediate calculation buffer 12 is formed in the cache memory 111 and the coefficient rearranging buffer 13 is formed in the RAM 103. The memory capacity of each of the intermediate calculation buffer 12 and the coefficient rearranging buffer 13 is set to be larger than in the allocation of FIG. 11. Buffer overflow is thus controlled and a drop in the throughput is reduced.

The intermediate data of the wavelet transform of the image data Y and the intermediate data of the wavelet transform of the image data C are stored in different cache memories 111 in FIG. 14. The memory capacity of the intermediate calculation buffer 12 can be set to be larger than in the allocation of FIG. 13. Buffer overflow is controlled more.

In practice, however, the image data Y is larger in an amount of information and more complex than the image data C. Time to complete the encoding process on the image data Y is longer. A waiting time occurs on the CPU 101-2 and the usage efficiency of the CPU 101 is lower than in the allocation of FIG. 13. The allocation of FIG. 14 is lower in throughput than the allocation of FIG. 13.

Figure 16:
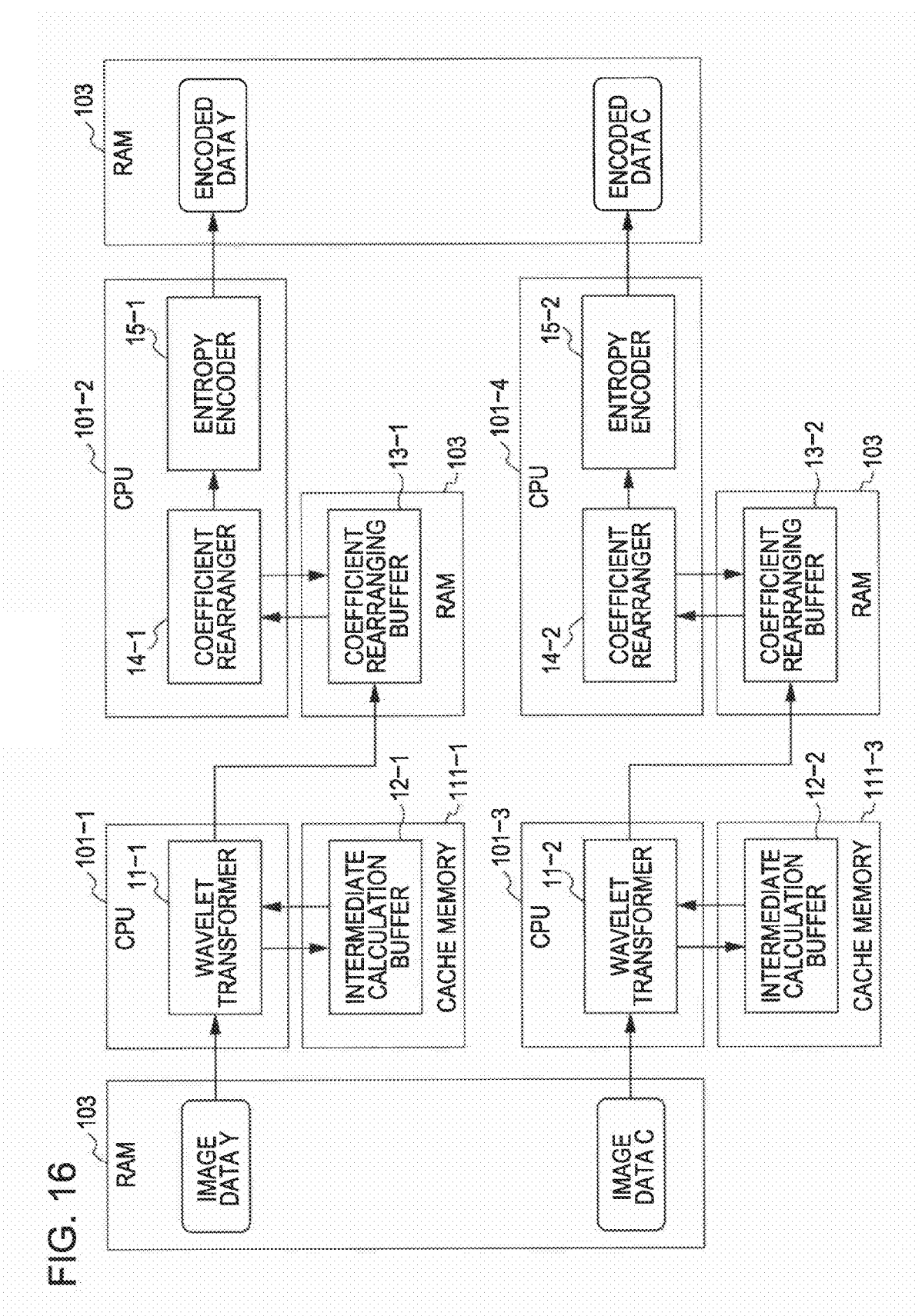
FIG. 16 illustrates yet another example of the allocation of the hardware resource to the encoder.

FIG. 16 illustrates another example of the hardware resource allocation to the encoder 10 of FIG. 1. As shown in FIG. 16, different CPUs 101 are allocated to the wavelet transformer 11, the coefficient rearranger 14 and the entropy encoder 15.

More specifically, the CPU 101-1 is allocated to the wavelet transformer 11-1 performing the wavelet transform on the image data Y, the CPU 101-2 is allocated to the coefficient rearranger 14-1 performing the coefficient rearrangement process on the coefficient data of the image data Y and the entropy encoder 15-1 performing the entropy encoding process on the coefficient data of the image data Y. The intermediate calculation buffer 12-1 is formed in the cache memory 111-1 in the CPU 101-1, and the coefficient rearranging buffer 13-1 is formed in the RAM 103.

Similarly, the CPU 101-3 is allocated to the wavelet transformer 11-2 performing the wavelet transform on the image data C. The CPU 101-4 is allocated to the coefficient rearranger 14-2 performing the coefficient rearrangement process on the coefficient data of the image data C and the entropy encoder 15-2 performing the entropy encoding process on the coefficient data of the image data C. The intermediate calculation buffer 12-2 is formed in the cache memory 111-3 in the CPU 101-3. The coefficient rearranging buffer 13-2 is formed in the RAM 103.

The software program performing the process of the wavelet transformer 11 is loaded onto each of the cache memory 111-1 and the cache memory 111-3. The software program performing the process of each of the coefficient rearranger 14 and the entropy encoder 15 is loaded onto each of the cache memory 111-2 and the cache memory 111-4. The CPUs 101-1 through 101-4 read functions of the software programs from the respective cache memories 111 and execute the software programs.

As shown in FIG. 16, the image data Y is encoded by the CPU 101-1 and the CPU 101-2 and the image data C is encoded by the CPUs 101-3 and 101-4. More specifically, the CPU 101-1 performs the process of the wavelet transformer 11-1, thereby reading the image data Y from the RAM 103 and performing the wavelet transform on the read image data Y. The CPU 101-1 uses part or whole of the storage area of the of the cache memory 111-1 as the intermediate calculation buffer 12-1 and causes the intermediate calculation buffer 12-1 to store the intermediate data generated in the horizontal analysis filtering operation and the vertical analysis filtering operation in the wavelet transform.

In the same way as shown in FIG. 14, the CPU 101-1 uses part or whole of the storage area of the RAM 103 as the coefficient rearranging buffer 13-1 and causes the coefficient rearranging buffer 13-1 to store the coefficient data generated in the wavelet transform.

Unlike in the allocation of FIG. 14, the CPU 101-2 performs the process of the coefficient rearranger 14-1, thereby rearranging in a predetermined order and reading the coefficient data stored on the coefficient rearranging buffer 13-1 in the RAM 103 in the allocation of FIG. 16. The CPU 101-2 performs the process of the entropy encoder 15-1, thereby encoding the coefficient data rearranged and read from the RAM 103 by the coefficient rearranger 14-1 and generating the encoded data Y. The CPU 101-2 supplies the generated encoded data Y to the RAM 103 for storage.

The CPUs 101-3 and 101-4 perform on the image data C the wavelet transform, the coefficient rearrangement process and the entropy encoding process as on the image data Y in parallel with the process of the CPU 101-1 and the CPU 101-2.

When the encoder 10 is installed on the personal computer 100, the encoding process is performed with the CPUs 101-1 through 101-4 handled as a set. The four CPUs 101-1 through 101-4 form a single encoder 10. The encoder 10 performs the encoding process on all pictures of the moving image data to be encoded. The flow of such a process is illustrated in FIG. 17.

Figure 17:
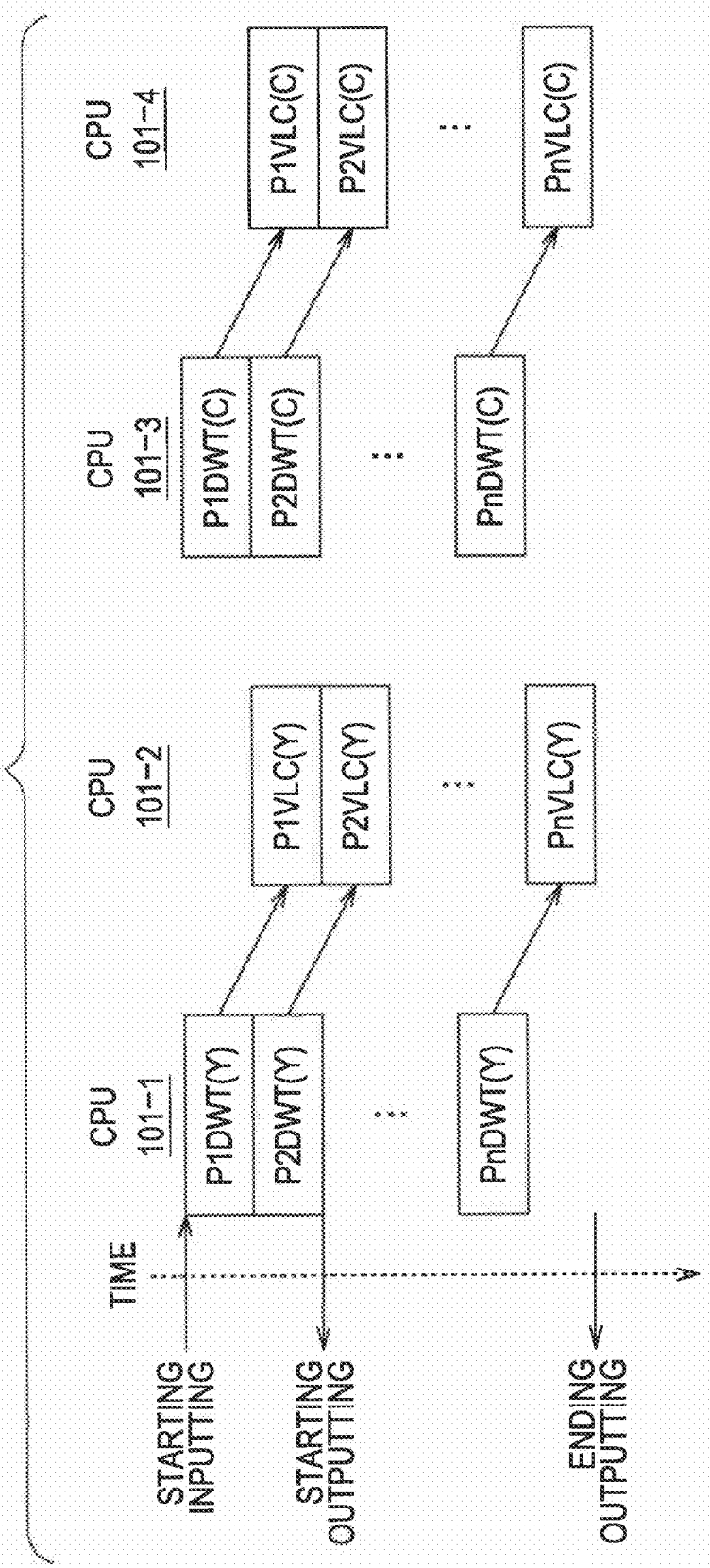
FIG. 17 diagrammatically illustrates the flow of the process of FIG. 16.

The CPUs 101-1 through 101-4, operating independently of each other, perform the processes thereof in parallel as shown in FIG. 17.

As shown in FIG. 17, the CPU 101-1 reads from the RAM 103 the image data Y of the first precinct (P1) of the leading picture. The CPU 101-1 performs the wavelet transform on the image data Y while storing the intermediate data on the cache memory 111-1 (P1DWT(Y)). The CPU 101-1 causes the RAM 103 to store resulting coefficient data.

Upon storing the coefficient data on the RAM 103, the CPU 101-1 reads from the RAM 103 the image data Y of a second precinct (P2) of the leading picture and performs the wavelet transform on the image data Y while storing the intermediate data onto the cache memory 111-1 (P2DWT(Y)). The resulting coefficient data is stored onto the RAM 103. In parallel with the process of P2DWT(Y) of the CPU 101-1, the CPU 101-2 reads the coefficient data of the first precinct (P1) from the RAM 103, and performs the order rearrangement process and the entropy encoding process on the read coefficient data (P1VLC(Y)). Upon storing the resulting encoded data Y onto the RAM 103, the CPU 101-2 reads from the RAM 103 the coefficient data of the second precinct (P2) and performs the order rearrangement process and the entropy encoding process on the read coefficient data (P2VLC(Y)).

The CPU 101-1 and the CPU 101-2 perform the wavelet transform, the coefficient rearrangement process and the entropy encoding process on the precincts with one precinct successively shifted in a manner such that one precinct is processed by the CPU 101-1 with a next precinct processed by the CPU 101-2. The wavelet transform, the coefficient rearrangement process and the entropy encoding process are also performed on the third and subsequent precincts in the same manner.

In parallel with the encoding process performed on the image data Y, the CPUs 101-3 and 101-4 process the image data C. More specifically, in parallel with the process of P1DWT(Y) of the CPU 101-1, the CPU 101-3 performs a process of P1DWT(C). In parallel with the process of P2DWT(Y) of the CPU 101-1, the CPU 101-3 performs a process of P2DWT(C) and the CPU 101-4 performs a process of P1VLC(C).

When the CPU 101-2 and the CPU 101-4 have completed the entropy encoding process on the first precinct, the encoder 10 stores on the RAM 103 the encoded data of at least one precinct (the encoded data Y and the encoded data C). The encoder 10 can thus start outputting the encoded data.

The CPU 101-1 and the CPU 101-2 also encodes the image data Y of the second and subsequent precincts in a similar fashion. In parallel, the CPUs 101-3 and 101-4 encode the image data C. The image data Y and the image data C of the n-th precinct (Pn) as a last precinct are encoded and the encoded data Y and the encoded data C are output. All encoded data of the leading picture is thus output.

The second picture is processed in a similar fashion.

In the allocation of FIG. 16, the output start timing of the encoded data is set to be as early as in the allocation of FIG. 14. The delay time is thus reduced. In the allocation of FIG. 16, the encoder 10 encodes faster, as shown in FIG. 17, the leading picture than in the allocation of FIG. 14. When the data encoded in the encoder 10 is successively decoded in the decoder 20 and the restored image data is displayed on the monitor, the delay time from starting the encoding process to displaying the leading picture is reduced.

In the same way as in the allocation of FIG. 13, the intermediate calculation buffer 12 is formed in the cache memory 111 and the coefficient rearranging buffer 13 is formed in the RAM 103. The intermediate calculation buffer 12 and the coefficient rearranging buffer 13 are set to be larger in memory capacity than in the allocation of FIG. 11. The occurrence of buffer overflow is controlled more and a drop in throughput is reduced.

In the allocations of FIG. 14 and FIG. 16, the intermediate data of the wavelet transform of the image data Y and the intermediate data of the wavelet transform of the image data C are stored on different cache memories 111. The intermediate calculation buffer 12 is set to be larger in memory capacity than the intermediate calculation buffer 12 in the allocation of FIG. 13. The occurrence of buffer overflow is controlled more.

In practice, however, the image data Y is larger in an amount of information and more complex than the image data C. Time to complete the encoding process on the image data Y is longer. A waiting time occurs on the CPUs 101-3 and 101-4. Since the CPUs 101 are switched in the middle of the encoding process, controlling the CPUs 101 becomes complex and a process time is prolonged. The usage efficiency of the CPU 101 is lower than in the allocation of FIG. 14. The allocation of FIG. 16 is even lower in throughput than the allocation of FIG. 14.

Each of the wavelet transform, the coefficient rearrangement process and the entropy encoding process is composed of a plurality of functions. It is possible to use a different CPU 101 for a process other than the wavelet transform and the coefficient rearrangement process. However, the use of different CPUs 101 does not serve to reduce the process time if the processes are not performed in parallel. It is difficult to permit method steps to be performed in parallel in each process of the wavelet transformer 11 in the encoder 10 of FIG. 1. The coefficient rearrangement process is to read the coefficient data from the coefficient rearranging buffer 13. If different CPUs 101 are allocated to the coefficient rearrangement process and the entropy encoding process, a transfer of the coefficient data between the CPUs 101 is needed. This leads to an inefficient process. It is thus preferable that the encoding process be divided as the wavelet transform, the coefficient rearrangement process and the entropy encoding process in the encoder 10.

For example, a CPU may be automatically allocated to a process in a computer in the related art. The CPU allocation may be performed depending on the workload status of the CPU. The process is not necessarily divided at an optimum position with the different CPUs allocated to separated jobs. This may substantially reduce the efficiency in the encoding process. By dividing the encoding process among the wavelet transform, the coefficient rearrangement process and the entropy encoding process as shown in FIG. 17, the encoder 10 can efficiently perform the encoding process.

The coefficient rearranging buffer 13-1 and the coefficient rearranging buffer 13-2 are formed in the RAM 103 with reference to FIG. 16. Alternatively, the coefficient rearranging buffer 13-1 may be formed in the cache memory 111-2 in the CPU 101-2. The coefficient rearranging buffer 13-2 may be formed in the cache memory 111-4 in the CPU 101-4.

Figure 18:
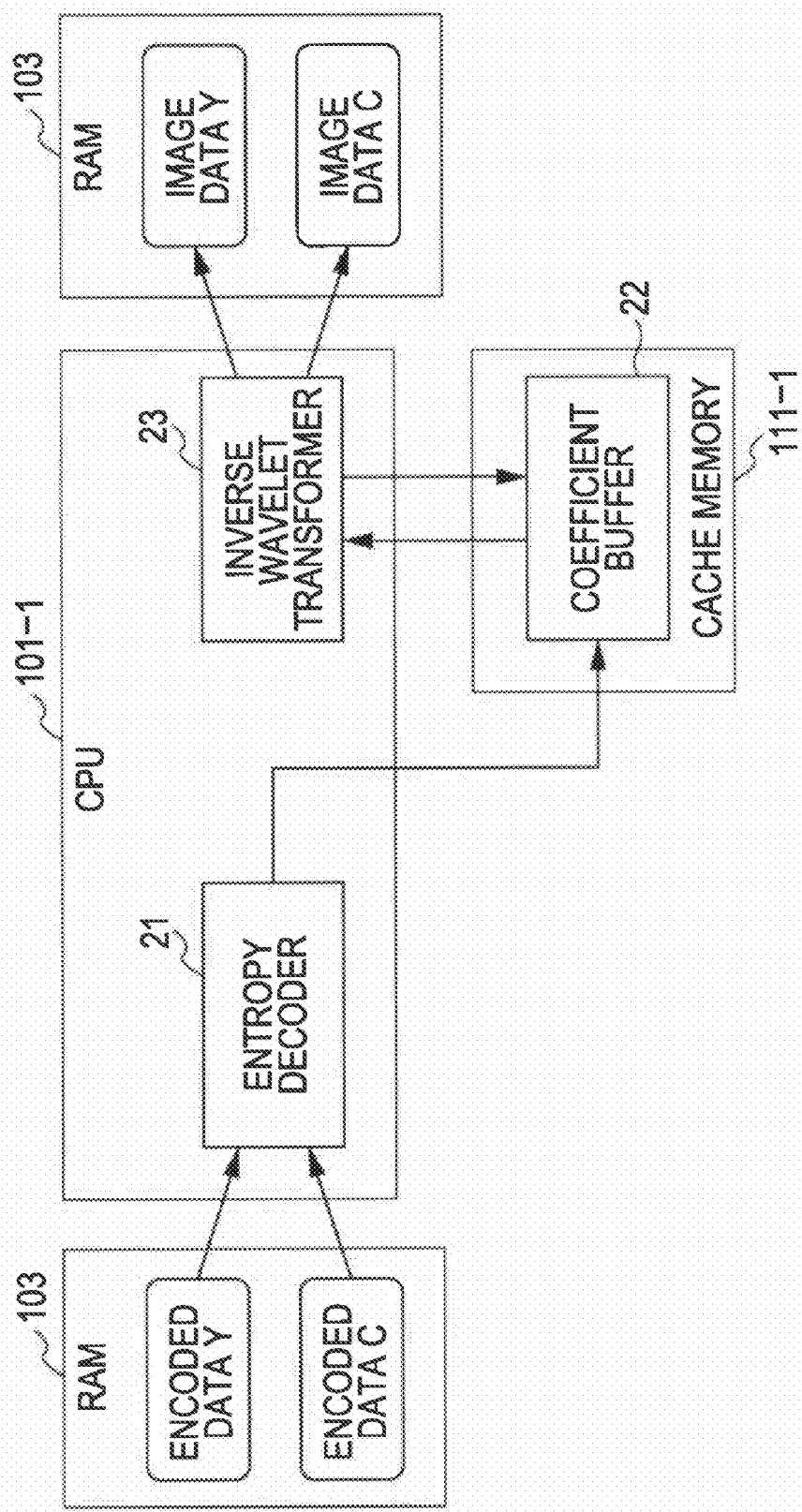
FIG. 18 diagrammatically illustrates an allocation of a hardware resource to the decoder.

FIG. 18 illustrates an example of the hardware resource allocation to the decoder 20 of FIG. 6. As shown in FIG. 18, like in the encoder 10 of FIG. 11, the CPU 101-1 is allocated to all processes of the entropy decoder 21 and the inverse wavelet transformer 23 in the decoder 20. The coefficient buffer 22 is formed in the cache memory 111-1.

A software program performing the process of each of the entropy decoder 21 and the inverse wavelet transformer 23 is loaded onto the cache memory 111-1. The CPU 101-1 reads a function of the software program from the cache memory 111-1 and performs the software program.

The image data Y and image data C to be decoded are stored on the RAM 103.

As shown in FIG. 18, both encoded data Y and the encoded data C are decoded by the CPU 101-1. The CPU 101-1 performs the process of the entropy decoder 21, thereby reading the encoded data Y from the RAM 103 and performing an entropy decoding process on the read encoded data Y. The CPU 101 uses part or whole of the storage area of the cache memory 111-1 as the coefficient buffer 22 and stores the coefficient data generated in the entropy decoding process onto the coefficient buffer 22.

The CPU 101-1 performs the process of the inverse wavelet transformer 23, thereby reading the coefficient data from the coefficient buffer 22 in the cache memory 111-1 and performing an inverse wavelet transform to decode the encoded data Y. The CPU 101-1 supplies the decoded image data Y to the RAM 103 for storage.

The CPU 101-1 decodes the image data C in a similar manner performed on the image data Y.

When the encoder 10 is installed onto the personal computer 100 as shown in FIG. 18, all processes of the decoder 20 are performed by a single CPU 101. The coefficient data generated in the entropy decoding process is stored onto the cache memory 111 in the CPU 101.

As the CPU 101-1, the remaining CPUs 101-2 through 101-4 may be allocated to the decoder 20. More specifically, as in the CPU 101-1 of FIG. 18, a software program performing the process of each of the entropy decoder 21 and the inverse wavelet transformer 23 is loaded to each of the cache memories 111-2 through 111-4. The CPUs 101-2 through 101-4 read the software programs from the cache memories 111 thereof, and perform the process of the entropy decoder 21 and the coefficient buffer 22 in the decoder 20. As in the cache memory 111-1, the coefficient buffer 22 is formed in each of the cache memories 111-2 through 111-4.

The CPUs 101-1 through 101-4 form four decoders 20. These decoders 20 decode respective pictures of image data prior to encoding. More specifically, the CPUs 101-1 through 101-4 performs the decoding processes on different pictures in parallel. The flow of such a process is diagrammatically illustrated in FIG. 19.

Figure 19:
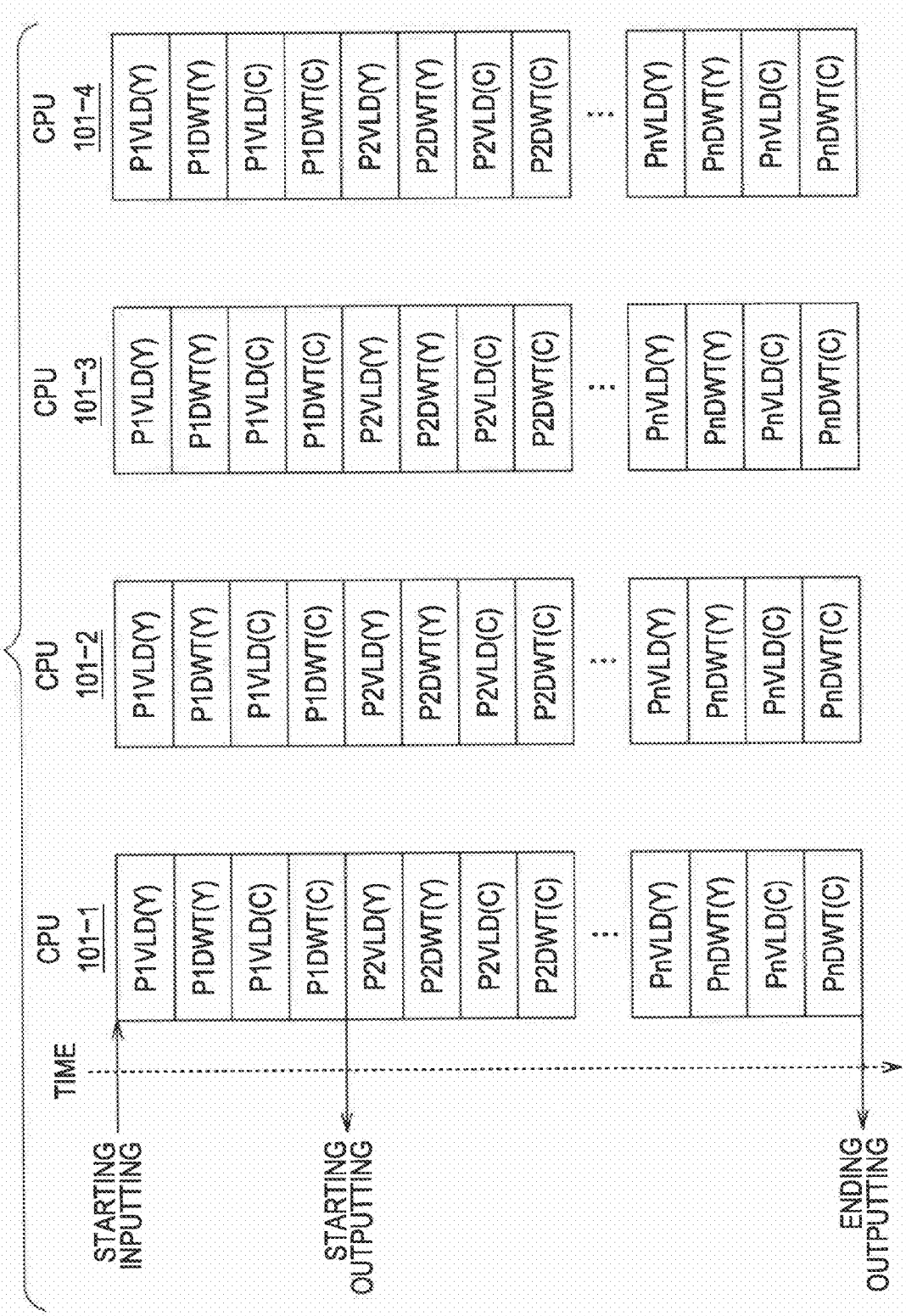
FIG. 19 diagrammatically illustrates the flow of the process of FIG. 18.

As shown in FIG. 19, the CPU 101-1 performs the process of the entropy decoder 21, thereby reading from the RAM 103 the encoded data Y of a first precinct of a leading picture and performs the entropy decoding process on the read encoded data Y (P1VLD(Y)). The CPU 101-1 stores the resulting coefficient data onto the coefficient buffer 22 in the cache memory 111-1. The CPU 101-1 performs the process of the inverse wavelet transformer 23, thereby reading the coefficient data from the coefficient buffer 22 and performs the inverse wavelet transform on the read coefficient data (P1WDT(Y)). The resulting image data Y is stored onto the RAM 103. Upon processing the image data Y, the CPU 101-1 performs a similar process on the encoded data C (P1VLD(C) and P1DWT(C)).

At this point, the RAM 103 has stored the image data Y and the image data C of at least one precinct. The CPU 101-1 thus starts outputting the image data Y and the image data C.

Upon completing the decoding process on the leading precinct, the CPU 101-1 decodes the second and subsequent precincts in a similar fashion (P2VLD(Y), P2DWT(Y), P2VLD(C), P2DWT(C), ...).

In parallel with the process of the CPU 101-1, the CPU 101-2 may perform the decoding process on the second picture, the CPU 101-3 may perform the decoding process on the third picture and the CPU 101-4 may perform the decoding process on the fourth picture as shown in FIG. 19. Upon completing the decoding process on the first picture, the CPU 101-1 may perform the decoding process on the fifth picture. In parallel with the process of the CPU 101-1, the CPUs 101-2 through 101-4 perform the decoding processes thereof on the sixth through eighth pictures, respectively. The ninth and subsequent pictures are also similarly processed.

In the allocation of FIG. 18, the decoder 20 decodes concurrently four pictures in parallel. In this case, no CPU switching is needed in a series of decoding processes. The decoding process is performed with only the cache memory 111 without using the RAM 103. The decoder 20 can decode the encoded data at a high speed. As a result, the decoder 20 performs the decoding process at a high throughput. The decoder 20 may be incorporated in the personal computer 100 regardless of the number of CPUs 101 (even a single CPU 101 is acceptable).

The cache memory 111 has a limitation on an amount of storage data because of the small memory capacity thereof. Depending on the content and data size of the image data to be decoded, an overflow occurs on the cache memory 111. The allocation of FIG. 18 may not be applicable if an amount of data to be buffered in the decoding process is excessively large.

Figure 20:
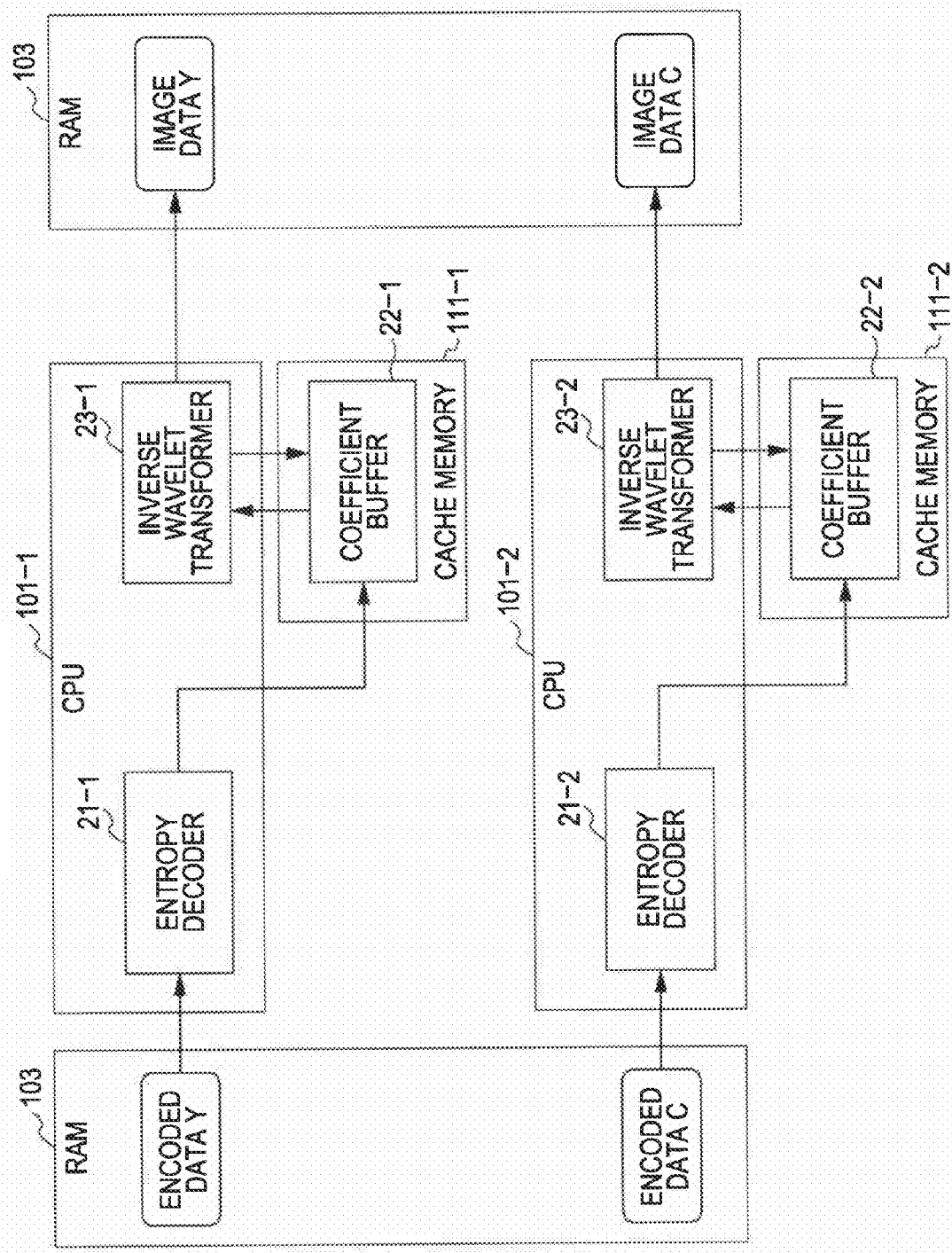
FIG. 20 diagrammatically illustrates another example of the allocation of the hardware resource to the decoder.

FIG. 20 illustrates another example of the hardware resource allocation to the decoder 20 of FIG. 6. As shown in FIG. 20, different CPUs are allocated to a decoder decoding the encoded data Y and a decoder decoding the encoded data C.

The CPU 101-1 is allocated to all processes of an entropy decoder 21-1 and an inverse wavelet transformer 23-1 in the decoder decoding the encoded data Y and a coefficient buffer 22-1 is formed in the cache memory 111-1. The CPU 101-2 is allocated to all processes of an entropy decoder 21-2 and a inverse wavelet transformer 23-2 in the decoder decoding the encoded data C and a coefficient buffer 22-2 is formed in the cache memory 111-2.

A software program performing the process of each of the entropy decoder 21 and the coefficient buffer 22 is loaded onto each of the cache memory 111-1 and the cache memory 111-2. The CPUs 101-1 and 101-2 read functions of the software programs into the cache memory 111-1 and the cache memory 111-2 respectively and performs the process.

As shown in FIG. 20, the CPU 101-1 decodes the encoded data Y and the CPU 101-2 decodes the encoded data C. The CPU 101-1 performs the process of the entropy decoder 21-1, thereby reading the encoded data Y from the RAM 103 and performing the entropy decoding process on the read encoded data Y. The CPU 101-1 uses part or whole of the storage area of the cache memory 111-1 as the coefficient buffer 22-1 and stores the coefficient data generated in the entropy decoding process onto the coefficient buffer 22-1.

The CPU 101-1 performs the process of the inverse wavelet transformer 23-1, thereby reading the coefficient data from the coefficient buffer 22-1 in the cache memory 111-1 and performing the inverse wavelet transform on the read coefficient data to restore the image data Y. The CPU 101-1 supplies the restored image data Y to the RAM 103 for storage.

The CPU 101-2 performs the process of the entropy decoder 21-2, thereby reading the encoded data C from the RAM 103 and performing the entropy decoding process on the read encoded data C. The CPU 101-2 uses part or whole of the storage area of the cache memory 111-2 as the coefficient buffer 22-2 and stores the coefficient data generated in the entropy decoding process onto the coefficient buffer 22-2.

The CPU 101-2 performs the process of the inverse wavelet transformer 23-2, thereby reading the coefficient data from the coefficient buffer 22-2 in the cache memory 111-2 and performing the inverse wavelet transform on the read coefficient data to restore the image data C. The CPU 101-2 supplies the restored image data C to the RAM 103 for storage.

When the decoder 20 is incorporated in the personal computer 100 as shown in FIG. 20, all processes of the decoder 20 on the image data Y and the image data C are performed by different CPUs 101. The coefficient data generated in the entropy decoding process performed by the CPUs 101 is stored on the cache memories 111 of the CPUs 101. The image data Y and the image data C, decoded in the inverse wavelet transform, are both stored onto the RAM 103. In other words, the decoding process is performed by two CPUs in a set.

As the CPUs 101-1 and 101-2, the remaining the CPUs 101-3 and 101-4 may be allocated in the decoder 20. As the CPUs 101-1 and 101-2 in FIG. 20, a software program performing the process of each of the entropy decoder 21 and the inverse wavelet transformer 23 is loaded onto each of the cache memory 111-3 and the cache memory 111-4. The CPUs 101-3 and 101-4 read and execute the software program thereof from the cache memories 111 thereof, thereby performing the processes of the entropy decoder 21 and the inverse wavelet transformer 23 in the decoder 20. The coefficient buffer 22-1 for the encoded data Y is formed in the cache memory 111-3 and the coefficient buffer 22-2 for the encoded data C is formed in the cache memory 111-4.

In this case, the CPUs 101-1 through 101-4 form two decoders 20. These decoders 20 decode the encoded data on a per picture basis. For example, the CPUs 101-1 and 101-2 perform the decoding process on odd-numbered pictures and the CPUs 101-3 and 101-4 perform the decoding process on even-numbered pictures. The flow of such a process is illustrated in FIG. 21.

Figure 21:
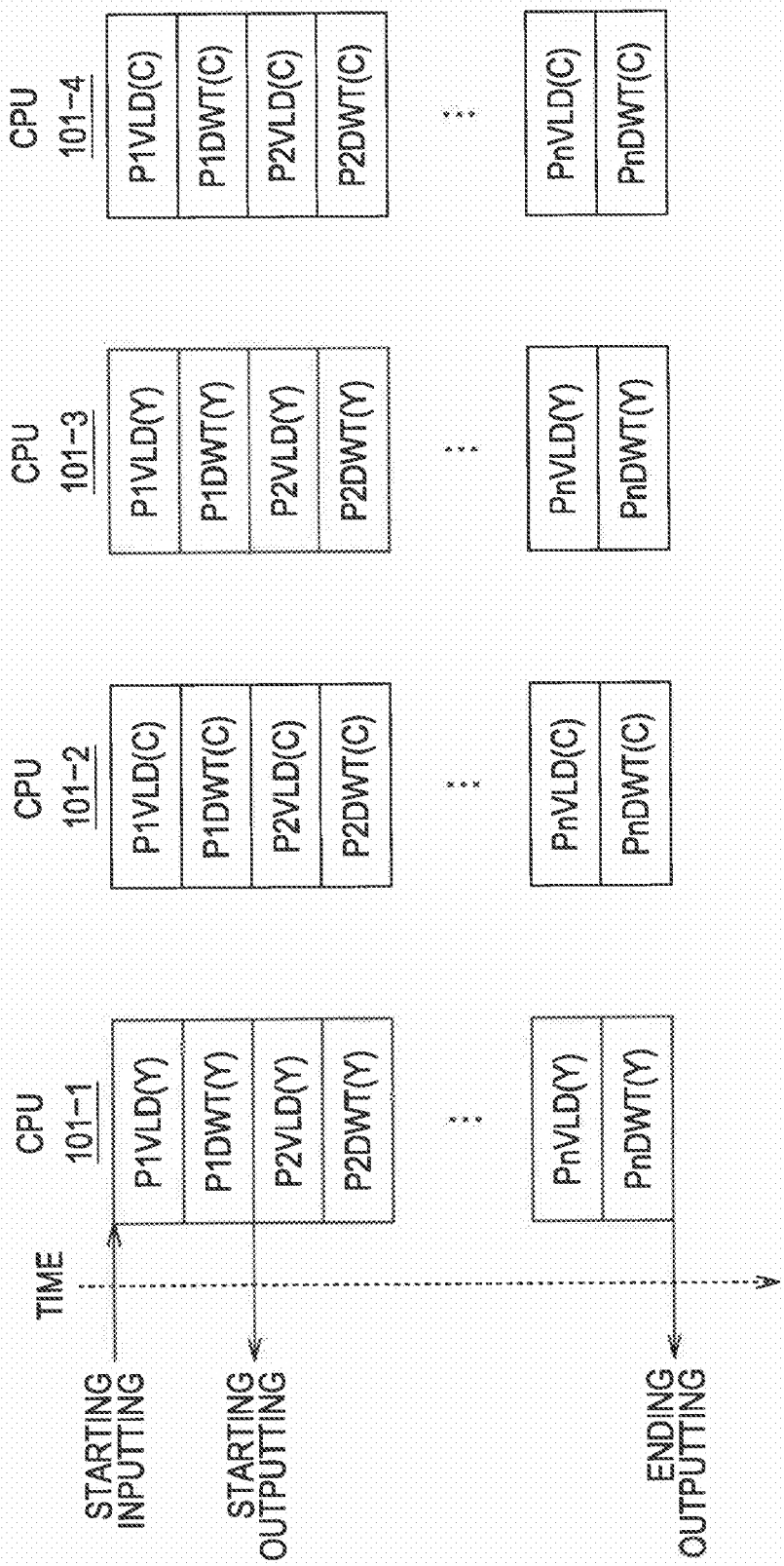
FIG. 21 diagrammatically illustrates the flow of the process of FIG. 20.

As shown in FIG. 21, the CPU 101-1 performing the process of the entropy decoder 21-1 reads the encoded data Y of a first precinct of a leading picture from the RAM 103 and performs the entropy decoding process on the read encoded data Y (P1VLD(Y)). The CPU 101-1 stores the resulting coefficient data onto the coefficient buffer 22-1 in the cache memory 111-1. The CPU 101-1 performing the process of the inverse wavelet transformer 23-1 reads the coefficient data from the coefficient buffer 22-1 and performs the inverse wavelet transform on the read coefficient data (P1DWT(Y)). The resulting image data Y is supplied to the RAM 103 for storage.

In parallel with the above process, the CPU 101-2 performing the process of the entropy decoder 21-2 reads the encoded data C of the first precinct of the leading picture from the RAM 103 and performs the entropy decoding process on the read encoded data C (P1VLD(C)). The CPU 101-2 stores the resulting coefficient data onto the coefficient buffer 22-2 in the cache memory 111-2. The CPU 101-2 performing the process of the inverse wavelet transformer 23-2 reads the coefficient data from the coefficient buffer 22-2 and performs the inverse wavelet transform on the read coefficient data (P1DWT(C)). The CPU 101-2 then supplies the resulting image data to the RAM 103 for storage.

When the CPUs 101-1 and 101-2 complete the inverse wavelet transform on the first precinct, the decoder 20 has stored the image data of at least one precinct (the image data Y and the image data C) on the RAM 103. The decoder 20 can thus start outputting the image data.

The encoded data Y and the encoded data C of each of the second and subsequent precincts are decoded by the CPU 101-1 and the CPU 101-2 in parallel, respectively.

In parallel with the processes of the CPUs 101-1 and 101-2, the CPUs 101-3 and 101-4 can decode the second picture. In this case, the CPU 101-3 decodes the encoded data Y of the second picture and the CPU 101-4 decodes the encoded data C of the second picture.

Upon completing the leading picture, the CPUs 101-1 and 101-2 perform the decoding process on the third picture. In parallel with the processes of the CPUs 101-1 and 101-2, the CPUs 101-3 and 101-4 perform the decoding process on the fourth picture. The fifth and subsequent pictures are processed in the same manner.

In the allocation of FIG. 20, the encoded data Y and the encoded data C are decoded in parallel and the output start timing of the decoded data is set to be earlier than in the allocation of FIG. 18. The delay time is thus reduced. The decoder 20 decodes faster, as shown in FIG. 20, the leading picture than in the allocation of FIG. 18. When the data decoded in the decoder 20 is displayed on the monitor, the delay time from starting the decoding process to displaying the leading picture is thus shorter in the allocation of FIG. 20 than in the allocation of FIG. 18.

The coefficient data resulting from decoding the encoded data Y and the coefficient data resulting from decoding the encoded data C are stored on different cache memories 111. The coefficient buffer 22 is set to be larger in memory capacity than the coefficient buffer 22 in the allocation of FIG. 18. The occurrence of buffer overflow is controlled more.

The image data Y is larger in an amount of information and more complex than the image data C. Time to complete the encoding process on the image data Y is longer. A waiting time occurs on the CPU 101-2 and the CPU 101-4. The usage efficiency of the CPU 101 is lower than in the allocation of FIG. 18. The allocation of FIG. 20 is even lower in throughput than the allocation of FIG. 18.

Figure 22:
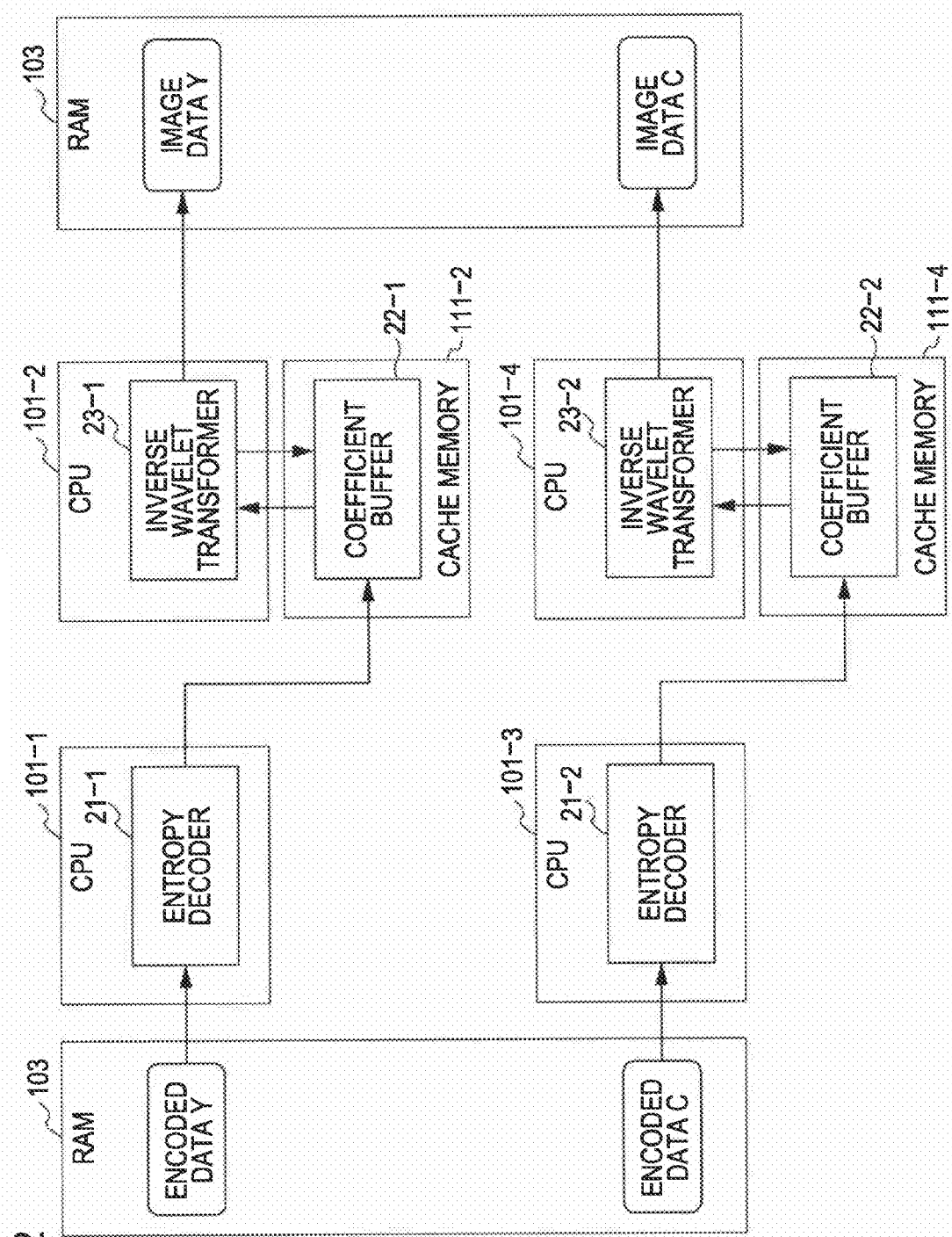
FIG. 22 diagrammatically illustrates yet another example of the allocation of the hardware resource to the decoder.

FIG. 22 illustrates another example of the hardware resource allocation to the decoder 20 of FIG. 6. As shown in FIG. 22, different CPUs are respectively allocated to the entropy decoder 21 and the inverse wavelet transformer 23.

The CPU 101-1 is allocated to the entropy decoder 21-1 decoding the encoded data Y and the CPU 101-2 is allocated to the inverse wavelet transformer 23-1 performing the inverse wavelet transform on the coefficient data generated in the entropy decoder 21-1. The coefficient buffer 22-1 is formed in the cache memory 111-2.

The CPU 101-3 is allocated to the entropy decoder 21-2 decoding the encoded data C. The CPU 101-4 is allocated to the inverse wavelet transformer 23-2 performing the inverse wavelet transform on the coefficient data generated in the entropy decoder 21-2. The coefficient buffer 22-2 is formed in the cache memory 111-4.

A software program performing the process of the entropy decoder 21 is loaded onto each of the cache memory 111-1 and the cache memory 111-3. A software program performing the process of the inverse wavelet transformer 23 is loaded onto each of the cache memory 111-2 and the cache memory 111-4. The CPUs 101-1 through 101-4 read functions of the software programs from the cache memories 111 thereof and execute the read functions.

As shown in FIG. 22, the encoded data Y is decoded by the CPUs 101-1 and 101-2 and the encoded data C is decoded by the CPUs 101-3 and 101-4. More specifically, the CPU 101-1 performing the process of the entropy decoder 21-1 reads the encoded data Y from the RAM 103 and performs the entropy decoding process on the read encoded data Y. The CPU 101-1 uses part or whole of the storage area of the cache memory 111-2 and stores the generated coefficient data onto the coefficient buffer 22.

The CPU 101-2 performing the process of the inverse wavelet transformer 23-1 reads the coefficient data generated by the CPU 101-1 and stored on the coefficient buffer 22 in the RAM 103. The CPU 101 performs a vertical synthesis filtering operation and a horizontal synthesis filtering operation in the inverse wavelet transform on the read coefficient data in order to generate the image data Y. The CPU 101-2 supplies the generated image data Y to the RAM 103 for storage.

In parallel with the process of the CPUs 101-1 and 101-2, the CPUs 101-3 and 101-4 performs the entropy decoding process and the inverse wavelet transform on the image data C in the same manner as shown in FIG. 22.

When the decoder 20 is incorporated in the personal computer 100 as shown in FIG. 22, the CPUs 101-1 through 101-4 forming a CPU set perform the decoding process. The CPUs 101-1 through 101-4 thus constructs a single decoder 20. The decoder 20 decodes all pictures of moving image data to be restored through decoding. The flow of such a process is illustrated in FIG. 23.

The CPUs 101-1 through 101-4 operate independently of each other. As shown in FIG. 23, the processes of the CPUs 101-1 through 101-4 can be performed in parallel.

Figure 23:
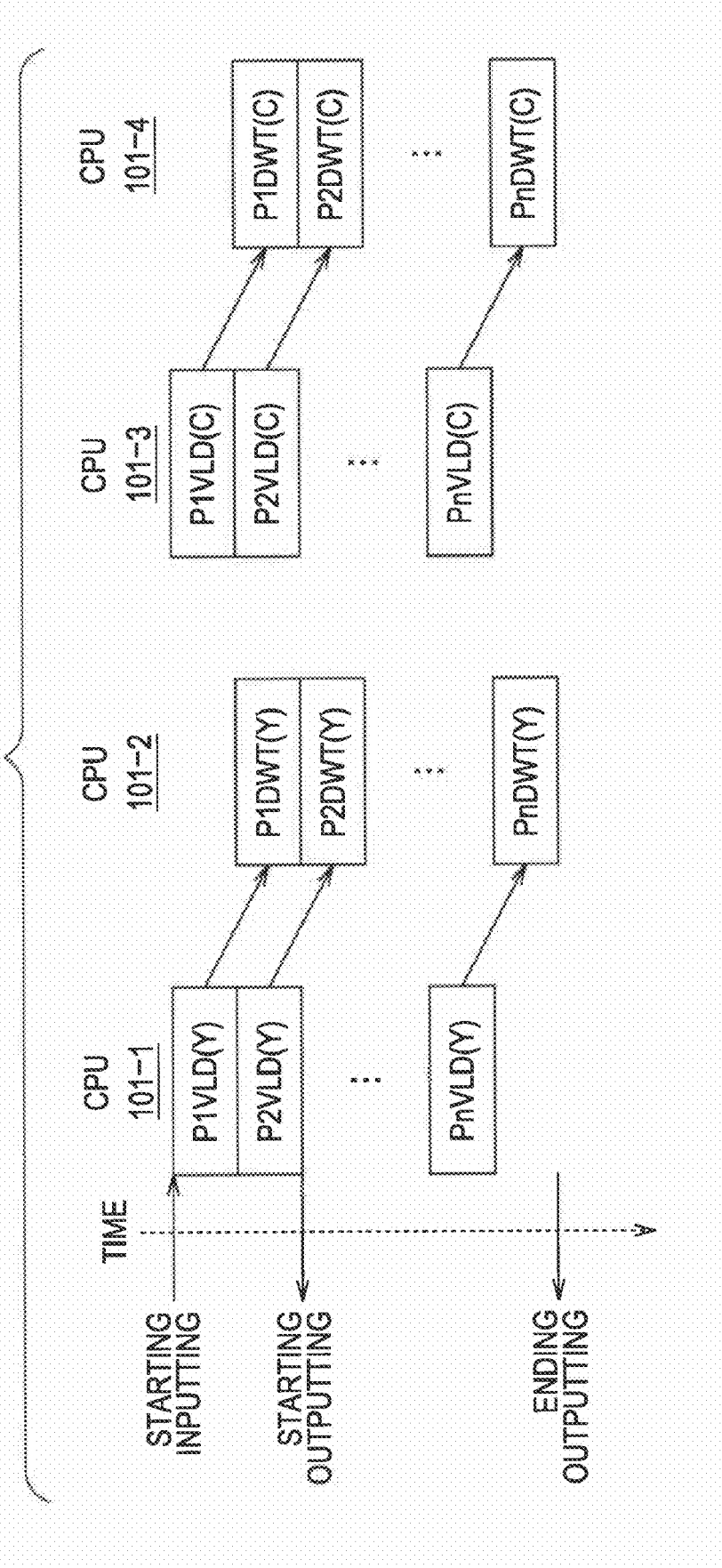
FIG. 23 diagrammatically illustrates the flow of the process of FIG. 22.

As shown in FIG. 23, the CPU 101-1 performing the process of the entropy decoder 21-1 reads the encoded data Y of the first precinct of the leading picture from the RAM 103 and performs the entropy decoding process on the read encoded data Y (P1VLD(Y)). The resulting coefficient data is stored onto the coefficient buffer 22-1 in the cache memory 111-2. The CPU 101-1 performing the process of the entropy decoder 21-1 performs the entropy decoding process on the encoded data Y of the second precinct (P2VLD(Y)).

In parallel with P2VLD(Y), the CPU 101-2 performing the process of the inverse wavelet transformer 23-1 reads the coefficient data of the first precinct of the leading picture and performs the inverse wavelet transform on the read coefficient data (P1DWT(Y)). The CPU 101-2 stores the resulting image data Y onto the RAM 103 and then outputs the image data Y. The CPU 101-2 performing the process of the inverse wavelet transformer 23-1 performs the inverse wavelet transform on the coefficient data of the second precinct (P2DWT(Y)).

The CPUs 101-1 and 101-2 perform the entropy decoding process and the inverse wavelet transform on the third and subsequent precincts with one precinct successively shifted in a manner such that one precinct is processed by the CPU 101-1 with a next precinct processed by the CPU 101-2.

In parallel with the decoding process on the image data Y, the CPUs 101-3 and 101-4 performs the decoding process on the image data C. More specifically, in parallel with the P1VLD(Y) of the CPU 101-1, the CPU 101-3 performs a process of P1VLD(C). In parallel with the P2VLD(Y) of the CPU 101-1, the CPU 101-3 performs a process of P2VLD(C) and the CPU 101-4 performs a process of P1DWT(C).

When the CPUs 101-2 and 101-4 have completed the inverse wavelet transform on the first precinct, the RAM 103 stores the image data of one precinct (the image data Y and the image data C). The decoder 20 can thus start outputting the image data.

The encoded data Y and the encoded data C of each of the second and subsequent precincts are decoded by the CPUs 101-1 and 101-2. In parallel, the encoded data C is decoded by the CPUs 101-3 and 101-4. The encoded data Y and the encoded data C of the n-th precinct (Pn), namely, the last precinct are decoded and the encoded data Y and the encoded data C are output. All image data of the leading picture is thus output.

The second and subsequent pictures are similarly processed.

In the allocation of FIG. 22, the entropy decoding process and the inverse wavelet transform are performed in parallel and the output start timing of the decoded data, namely, the outputting timing of the image data Y and the image data C of the first precinct is set to be earlier than in the allocation of FIG. 20. The delay time is thus reduced. For the same reason, the allocation of FIG. 22 can complete the decoding of the leading picture faster than the allocation of the FIG. 20. When the data decoded in the decoder 20 is displayed on the monitor, the delay time from starting the decoding process to displaying the leading picture is thus shorter in the allocation of FIG. 22 than in the allocation of FIG. 20.

In the same manner as in FIG. 20, the coefficient data resulting from decoding the encoded data Y and the coefficient data resulting from decoding the encoded data C are stored on different cache memories 111. The coefficient buffer 22 is set to be larger in memory capacity than the coefficient buffer 22 in the allocation of FIG. 18. The occurrence of buffer overflow is controlled more.

In practice, however, the image data Y is larger in an amount of information and more complex than the image data C. Time to complete the decoding process on the image data Y is longer. A waiting time occurs on the CPUs 101-3 and 101-4. Since the CPUs 101 are switched in the middle of the encoding process, controlling the CPUs 101 becomes complex and a process time is prolonged. The usage efficiency of the CPU 101 is lower than in the allocation of FIG. 20. The allocation of FIG. 22 is lower in throughput than the allocation of FIG. 20.

Each of the entropy decoding process and the inverse wavelet transform is composed of a plurality of functions. It is possible to use different CPUs 101 for a process other than the entropy decoding process and the inverse wavelet transform. However, the use of different CPUs 101 does not serve to reduce the process time if the processes are not performed in parallel. It is difficult to permit method steps to be performed in parallel in each process of the entropy decoding process and the inverse wavelet transform in the decoder 20 of FIG. 6. It is thus preferable that the decoding process be divided between the entropy decoding process and the inverse wavelet transform in the decoder 20.

For example, a CPU may be automatically allocated to a process in a computer in the related art. The CPU allocation may be performed depending on the workload status of the CPU. The process is not necessarily divided at an optimum position with the different CPUs allocated to separated jobs. This may substantially reduce the efficiency in the decoding process. By dividing the decoding process between the entropy decoding process and the inverse wavelet transform as shown in FIG. 22, the decoder 20 can efficiently perform the decoding process.

With reference to FIG. 1, the coefficient rearrangement process is performed immediately subsequent to the wavelet transform (namely, prior to the entropy encoding process). The encoded data can be supplied to the inverse wavelet transformer 23 in the decoder 20 (FIG. 6) in the order from a low frequency component to a high frequency component (namely, in the order from the encoded data resulting from encoding the coefficient data in a low frequency subband to the encoded data resulting from encoding the coefficient data in a high frequency subband). The timing of the rearrangement may be other than a timing immediately subsequent to the wavelet transform.

Figure 24:
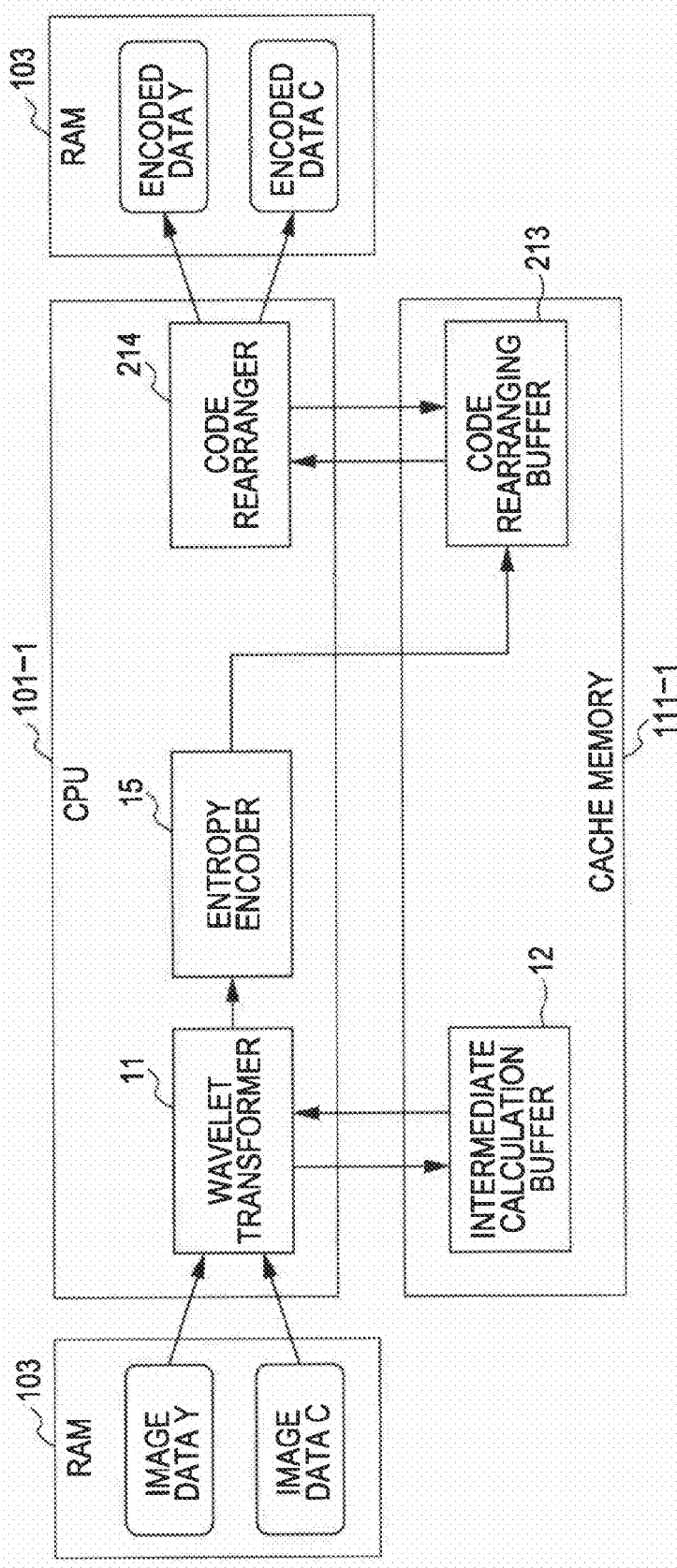
FIG. 24 is a block diagram illustrating another encoder in accordance with one embodiment of the present invention.

As shown in FIG. 24, the encoded data obtained in the entropy encoding process may be rearranged in order. As in the encoder 10 of FIG. 1, the encoder 10 of FIG. 24 includes the wavelet transformer 11, the intermediate calculation buffer 12 and the entropy encoder 15. The encoder 10 of FIG. 24 further includes a code rearranging buffer 213 and a code rearranger 214 instead of the coefficient rearranging buffer 13 and the coefficient rearranger 14 shown in FIG. 1.

The coefficient data output from the wavelet transformer 11 is supplied to the entropy encoder 15. The entropy encoder 15 encodes the supplied coefficient data in the order of supply thereof and causes the code rearranging buffer 213 to store the encoded data. The code rearranging buffer 213 thus stores the encoded data in the order of from a high frequency component to a low frequency component. The code rearranger 214 reads the encoded data from the code rearranging buffer 213 in the order of inverse wavelet transform, i.e., in the order of from the low frequency component to the high frequency component. The code rearranger 214 thus rearranges the encoded data in order, stores the resulting encoded data onto the RAM 103 and then outputs the resulting encoded data.

Figure 25:
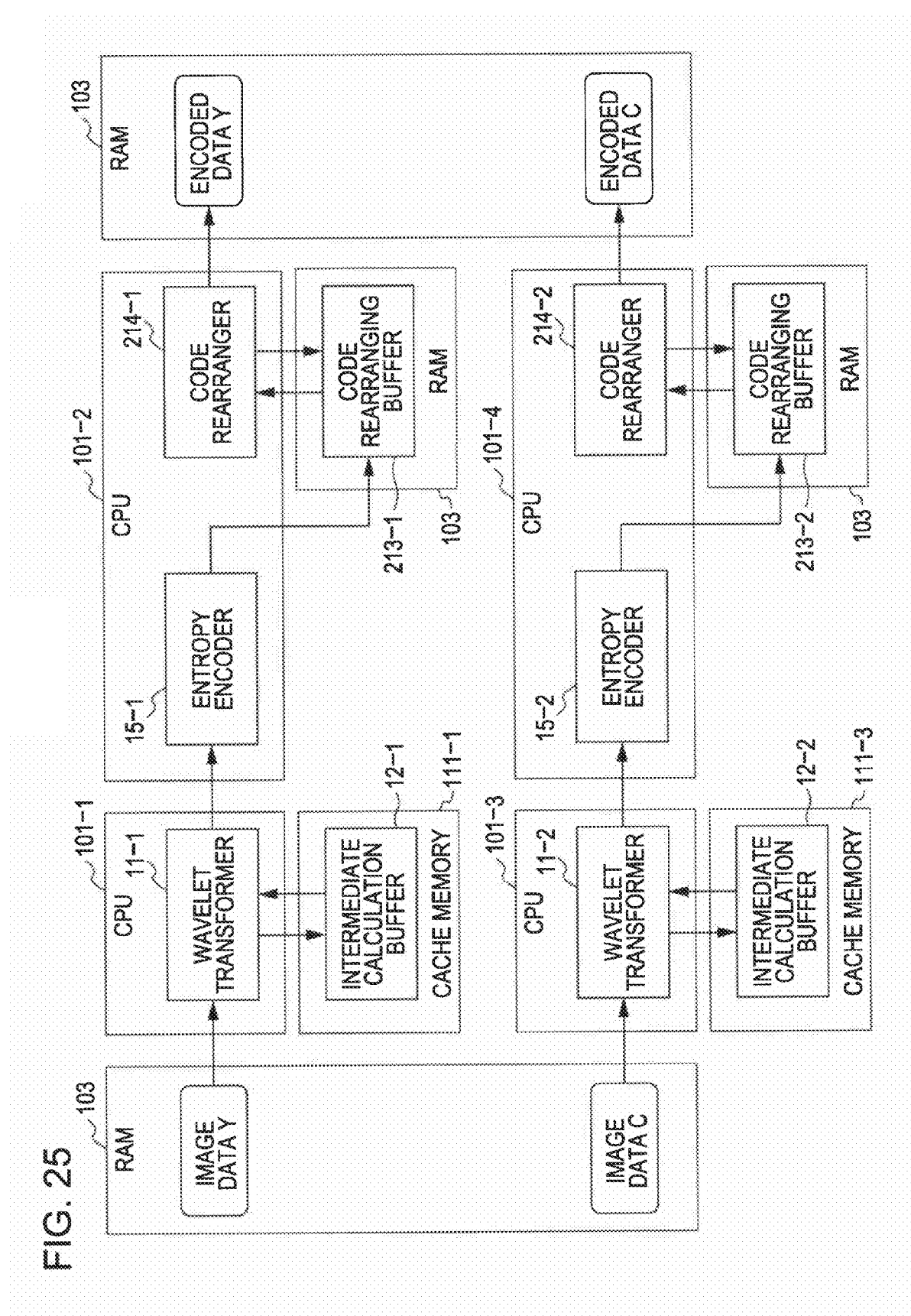
FIG. 25 illustrates another example of the allocation of the software resource to the encoder of FIG. 24.

FIG. 24 also illustrates an example of the hardware resource allocation to the encoder 10. As shown in FIG. 24, a single CPU 101 is allocated to all processes in the encoding operation. More specifically, hardware resource allocation is performed to rearrange the order of encoded data in the same manner as in the rearrangement of the coefficient data previously discussed with reference to FIG. 11. The hardware resource allocation may also be performed in one of the allocations illustrated in FIGS. 13, 14 and 16. FIG. 25 illustrates an example of the hardware resource allocation as shown in FIG. 16.

As shown in FIG. 25, the CPU 101-1 is allocated to the wavelet transformer 11-1 performing the wavelet transform on the image data Y and the CPU 101-2 is allocated to the entropy encoder 15-1 performing the entropy encoding process on the coefficient data of the image data Y and the code rearranger 214-1 rearranging the encoded data Y. The intermediate calculation buffer 12-1 is formed in the cache memory 111-1 in the CPU 101-1 and the code rearranging buffer 213-1 is formed in the RAM 103.

The CPU 101-3 is allocated to the wavelet transformer 11-2 performing the wavelet transform on the image data C. The CPU 101-4 is allocated to the entropy encoder 15-2 performing the entropy encoding process on the image data C and the code rearranger 214-2 rearranging the encoded data C. The intermediate calculation buffer 12-2 is formed in the cache memory 111-3 in the CPU 101-3. The code rearranging buffer 213-2 is formed in the RAM 103.

As in the rearrangement of the encoded data, the hardware resource allocation is performed in the rearrangement of the coefficient data. When the encoded data is rearranged, a plurality of CPUs 101 are allocated to the wavelet transformer 11-1, the entropy encoder 15-1, the code rearranger 214 (or the wavelet transformer 11-2, the entropy encoder 15-2, and the code rearranger 214-2) as shown in FIG. 25. In this case, an inappropriate hardware allocation is controlled by presetting a switching position of the CPUs 101.

The hardware resource allocation may be performed in another method different from those described above. In the allocation of FIG. 25, for example, the code rearranging buffer 213-1 may be formed in the cache memory 111-2, and the code rearranging buffer 213-2 may be formed in the cache memory 111-4. The CPU 101-1 may be allocated to the entropy encoder 15-1 and the CPU 101-3 may be allocated to the entropy encoder 15-2. Different CPUs 101 may be allocated to the wavelet transformer 11-1, the entropy encoder 15-1, and the code rearranger 214-1, and different CPUs 101 may be allocated to the wavelet transformer 11-2, the entropy encoder 15-2 and the code rearranger 214-2.

The structure of the decoder 20 and the hardware resource allocation method are identical to those described with reference to FIGS. 18 through 23.

Figure 26:
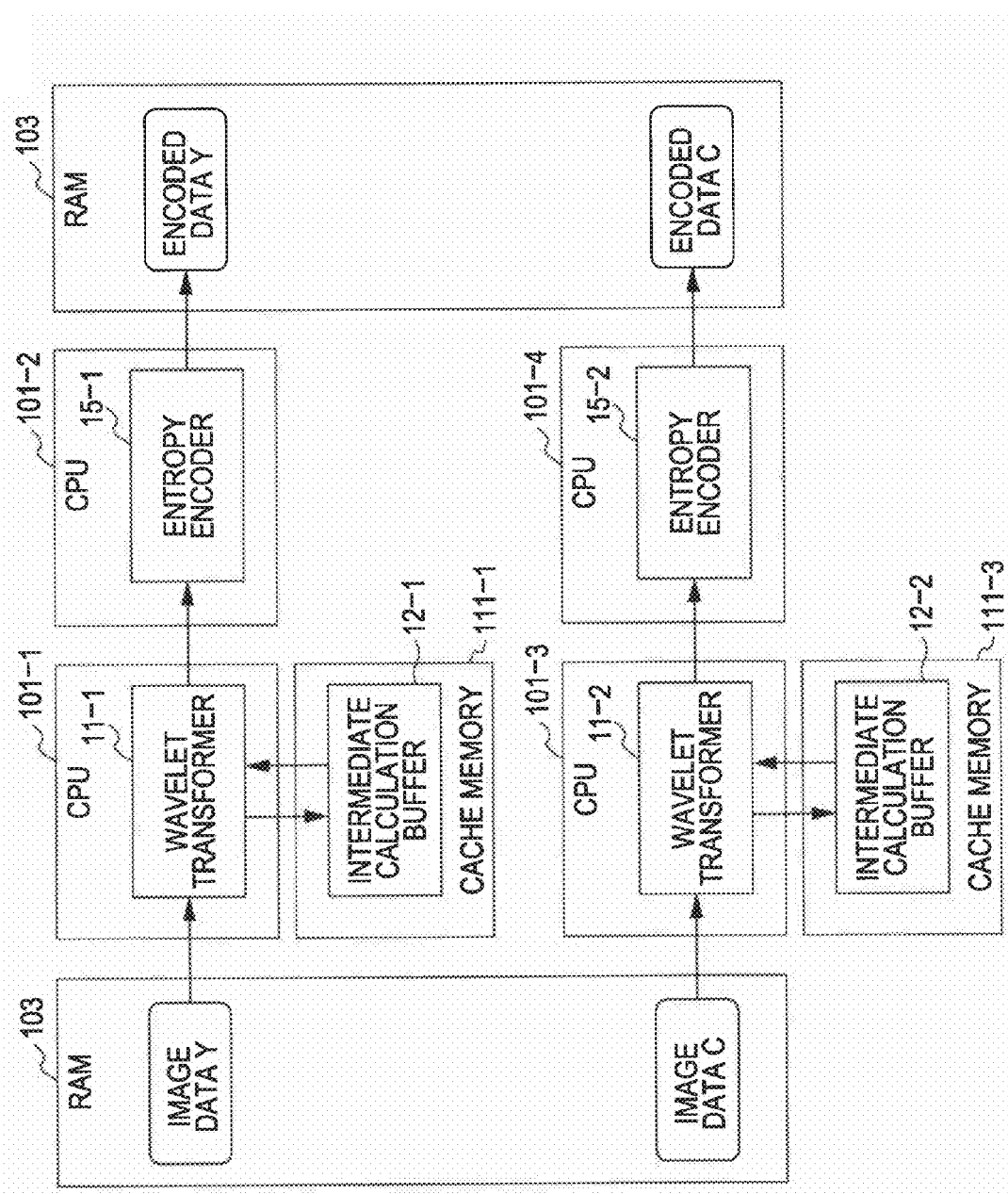
FIG. 26 is a block diagram of another encoder in accordance with one embodiment of the present invention.

The rearrangement may be performed on the side of the decoder 20. In such a case, the encoder 10 includes the wavelet transformer 11, the intermediate calculation buffer 12, the entropy encoder 15 as shown in FIG. 26 and does not include the coefficient rearranging buffer 13 and the coefficient rearranger 14 in FIG. 1.

The CPU 101 may be allocated in the encoder 10 in a manner similar to the manner of the coefficient data rearrangement discussed with reference to FIGS. 12 through 17. By appropriately allocating the hardware resource, the encoder 10 performs efficiently the encoding process. FIG. 26 illustrates an allocation example corresponding to the one illustrated in FIG. 16.

Figure 27:
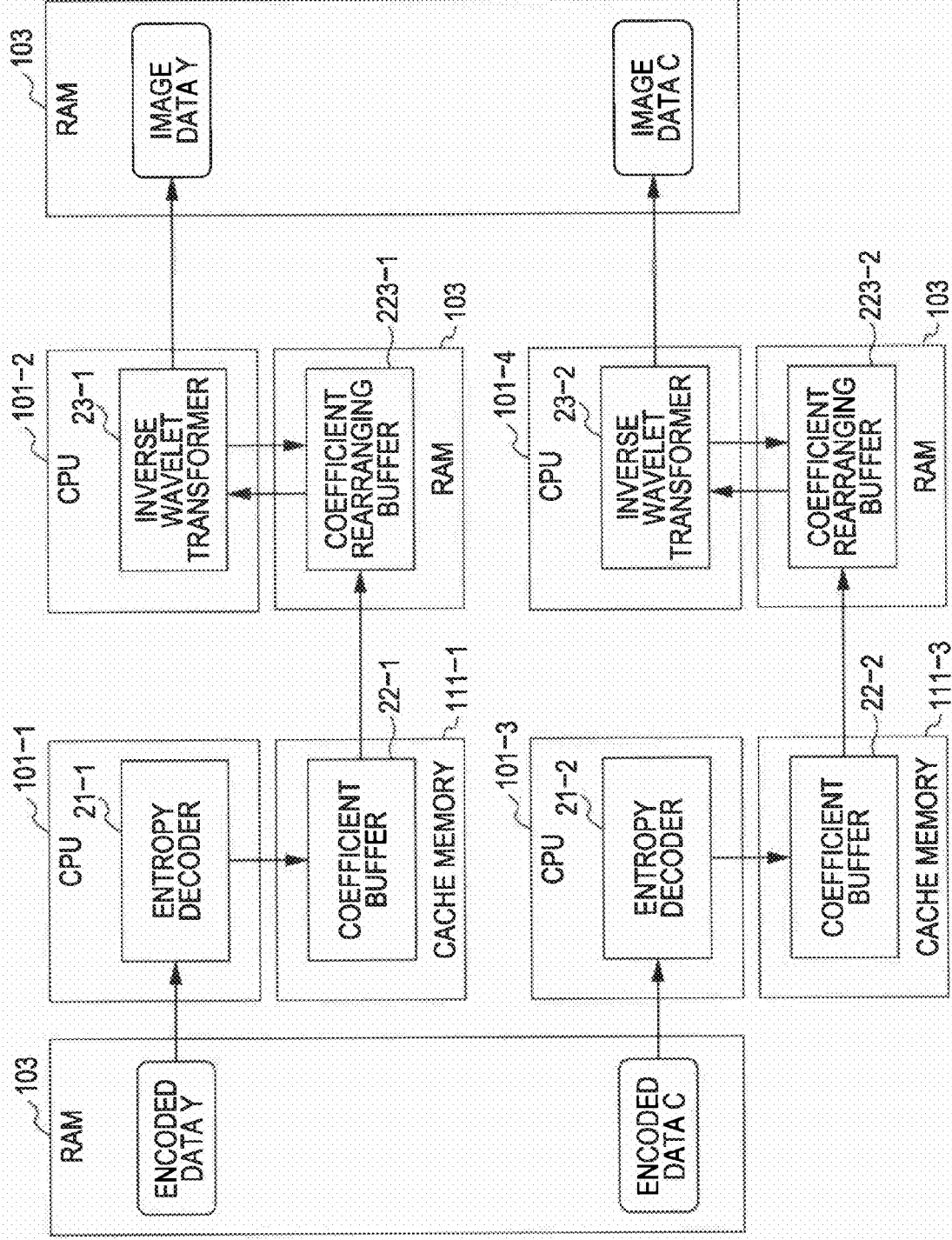
FIG. 27 is a block diagram illustrating a decoder corresponding to the encoder of FIG. 26.

The decoder 20 corresponding to the encoder 10 is structured as shown in FIG. 27. The decoder 20 includes a coefficient rearranging buffer 223 between the coefficient buffer 22 and the inverse wavelet transformer 23. The CPU 101 may be allocated to the in the decoder 20 as previously discussed with reference to FIGS. 18 through 23. By allocating appropriately the hardware resource, the decoder 20 performs efficiently the decoding process. FIG. 27 illustrates an example of the resource allocation corresponding to the hardware resource allocation of FIG. 22.

As shown in FIG. 27, the RAM 103 contains a coefficient rearranging buffer 223-1 storing the coefficient data of the luminance component Y output from the coefficient buffer 22-1 and a coefficient rearranging buffer 223-2 storing the coefficient data of a color difference component C output from the coefficient buffer 22-2.

The CPU 101-2 performing the process of the inverse wavelet transformer 23-1 reads from the coefficient rearranging buffer 223-1 in the RAM 103 the coefficient data of the luminance component Y in a rearranged order, namely, in an order of from a low frequency component to a high frequency component and performs the inverse wavelet transform on the coefficient data in that order. The CPU 101-2 stores the image data Y onto the RAM 103 and then outputs the image data Y.

The CPU 101-4 performing the process of the inverse wavelet transformer 23-2 reads the coefficient data of the color difference component C from the coefficient rearranging buffer 223-2 in the RAM 103 in a rearranged order, namely, in an order from a low frequency component to a high frequency component and performs the inverse wavelet transform on the coefficient data in that order. The CPU 101-4 stores the generated image data C onto the RAM 103 and then outputs the image data C.

The appropriate allocation of the CPUs 101 to each of the processes of the encoder 10 and the decoder 20 improves the process efficiency of the encoder 10 and the decoder 20, thereby improving throughput and reducing delay time.

With reference to FIG. 27, the coefficient rearranging buffer 223-1 and the coefficient rearranging buffer 223-2 are formed in the RAM 103. Alternatively, the coefficient rearranging buffer 223-1 may be formed in the cache memory 111-2 in the CPU 101-2 and the coefficient rearranging buffer 223-2 may be formed in the cache memory 111-4 in the CPU 101-4.

Performance required of the encoder 10 and the decoder 20 may be different depending on the content (image) of the image data, the encoding method, the decoding method, the available hardware resource, and application purposes. For example, in the case of a high-definition video having pixels of 4000×2000 or more is handled or a high frame rate image is handled, an amount of one of the encoding process and the decoding process (size of data to be processed) is large. In such a case, a high throughput is more important to perform one of the encoding process and the decoding process on a real-time basis (immediately). For example, image data transmission needs to be performed with a short delay time in a video conference system or a home video gaming system. Short delay time performance is prioritized in the encoding process and the decoding process. An unusable allocation pattern can be present depending on a currently available hardware resource or an expected usage amount of memory.

The hardware resource allocation patterns have been discussed. The optimum allocation pattern (efficient process) may change depending on the content (image) of the image data, the encoding method, the decoding method, the available hardware resource, and application purposes.

Figure 28:
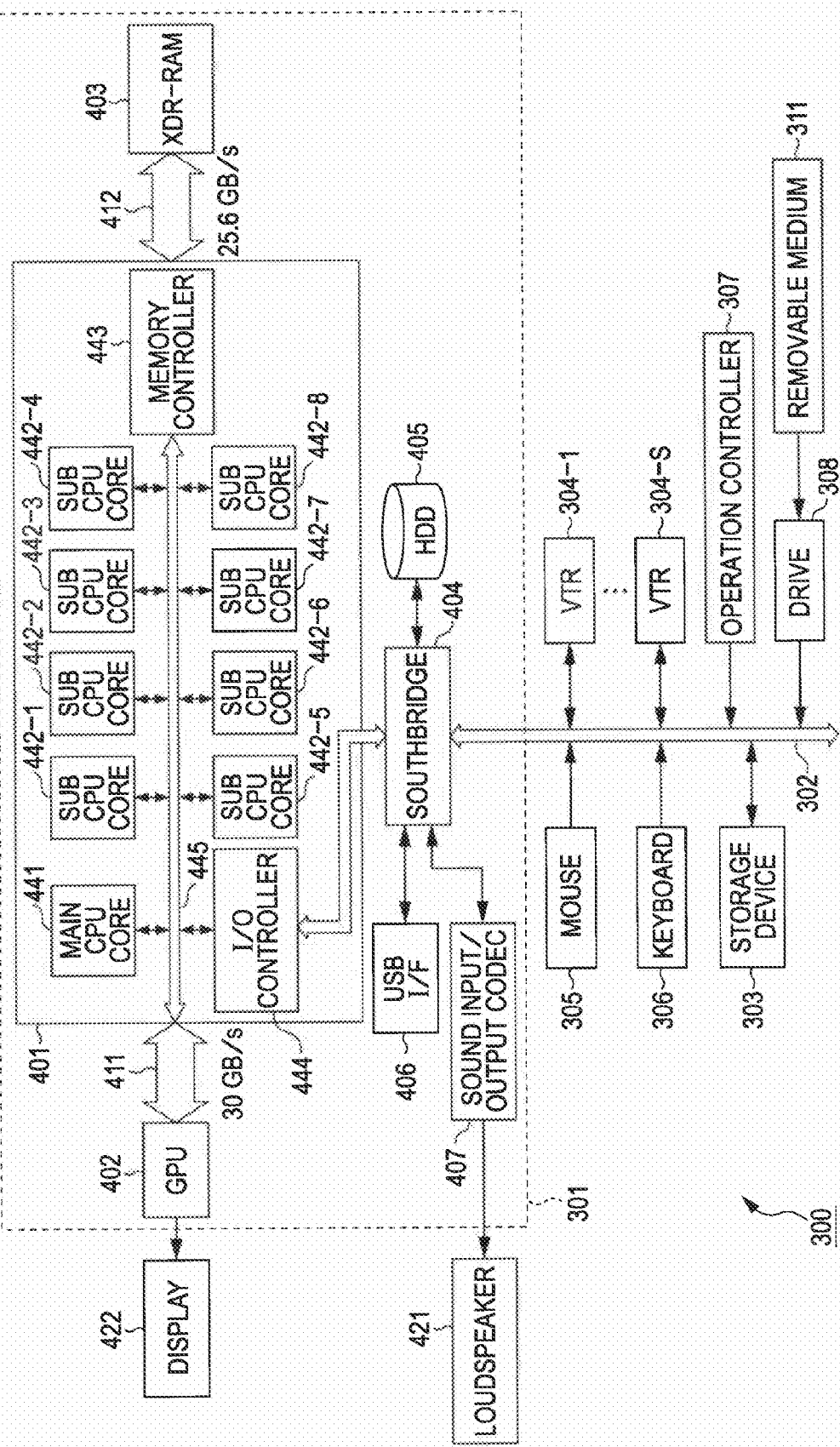
FIG. 28 is a block diagram illustrating an information processing system in accordance with one embodiment of the present invention.

To apply an optimum allocation pattern under a variety of conditions, the plurality of hardware resource allocation patterns described above are prepared and an appropriate one may be selected in response to a given condition. Such an operation is described below. The hardware resource to be allocated to the software encoder and the software decoder is described first. FIG. 28 is a block diagram illustrating an information processing system 300 incorporating one of the software encoder and the software decoder.

As shown in FIG. 28, the information processing system 300 includes an information processing apparatus 301, a storage device 303, a plurality of video tape recorders (VTRs) VTRs 304-1 through 304-S, to which the information processing apparatus 301 is connected via a PCI bus 302, a mouse 305, a keyboard 306 and an operation controller 307. The mouse 305, the keyboard 306, and the operation controller 307 are used by a user to enter an operation input. The information processing apparatus 301 performs the above-referenced image encoding process and the image decoding process under the control of an installed program.

The information processing apparatus 301 in the information processing system 300 causes the large-capacity storage device 303 to store encoded data into which moving content stored on the storage device 303 has been encoded. The storage device 303 is redundant arrays of independent disks (RAID). The information processing apparatus 301 causes the storage device 303 to store image data (moving content) decoded from the encoded data stored on the storage device 303. The information processing apparatus 301 further stores the encoded data and the decoded data onto a video tape on VTRs 304-1 through 304-S. The information processing apparatus 301 reads the moving image content from a video tape loaded onto the VTRs 304-1 through 304-S into the storage device 303. In this case, the information processing apparatus 301 may encode the moving image content.

The information processing apparatus 301 includes a microprocessor 401, a graphics processing unit (GPU) 402, an extreme data rate (XDR)-random-access memory (RAM) 403, a southbridge 404, a hard disk drive (HDD) 405, a USB interface 406 and a sound input/output codec 407.

The GPU 402 is connected to the microprocessor 401 via a dedicated bus 411. The XDR-RAM 403 is connected to the microprocessor 401 via a dedicated bus 412. The southbridge 404 is connected to an input-output (I/O) controller 444 via a dedicated bus. The southbridge 404 connects to the HDD 405, the USB interface 406 and the sound input/output codec 407. The sound input/output codec 407 connects to a loudspeaker 421. The GPU 402 connects to a display 422.

The southbridge 404 further connects via the PCI bus 302 to the mouse 305, the keyboard 306, the VTRs 304-1 through 304-S, the storage device 303 and the operation controller 307.

The mouse 305 and the keyboard 306 receive from the user an operation input and supplies a signal responsive to the operation input to the microprocessor 401 via the PCI bus 302 and the southbridge 404. The storage device 303 and the VTRs 304-1 through 304-S record or play predetermined data.

The PCI bus 302 further connects to a drive 308 as necessary. A removable medium 311 such as a magnetic disk, an optical disk, a magneto-optical disk or a semiconductor memory is loaded onto the drive 308. A computer program read from the removable medium 311 is installed onto the HDD 405 as necessary.

The microprocessor 401 having a one-chip multi-core structure operates at an operating clock frequency of 4 GHz, for example. The microprocessor 401 includes a main CPU core 441, sub CPU cores 442-1 through 442-8, a memory controller 443, and the I/O controller 444. The main CPU core 441 executes a basic program such as an operating system (OS). The sub CPU cores 442-1 through 442-8 are reduced instruction set computer (RISC) type signal processors connected to the main CPU core 441 via a dedicated bus 445. The memory controller 443 performs memory control on the XDR-RAM 403 having a memory capacity of 256 Mbytes, for example. The I/O controller 444 manages exchanging of data with the southbridge 404.

At the startup of the information processing system 300, the microprocessor 401 reads a necessary application program from the HDD 405 in accordance with a control program stored on the HDD 405 and expands the application program onto the XDR-RAM 403. The microprocessor 401 performs a necessary control process in response to the application program and a user operation input.

By executing a software program, the microprocessor 401 performs the above-referenced encoding process and decoding process. The microprocessor 401 thus supplies via the southbridge 404 an encoded stream as a result of encoding to the HDD 405 for storage and transfers a play video as moving content obtained as a result of decoding to the GPU 402 to display the video on the display 422.

Each CPU core in the microprocessor 401 may be used in any method. For example, the main CPU core 441 controls the image encoding process and the image decoding process, the sub CPU cores 442-1 through 442-8 perform concurrently the wavelet transform, the coefficient rearrangement, the entropy encoding process, the inverse wavelet transform, quantization and dequantization in parallel as previously discussed with reference to FIG. 9. The main CPU core 441 allocates the eight sub CPU cores 442-1 through 442-8 to the processes on a per precinct basis. The encoding process and the decoding process are thus concurrently performed in parallel as previously discussed with reference to 9. The efficiency in the encoding process and the decoding process is heightened, and the overall delay time of the processes is shortened. Furthermore, workload, process time and a memory capacity required to perform each process are also reduced. It is perfectly acceptable if each core is used in a method different from the method described above.

The played video of the moving content may be displayed on the display 422. The GPU 402 performs a final rendering process such as texture filling-in. The GPU 402 further performs coordinates conversion calculation process when a plurality of played images of moving image content and a plurality of still images of sill image content are displayed on the display 422. The GPU 402 further scale-expands and scale-contracts a played image of the moving image content and a still image of the still image content. In this way, the GPU 402 reduces workload on the microprocessor 401.

The GPU 402 under the control of the microprocessor 401 performs a signal process on the video data of the supplied moving image content and image data of the still image content. The GPU 402 supplies the video data and the image data, obtained as a result, to the display 422 to display the video data and the image data thereon.

The played video of a plurality of moving image content units decoded in parallel by the eight sub CPU cores 442-1 through 442-8 in the microprocessor 401 is transferred to the GPU 402 via the dedicated bus 411. The data rate in this case is 30 Gbytes at maximum. Even a complex video having undergone a special effect is thus displayed smoothly at such a high speed.

The microprocessor 401 performs a sound mixing process on audio data out of audio data and video data in the moving image content. The thus edited audio data is supplied to the loudspeaker 421 via the southbridge 404 and the sound input/output codec 407. A sound responsive to the audio signal is emitted from the loudspeaker 421.

Figure 29:
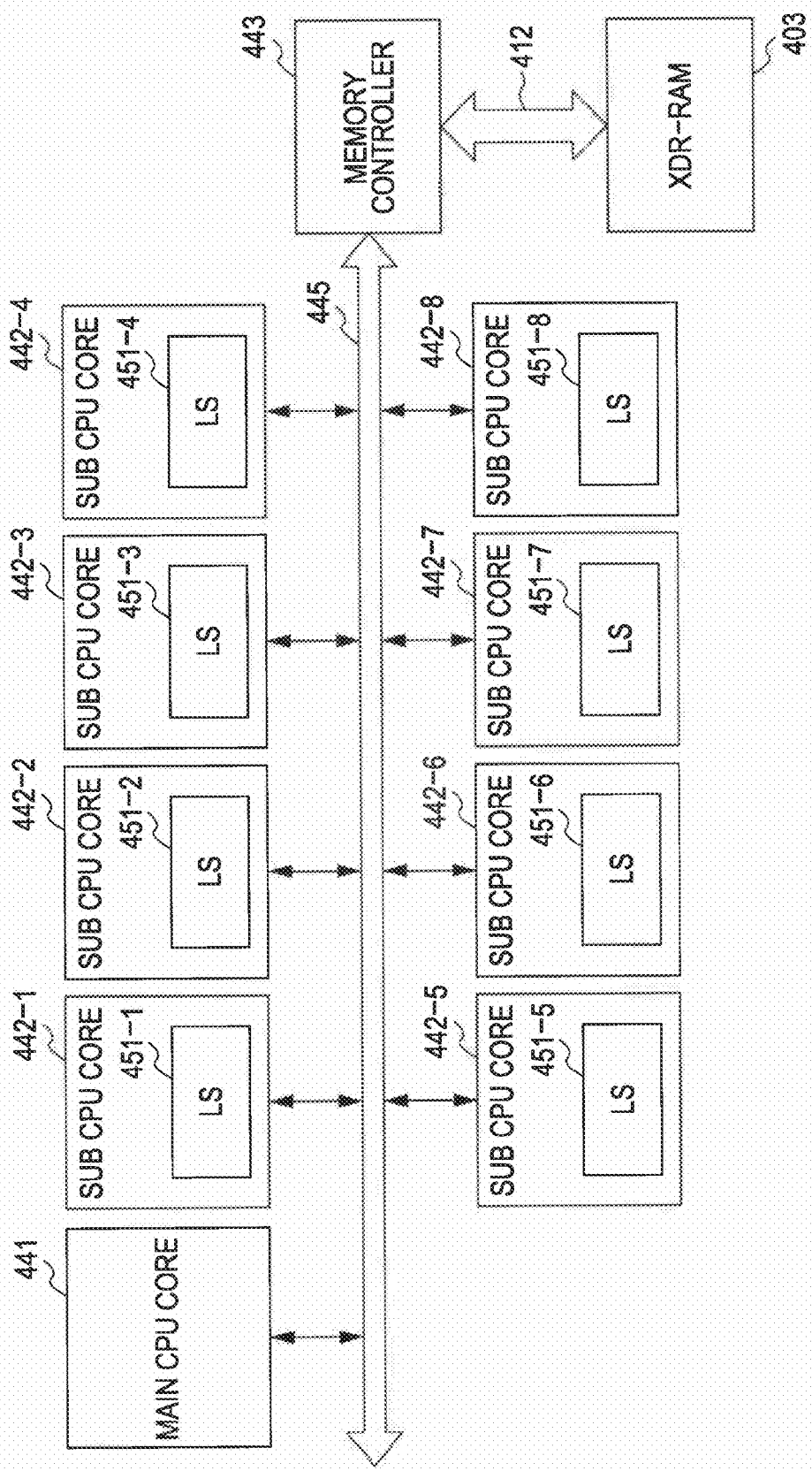
FIG. 29 is a block diagram illustrating a sub CPU core in accordance with one embodiment of the present invention.

The eight sub CPU cores 442-1 through 442-8 in the microprocessor 401 in the information processing system 300 include local stores (LS) 451-1 through LS 451-8 as cache memories as shown in FIG. 29, respectively. As a result, the eight sub CPU cores 442-1 through 442-8 can use storage areas of the LS 451-1 through LS 451-8 thereof and the XDR-RAM 403.

As the cache memory 111 in the personal computer 100 of FIG. 10, the sub CPU cores 442-1 through 442-8 can use exclusively the LS 451-1 through LS 451-8, respectively and write and read data on the LS 451-1 through LS 451-8 directly without using the dedicated bus 445 at a speed higher than a speed with the XDR-RAM 403. The LS 451-1 through LS 451-8 write and read data at a speed higher than the XDR-RAM 403. However, the LS 451-1 through LS 451-8 are more costly on a per memory capacity unit than the XDR-RAM 403 and each of the memory capacity of each of the LS 451-1 through LS 451-8 is smaller than the memory capacity of the XDR-RAM 403.

The memory capacity of the XDR-RAM 403 is also limited. The discussion that follows is based on the premise that the XDR-RAM 403 has a sufficiently large memory capacity and that each of the LS 451-1 through LS 451-8 has a small memory capacity and can store only a limited amount of data.

If there is no need to discriminate between the sub CPU cores 442-1 through 442-8, each of the sub CPU cores is referred to as a sub CPU core 442. If there is no need to discriminate between the LS 451-1 through LS 451-8, each is referred to as LS 451. The number of the sub CPU cores 442 (LSs 451) is set to be eight as shown in FIG. 28. In practice, any number of sub CPU cores 442 may be used.

The main CPU core 441 selects an optimum allocation method from among a plurality of prepared allocation methods. The sub CPU cores 442-1 through 442-8 are thus allocated to the processes of the encoder 10 and the decoder 20 in accordance with the selected allocation method.

Figure 30:
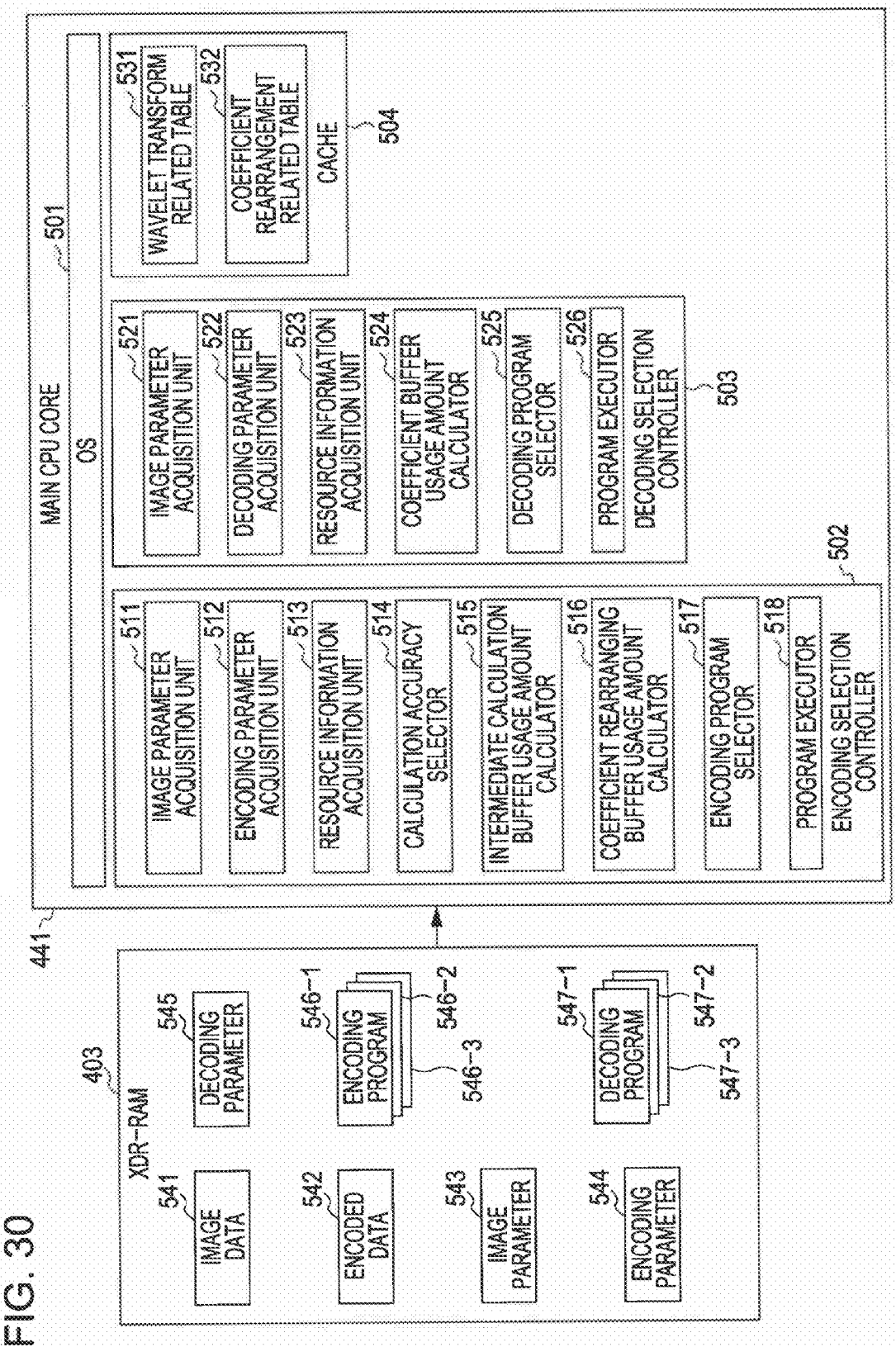
FIG. 30 is a block diagram illustrating a main CPU core in accordance with one embodiment of the present invention.

FIG. 30 is a functional block diagram of the main CPU core 441.

As shown in FIG. 30, the main CPU core 441 includes an operating system (OS) 501, an encoding selection controller 502, a decoding selection controller 503, and a cache 504. The OS 501 is basic software, generally controlling the information processing system 300 and causing hardware to execute a software program. The encoding selection controller 502 selects an allocation method to be incorporated in the encoder 10. The decoding selection controller 503 selects an allocation method to be incorporated into the decoder 20. The cache 504 is a local cache memory for the main CPU core 441.

The OS 501 manages the hardware resource of the information processing system 300. In response to a request from one of the encoding selection controller 502 and the decoding selection controller 503, the OS 501 supplies resource information relating to the hardware resource and allocates a hardware resource to a process. For example, the OS 501 reads from the HDD 405 one of an encoding program and a decoding program, allocates the program to one of the LS 451 and the XDR-RAM 403, and causes the sub CPU core 442 to perform a process. The OS 501 then reserves a memory area in the XDR-RAM 403.

The encoding selection controller 502 includes an image parameter acquisition unit 511, an encoding parameter acquisition unit 512, a resource information acquisition unit 513, a calculation accuracy selector 514, an intermediate calculation buffer usage amount calculator 515, a coefficient rearranging buffer usage amount calculator 516, an encoding program selector 517, and a program executor 518.

The image parameter acquisition unit 511 acquires an image parameter 543 stored on the XDR-RAM 403 as parameter information related to an image of image data 541 to be encoded or an image of encoded data 542 to be decoded. The encoding parameter acquisition unit 512 acquires an encoding parameter 544 stored on the XDR-RAM 403 as parameter information related to the encoding process. The resource information acquisition unit 513 acquires, via the OS 501, resource information containing at least one piece of information related to the number of currently usable sub CPU cores and the memory capacity of the LS 451. The calculation accuracy selector 514 selects calculation accuracy of the wavelet transform in accordance with the encoding parameter 544 acquired by the encoding parameter acquisition unit 512.

The intermediate calculation buffer usage amount calculator 515 calculates an intermediate calculation buffer usage amount of each component related to a necessary capacity as the intermediate calculation buffer 12. The coefficient rearranging buffer usage amount calculator 516 calculates a coefficient rearranging buffer usage amount of each component related to a necessary capacity as the coefficient rearranging buffer 13.

In accordance with one of a variety conditions, the encoding program selector 517 selects a program to be executed (referred to as a usage encoding program) from among an encoding program 546-1, an encoding program 546-2, and an encoding program 546-3, stored on the XDR-RAM 403. The program executor 518 executes the usage encoding program selected by the encoding program selector 517. In accordance with the allocation method of the encoding program, the program executor 518 allocates the hardware resource such as the sub CPU cores 442-1 through 442-8 to each process of the encoder 10 shown in FIG. 1. The program executor 518 thus causes these hardware resources to perform the encoding process of the image data 541. The process refers to a process performed by each element shown in FIG. 1.

The decoding selection controller 503 includes an image parameter acquisition unit 521, a decoding parameter acquisition unit 522, a resource information acquisition unit 523, a coefficient buffer usage amount calculator 524, a decoding program selector 525, and a program executor 526.

The image parameter acquisition unit 521 acquires the image parameter 543 from the XDR-RAM 403. The decoding parameter acquisition unit 522 acquires a decoding parameter 545 stored on the XDR-RAM 403 as parameter information. The resource information acquisition unit 523 acquires resource information of the information processing system 300 via the OS 501.

The coefficient buffer usage amount calculator 524 calculates a coefficient buffer usage amount of each component indicating to a memory capacity required as the coefficient buffer 22.

In accordance with one of a variety of conditions, the decoding program selector 525 selects a program to be executed (also referred usage decoding program) from among a decoding program 547-1, a decoding program 547-2, and a decoding program 547-3, stored on the XDR-RAM 403. The program executor 526 executes the usage decoding program selected by the decoding program selector 525. In accordance with the allocation method of the selected decoding program, the program executor 526 allocates the hardware resource such as the sub CPU cores 442-1 through 442-8 to processes of the decoder 20 of FIG. 6 and causes these hardware resources to perform the decoding process on the encoded data 542. The process herein refers to a process of each element of FIG. 6.

The cache 504 stores a wavelet transform related table 531 for use in selection of the encoding method and a coefficient rearrangement related table 532.

As shown in FIG. 31, the wavelet transform related table 531 contains a segmentation level, a 5×3 filter and a 9×7 filter and is used to calculate an index that is used to calculate a memory capacity required as the intermediate calculation buffer 12 for wavelet transform.

As shown in FIG. 32, the coefficient rearrangement related table 532 contains the segmentation level, a 5×3 filter and a 9×7 filter and is used to calculate an index that is used to calculate a memory capacity required as the coefficient rearranging buffer 13.

The XDR-RAM 403 stores the image data 541, the encoded data 542, the image parameter 543, the encoding parameter 544, the decoding parameter 545, the encoding programs 546-1 through 546-3 and the decoding programs 547-1 through 547-3.

The image data 541 is moving image data to be encoded. The encoded data 542 is data to be decoded and obtained by encoding the image data.

The image parameter 543 is parameter information related to an image. The image parameter 543 can contain any type of parameter. For example, the image parameter 543 may contain horizontal and vertical dimensions of an image, a bit depth, a type of wavelet transform, and the segmentation level of the wavelet transform.

The encoding parameter 544 indicates a predetermined encoding condition. The encoding parameter 544 may contain any type of parameter. For example, the encoding parameter 544 may contain types of filters used in the wavelet transform and the inverse wavelet transform, the segmentation level of the wavelet transform, and a presence of priority items including calculation accuracy, latency and throughput.

The decoding parameter 545 is parameter information indicating a decoding condition. The decoding parameter 545 may contain any type of parameter. For example, the decoding parameter 545 may contain a parameter indicating the presence or absence of priority items including calculation accuracy, latency and throughput.

The encoding programs 546-1 through 546-3 are software programs implementing the encoder 10 of FIG. 1 and have a hardware resource allocation method predetermined therewithin. The allocation method is different from software program to software program. If there is no need to discriminate between the encoding programs 546-1 through 546-3, each program is simply referred to as an encoding program 546.

The decoding programs 547-1 through 547-3 are software programs implementing the decoder 20 of FIG. 6 and have a hardware resource allocation method predetermined therewithin. The allocation method is different from software program to software program. If there is no need to discriminate between the decoding programs 547-1 through 547-3, each program is simply referred to as a decoding program 547.

As shown in FIG. 30, the XDR-RAM 403 stores three encoding programs 546 here. The number of encoding programs 546 stored on the XDR-RAM 403 (i.e., the number of allocation patterns) is any number. The number of encoding programs 546 can be two, or four or more. As shown in FIG. 30, the XDR-RAM 403 stores three decoding programs 547 here. The number of decoding programs 547 stored on the XDR-RAM 403 (i.e., the number of allocation patterns) is any number. The number of decoding programs 547 can be two, or four or more.

As shown in FIG. 30, each of the image data 541 through the decoding parameter 545 is represented as a single unit. This does not mean that each of the image data 541 through the decoding parameter 545 contains one data unit only. The number of data units contained in each of the image data 541 through the decoding parameter 545 stored on the XDR-RAM 403 can be any number.

Each process performed by the main CPU core 441 is described below.

The flow of the encoding selection control process performed by the encoding selection controller 502 is described with reference to a flowchart of FIG. 33. During the encoding process, the encoding selection control process is performed to select one usage encoding program from among the plurality of encoding programs 546 that are different in the allocation of the sub CPU cores 442-1 through 442-8. When the user issues an instruction to execute the encoding process, the encoding selection controller 502 starts the encoding selection control process.

In response to the start of the encoding selection control process, the image parameter acquisition unit 511 acquires the image parameter 543 from the XDR-RAM 403 in step S101. In step S102, the encoding parameter acquisition unit 512 acquires the encoding parameter 544 from the XDR-RAM 403. In step S103, the resource information acquisition unit 513 acquires the resource information relating to the usable hardware resource via the OS 501. In step S104, the calculation accuracy selector 514 selects and sets the calculation accuracy of the wavelet transform based on the image parameter 543 acquired in step S101 and the encoding parameter 544 acquired in step S102. The encoding selection control process will be described in detail later.

If the calculation accuracy is selected, the intermediate calculation buffer usage amount calculator 515 calculates in step S105 an intermediate calculation buffer usage amount indicating a memory capacity needed as the intermediate calculation buffer 12, using the wavelet transform related table 531 and the like. In step S106, the coefficient rearranging buffer usage amount calculator 516 calculates a coefficient rearranging buffer usage amount indicating a memory capacity needed as the coefficient rearranging buffer 13, using the coefficient rearrangement related table 532 and the like.

In step S107, the encoding program selector 517 selects the encoding program based on a variety of information including the image parameter 543, the resource information, the selected calculation accuracy, the intermediate calculation buffer usage amount and the coefficient rearranging buffer usage amount. The encoding program selection process will be described in detail later.

When the encoding program is selected, the program executor 518 allocates the sub CPU cores 442-1 through 442-8 to the processes in accordance with the allocation method of the selected encoding program 546 and causes the sub CPU cores 442-1 through 442-8 to perform the respective processes in step S108.

Step S108 completes the encoding selection control process.

Figure 33:
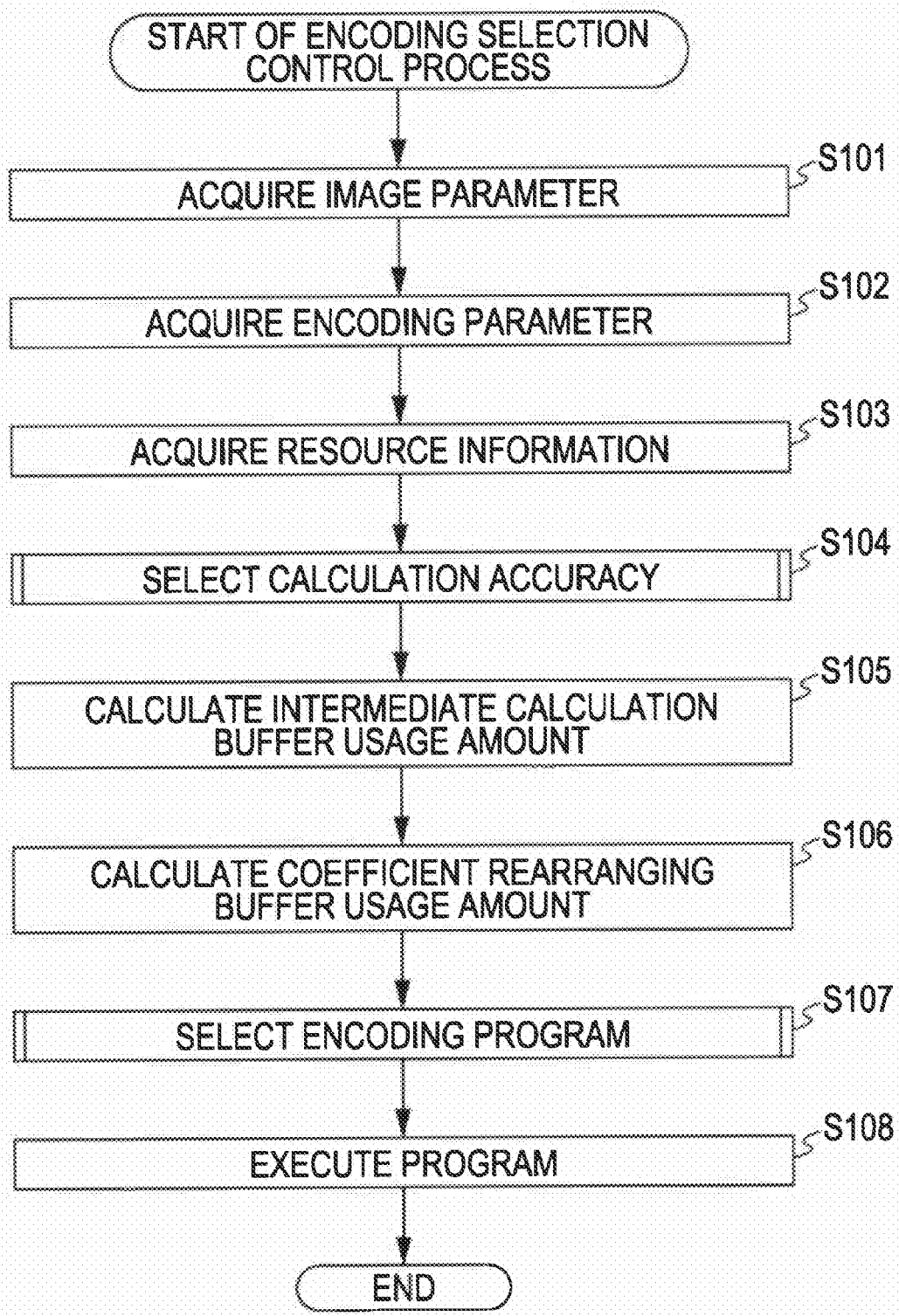
FIG. 33 is a flowchart illustrating an encoding selection control process.

The calculation accuracy selection process performed in step S104 of FIG. 33 is described below with reference to a flowchart of FIG. 34.

In response to the start of the calculation accuracy selection process, the calculation accuracy selector 514 determines in step S121 based on the encoding parameter 544 whether the type of the filter to be used in the wavelet transform is the 5×3 filter or the 9×7 filter. If it is determined in step S121 that the filter to be used is the 5×3 filter, processing proceeds to step S122.

The calculation accuracy selector 514 determines in step S122 based on the encoding parameter 544 whether to perform lossless encoding. If it is determined in step S122 that lossless coding is to be performed, processing proceeds to step S123. The calculation accuracy selector 514 determines in step S123 based on the image parameter 543 whether a bit depth of the image data 541 is thirteen or less.

If it is determined in step S123 that the bit depth of the image data 541 is thirteen or less, processing proceeds to step S124. The calculation accuracy selector 514 selects and sets a 16-bit fixed point number type as the calculation accuracy. Subsequent to step S124, the calculation accuracy selection process is completed. Processing returns to step S104 of FIG. 33 to proceed to step S105.

Figure 34:
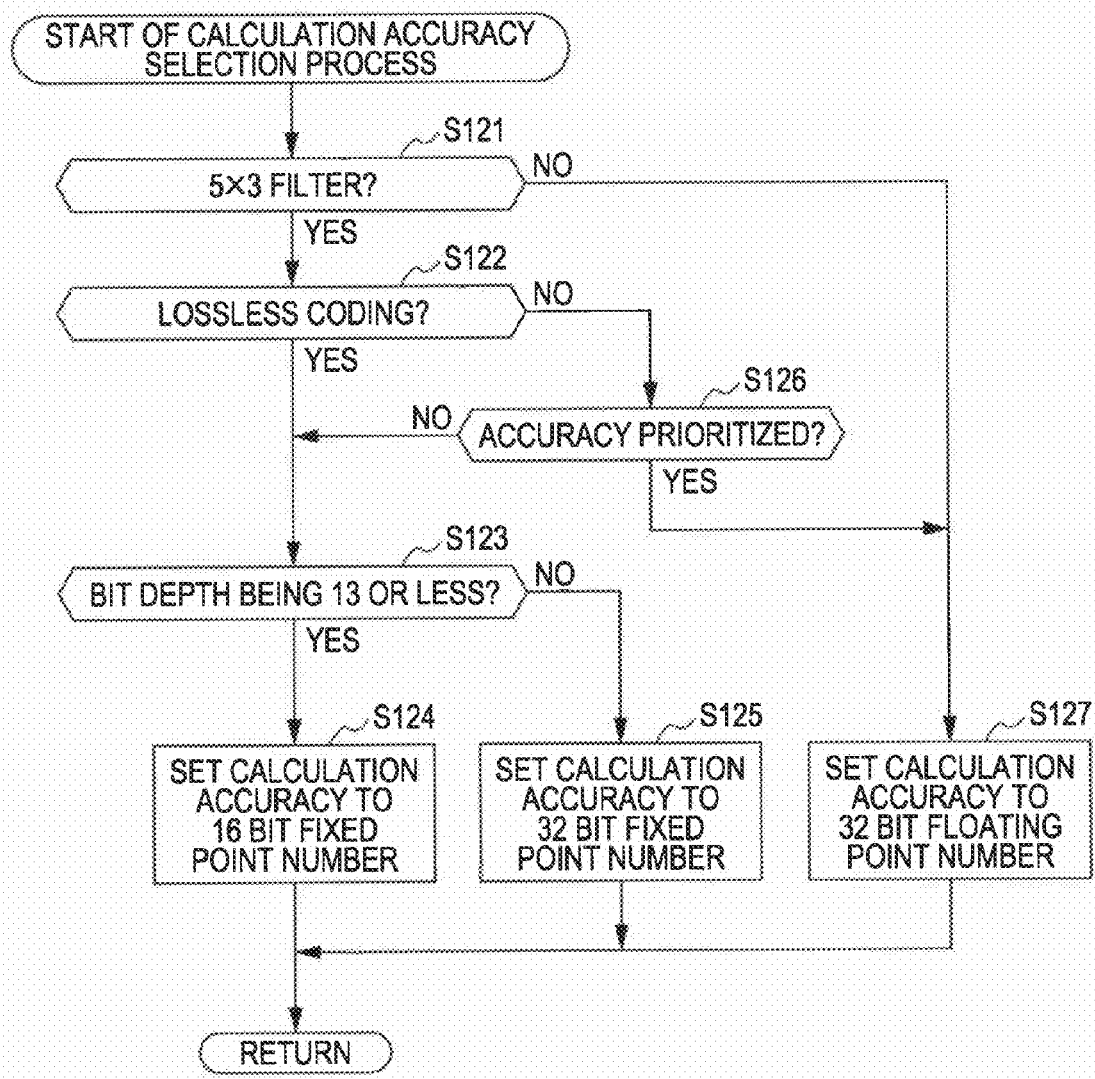
FIG. 34 is a flowchart illustrating a calculation accuracy selection process.

If it is determined in step S123 of FIG. 34 that the bit depth is more than thirteen, processing proceeds to step S125. In step S125, the calculation accuracy selector 514 selects and sets a 32-bit fixed point type as the calculation accuracy. Subsequent to step S125, the calculation accuracy selection process ends. Processing returns to step S104 of FIG. 33 to proceed to step S105.

If it is determined in step S122 of FIG. 34 that lossy coding is to be performed, processing proceeds to step S126. In step S126, the calculation accuracy selector 514 determines based on the encoding parameter 544 whether accuracy is prioritized. If it is determined in step S126 that accuracy is not prioritized, processing returns to step S123. Step S123 and subsequent steps are then repeated.

If it is determined in step S126 that accuracy is prioritized, processing proceeds to step S127. If it is determined in step S121 based on the image parameter 543 that the filter type to be used in the wavelet transform is a 9×7 filter, processing proceeds to step S127.

In step S127, the calculation accuracy selector 514 selects and sets a 32-bit floating point number type as the calculation accuracy. Subsequent to step S127, the calculation accuracy selection process ends. Processing returns to step S104 of FIG. 33. Step S105 and subsequent steps are then performed.

The calculation accuracy is now selected.

The encoding program selection process executed in step S107 of FIG. 33 is described with reference to a flowchart of FIG. 35.

In step S141, the encoding program selector 517 determines whether the LS 451 has sufficient usable memory capacity as the intermediate calculation buffer 12 for two components. This determination is performed based on the intermediate calculation buffer usage amount calculated by the intermediate calculation buffer usage amount calculator 515 and the usage amount indicating the usable memory capacity of the LS 451 recognized by the resource information acquisition unit 513. In other words, the encoding program selector 517 determines whether the usage amount of the LS 451 is equal to or greater than the sum of intermediate calculation buffer usage amounts of the two components. If it is determined in step S141 that the LS 451 has a sufficient memory capacity, processing proceeds to step S142.

In step S142, the encoding program selector 517 determines whether the LS 451 has a sufficient usable amount as the intermediate calculation buffer 12 and the coefficient rearranging buffer 13 for the two components. This determination is performed based on the intermediate calculation buffer usage amount calculated by the intermediate calculation buffer usage amount calculator 515, the coefficient rearranging buffer usage amount calculated by the coefficient rearranging buffer usage amount calculator 516, and the usage amount of the LS 451 recognized by the resource information acquisition unit 513. More specifically, the encoding program selector 517 determines whether the usage amount of the LS 451 is equal to or greater than the sum of the intermediate calculation buffer usage amount and the coefficient rearranging buffer usage amount of the two components. If it is determined in step S142 that the LS 451 has a sufficient memory capacity, processing proceeds to step S143.

In step S143, the encoding program selector 517 determines based on the encoding parameter 544 whether throughput is prioritized. If it is determined in step S143 that throughput is prioritized, processing proceeds to step S144.

In step S144, the encoding program selector 517 selects an encoding program A that implements the allocation method described with reference to FIG. 11. More specifically, as shown in FIG. 11, one sub CPU core 442 is allocated to all processes of the encoder 10. The LS 451 incorporates both the intermediate calculation buffer 12 and the coefficient rearranging buffer 13. Subsequent to step S144, the encoding program selection process ends. Processing returns to step S107 of FIG. 33 to proceed to step S108.

Figure 35:
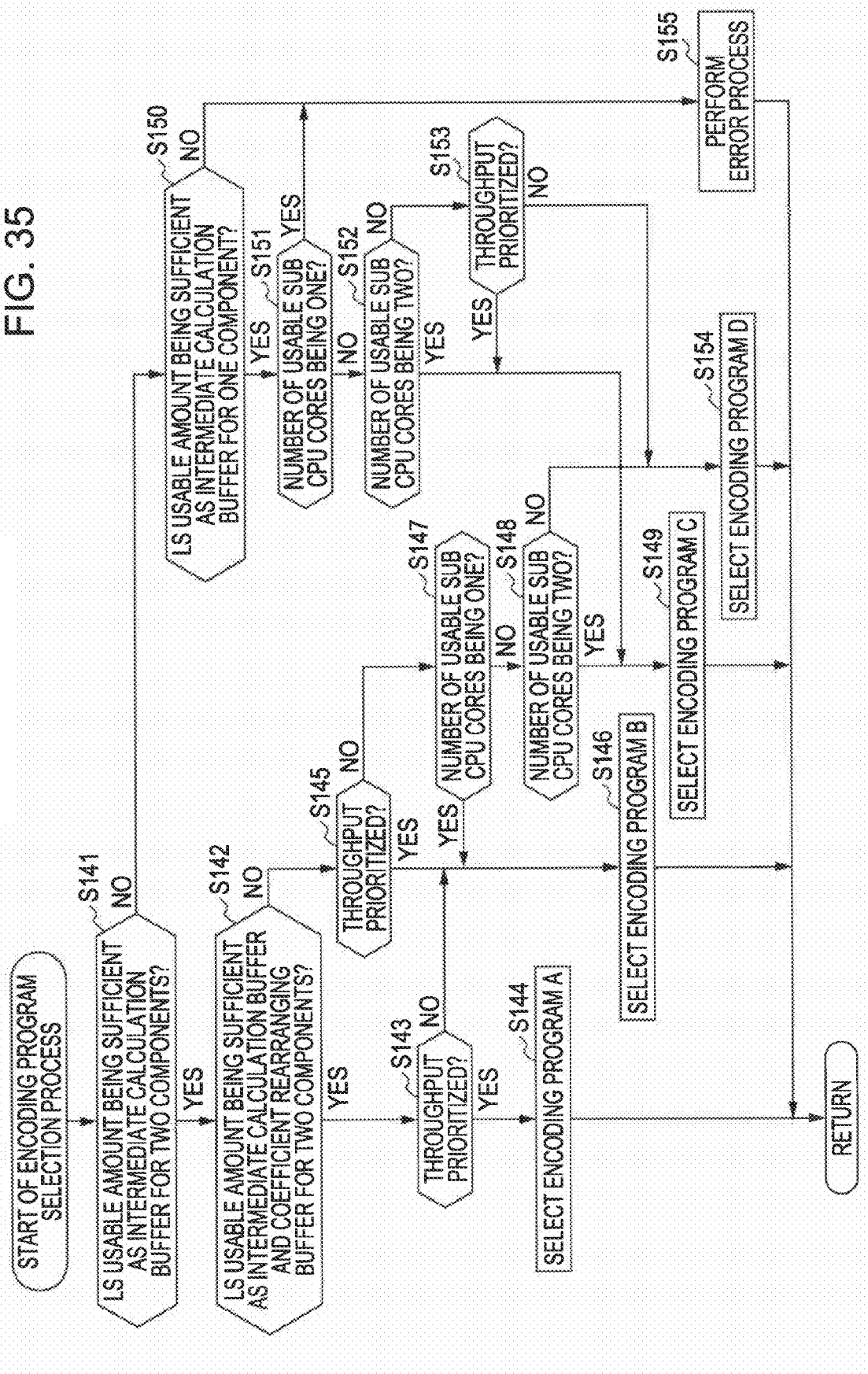
FIG. 35 is a flowchart illustrating an encoding method selection process.

If it is determined in step S142 of FIG. 35 that the usage amount of the LS 451 is not sufficient to serve as the intermediate calculation buffer 12 and the coefficient rearranging buffer 13, processing proceeds to step S145. In step S145, the encoding program selector 517 determines based on the encoding parameter 544 whether throughput is prioritized. If it is determined in step S145 that throughput is prioritized, processing proceeds to step S146. If it is determined in step S143 that throughput is not prioritized, processing proceeds to step S146.

In step S146, the encoding program selector 517 selects an encoding program B that implements the allocation method described with reference to FIG. 13. More specifically, as shown in FIG. 13, one sub CPU core 442 is allocated to all processes of the encoder 10. The LS 451 incorporates the intermediate calculation buffer 12. The coefficient rearranging buffer 13 is formed in the XDR-RAM 403 as a shared memory. Subsequent to step S146, the encoding program selection process ends. Processing returns to step S107 of FIG. 33 to proceed to step S108.

If it is determined in step S145 of FIG. 35 that throughput is not prioritized, processing proceeds to step S147. In step S147, the encoding program selector 517 determines, based on the resource information acquired by the resource information acquisition unit 513, whether the number of currently usable sub CPU cores 442 is one. If it is determined in step S147 that the number of currently usable sub CPU cores 442 is one, processing returns to step S146. If it is determined in step S147 that a plurality of currently usable sub CPU cores 442 are present, processing proceeds to step S148. In step S148, the encoding program selector 517 determines, based on the resource information acquired by the resource information acquisition unit 513, whether the number of currently usable sub CPU cores 442 is two. If it is determined in step S148 that the number of currently usable sub CPU cores 442 is two, processing proceeds to step S149.

In step S149, the encoding program selector 517 selects an encoding program C that implements the allocation method discussed with reference to FIG. 14. As shown in FIG. 14, one of the two sub CPU cores 442 handled as one set is allocated to all processes of the encoder 10 encoding the image data Y and the other of the two sub CPU cores 442 is allocated to all processes of the encoder 10 encoding the image data C. The intermediate calculation buffer 12-1 to be used in the wavelet transform of the image data Y is formed in the LS 451 of the sub CPU core 442 encoding the image data Y. The intermediate calculation buffer 12-2 to be used in the wavelet transform of the image data C is formed in the LS 451 of the sub CPU core 442 encoding the image data C. The XDR-RAM 403 as a shared memory incorporates both the coefficient rearranging buffer 13-1 storing the coefficient data generated from the image data Y and the coefficient rearranging buffer 13-2 storing the coefficient data generated from the image data C. Subsequent to step S149, the encoding program selection process ends. Processing returns to step S107 of FIG. 33 to proceed to step S108.

If it is determined in step S141 of FIG. 35 that the LS 451 does not have sufficient usable memory capacity as the intermediate calculation buffer 12 for two components, processing proceeds to step S150. In step S150, the encoding program selector 517 determines whether the LS 451 has sufficient usable memory capacity as the intermediate calculation buffer 12 for one component. This determination is performed based on the intermediate calculation buffer usage amount calculated by the intermediate calculation buffer usage amount calculator 515 and the usage amount indicating the usable memory capacity of the LS 451 recognized by the resource information acquisition unit 513. In other words, the encoding program selector 517 determines whether the usage amount of the LS 451 is equal to or greater than the sum of intermediate calculation buffer usage amounts of each component. If it is determined in step S150 that the LS 451 has a sufficient memory capacity, processing proceeds to step S151.

In step S151, the encoding program selector 517 determines, based on the resource information acquired by the resource information acquisition unit 513, whether the number of currently usable sub CPU cores 442 is one. If it is determined in step S151 that a plurality of usable sub CPU cores 442 are present, processing proceeds to step S152. In step S152, the encoding program selector 517 determines, based on the resource information acquired by the resource information acquisition unit 513, whether the number of currently usable sub CPU cores 442 is two. If it is determined in step S152 that the number of currently usable sub CPU cores 442 is two, processing returns to step S149.

If it is determined in step S152 that the number of currently usable sub CPU cores 442 is three or more, processing proceeds to step S153. In step S153, the encoding program selector 517 determines, based on the encoding parameter 544, whether throughput is prioritized. If it is determined in step S153 that throughput is prioritized, processing returns to step S149.

If it is determined in step S153 that throughput is not prioritized, processing proceeds to step S154. If it is determined in step S148 that the number of currently usable sub CPU cores 442 is three or more, processing proceeds to step S154.

In step S154, the encoding program selector 517 selects an encoding program D that implements the allocation method discussed with reference to FIG. 16. As shown in FIG. 16, four different sub CPU cores 442, handled as a set, are allocated to the processes of the wavelet transformer 11-1 of the encoder 10 encoding the image data Y, the processes of the coefficient rearranger 14-1 and the entropy encoder 15-1 of the encoder 10 encoding the image data Y, the processes of the wavelet transformer 11-2 of the encoder 10 encoding the image data C, and the processes of the coefficient rearranger 14-2 and the entropy encoder 15-2 of the encoder 10 encoding the image data C.

The intermediate calculation buffer 12-1 of the encoder 10 encoding the image data Y is formed in the LS 451 of the sub CPU core 442 allocated to the process of the wavelet transformer 11-1. The intermediate calculation buffer 12-2 of the encoder 10 encoding the image data C is formed in the LS 451 of the sub CPU core 442 allocated to the process of the wavelet transformer 11-2.

Formed in the XDR-RAM 403 are the coefficient rearranging buffer 13-1 of the encoder 10 encoding the image data Y and the coefficient rearranging buffer 13-2 of the encoder 10 encoding the image data C. Subsequent to step S154, the encoding method selection process ends. Processing returns to step S107 of FIG. 33 to proceed to step S108.

If it is determined in step S150 that the LS 451 does not have sufficient usable memory capacity as the intermediate calculation buffer 12 for one component, processing proceeds to step S155. If it is determined in step S151 that the number of currently usable sub CPU cores 442 is one, processing proceeds to step S155. In this case, none of the four prepared encoding programs can be selected (implemented) and in step S155, the encoding program selector 517 performs an error process, such as notifying the user that none of the four prepared encoding programs can be selected. Subsequent to step S155, the encoding program selection process ends. Processing returns to step S107 of FIG. 33 to proceed to step S108.

The encoding selection controller 502 thus appropriately allocates the hardware resource based on the image parameter 543, the resource information, the encoding parameter 544, etc. so that the encoder 10 operates efficiently under an actual operating condition.

The resource allocation may be performed by any unit. For example, the resource allocation may be performed by precinct or by picture. In the above discussion, the four allocation methods are prepared and the encoding program selector 517 selects one from the four methods. The number of allocation methods of the prepared hardware resource may be any number. More specifically, the number of the encoding programs 546 is optional. The allocation method of the hardware resource is not limited to any particular one. Another method different from the above-described four methods may also be used.

Any one of the eight sub CPU cores 442-1 through 442-8 may be used to operate the above-described encoding programs A through D in parallel. More specifically, the encoding selection controller 502 modifies the allocation of the hardware resource by using a different encoding method for each precinct or picture. The encoding selection controller 502 allocates the hardware resource to each process of the encoder 10 in order to use efficiently the hardware resource. The encoder 10 thus efficiently operates.

The flow of a decoding selection control process to be executed by the decoding selection controller 503 is described below with reference to a flowchart of FIG. 36. During the decoding process, the decoding selection control process is performed in order to select one usage decoding program from among the plurality of decoding programs 547 that are different in the allocation of the sub CPU cores 442-1 through 442-8. When the user issues an instruction to execute the decoding process, the decoding selection controller 503 starts the decoding selection control process.

In response to the start of the decoding selection control process, the image parameter acquisition unit 521 acquires the image parameter 543 of the encoded data 542 to be decoded from the XDR-RAM 403 in step S201. In step S202, the display 422 acquires the decoding parameter 545 from the XDR-RAM 403. In step S203, the resource information acquisition unit 523 acquires the resource information relating to the usable hardware resource via the OS 501.

In step S204, the coefficient buffer usage amount calculator 524 calculates a coefficient buffer usage amount needed as the coefficient buffer 22 using the wavelet transform related table 531 and the like.

In step S205, the decoding program selector 525 selects the decoding program based on a variety of information including the decoding parameter 545, the resource information, the calculated coefficient buffer usage amount, etc. The decoding program selection process will be described in detail later.

When the decoding program is selected, the program executor 526 allocates the sub CPU cores 442-1 through 442-8 to the processes in accordance with the allocation method of the decoding program 547 and causes the sub CPU cores 442-1 through 442-8 to perform the respective processes.

Step S206 completes the decoding selection control process.

Figure 36:
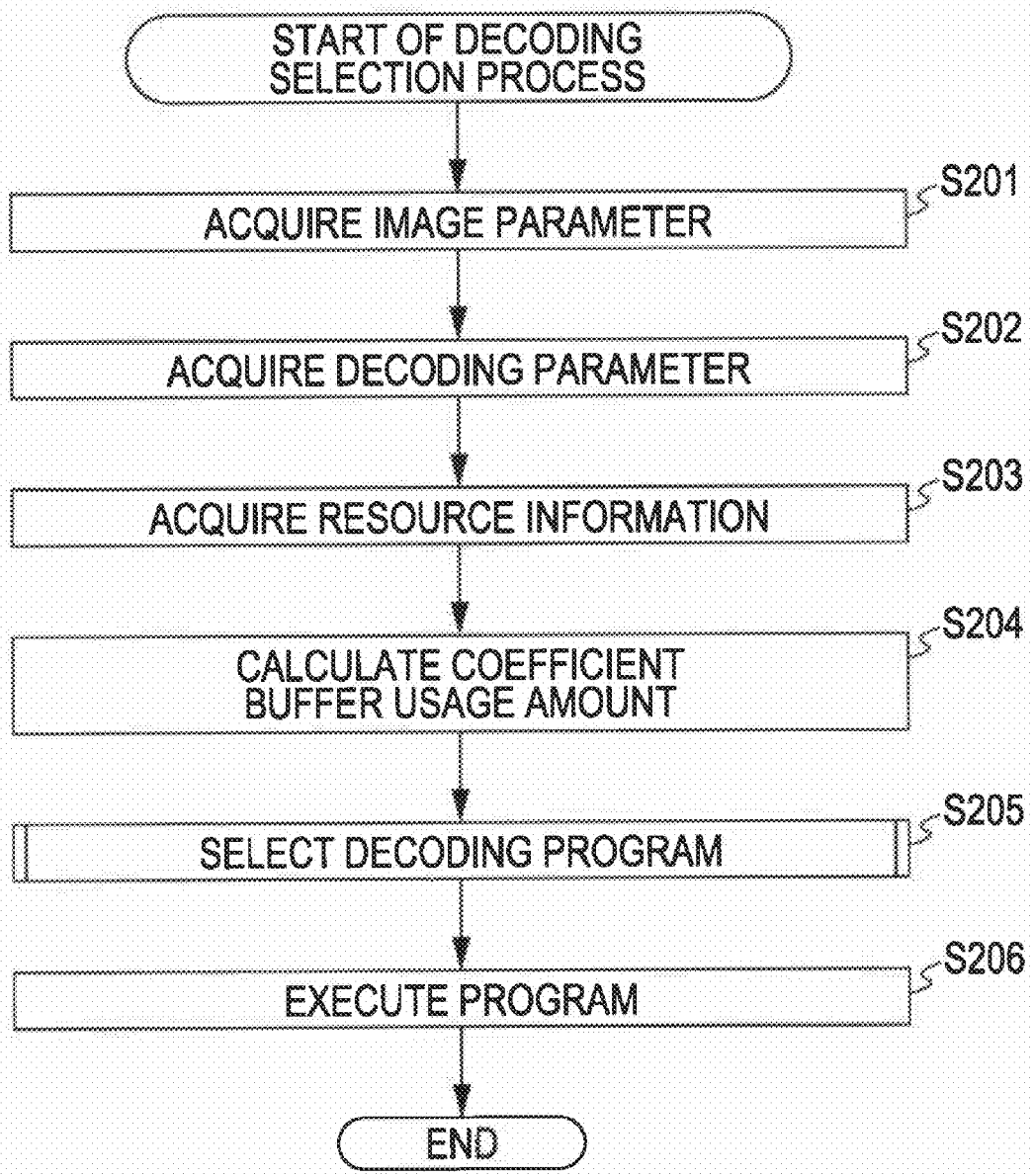
FIG. 36 is a flowchart illustrating a decoding selection control process.

The flow of the decoding program selection process to be executed in step S205 of FIG. 36 is described below with reference a flowchart of FIG. 37.

In step S221, the decoding program selector 525 determines whether the LS 451 has sufficient usable memory capacity as the coefficient buffer 22. This determination is performed based on the intermediate calculation buffer usage amount calculated by the coefficient buffer usage amount calculator 524 and the usage amount indicating the usable memory capacity of the LS 451 recognized by the resource information acquisition unit 523. More specifically, the decoding program selector 525 determines whether the usage amount of the LS 451 is equal to or greater than the sum of intermediate calculation buffer usage amounts of the components. If it is determined in step S221 that the LS 451 has a sufficient memory capacity, processing proceeds to step S222.

In step S222, the decoding program selector 525 determines, based on the decoding parameter 545, whether the decoding process is throughput-prioritized. If it is determined in step S222 that the decoding process is throughput-prioritized, processing proceeds to step S223.

In step S223, the decoding program selector 525 determines whether the LS 451 has a sufficient usable amount as the coefficient buffer 22 for the two components. This determination is performed based on the coefficient rearranging buffer usage amount calculated by the coefficient buffer usage amount calculator 524, and the usage amount of the LS 451 recognized by the resource information acquisition unit 523. More specifically, the decoding program selector 525 determines whether the usage amount of the LS 451 is equal to or greater than the sum of the coefficient rearranging buffer usage amount of the two components. If it is determined in step S223 that the LS 451 has a sufficient memory capacity, processing proceeds to step S224.

In step S224, the decoding program selector 525 selects a decoding program A that implements the allocation method described with reference to FIG. 18. More specifically, as shown in FIG. 18, one sub CPU core 442 is allocated to all processes of the decoder 20. The coefficient buffer 22 is formed in the LS 451. Subsequent to step S224, the decoding program selection process ends. Processing returns to step S205 of FIG. 36 to proceed to step S206.

Figure 37:
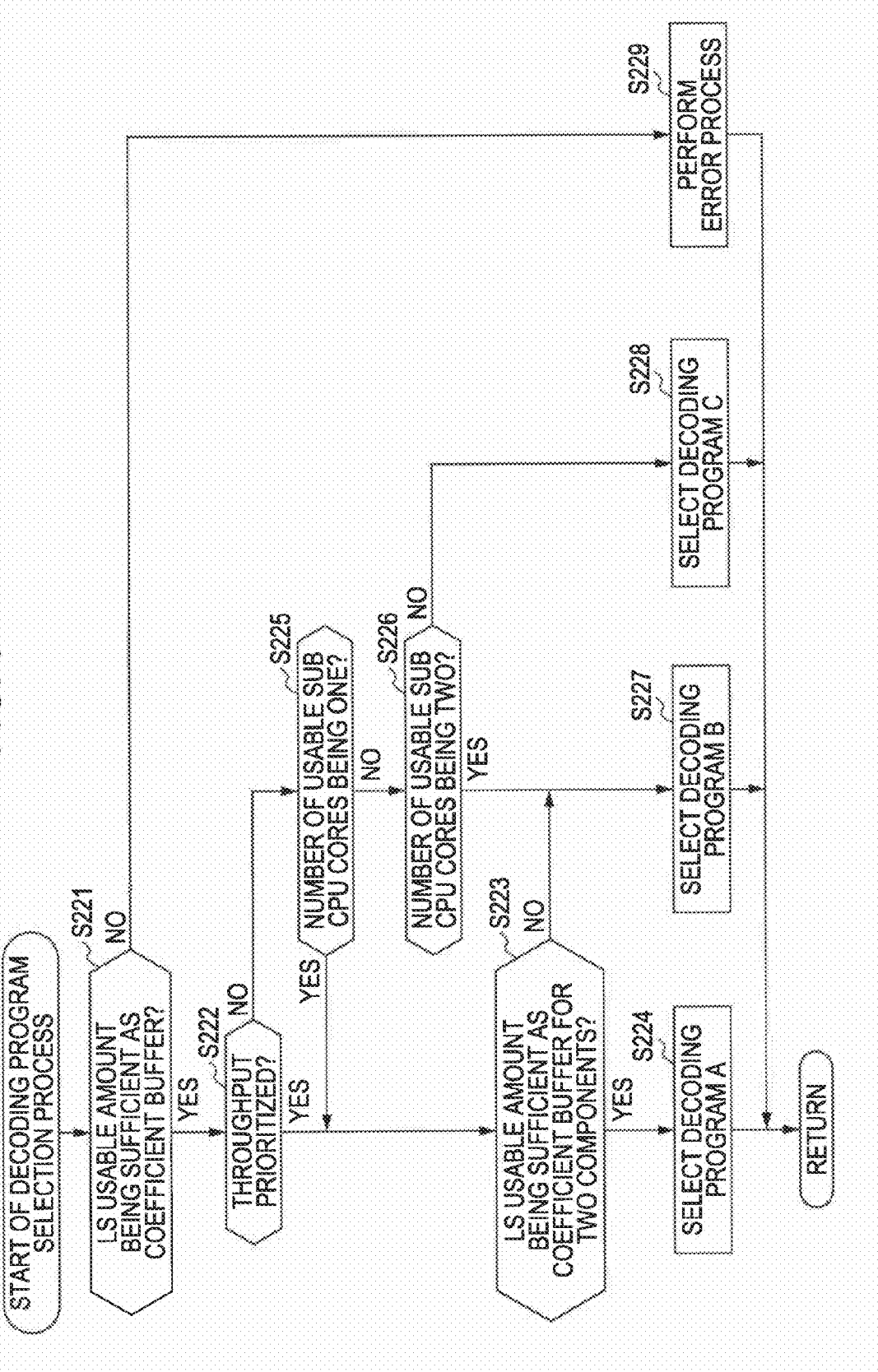
FIG. 37 is a flowchart illustrating a decoding method selection process.

If it is determined in step S222 of FIG. 37 that the decoding process is not throughput-prioritized, processing proceeds to step S225. In step S225, the decoding program selector 525 determines, based on the resource information acquired by the resource information acquisition unit 523, whether the number of currently usable sub CPU cores 442 is one. If it is determined in step S225 that the number of currently usable sub CPU cores 442 is one, processing returns to step S223 to perform repeat step S223 and subsequent steps. If it is determined in step S225 that a plurality of currently usable sub CPU cores 442 are present, processing proceeds to step S226.

In step S226, the decoding program selector 525 determines, based on the resource information acquired by the resource information acquisition unit 523, whether the number of currently usable sub CPU cores 442 is two. If it is determined in step S226 that the number of currently usable sub CPU cores 442 is two, processing proceeds to step S227. If it is determined in step S223 that the LS 451 has no sufficient usable amount as the coefficient buffer 22 for the two components, processing proceeds to step S227.

In step S227, the decoding program selector 525 selects an decoding program B that implements the allocation method discussed with reference to FIG. 20. As shown in FIG. 20, one of the two sub CPU cores 442 handled as one set is allocated to all processes of the decoder 20 decoding the image data Y and the other of the two sub CPU cores 442 is allocated to all processes of the decoder 20 decoding the image data C. The coefficient buffer 22-1 of the decoder 20 decoding the encoded data Y is formed in the LS 451 of the sub CPU core 442 allocated to the decoder 20 decoding the encoded data Y. The coefficient buffer 22-2 of the decoder 20 decoding the encoded data C is formed in the LS 451 of the sub CPU core 442 allocated to the decoder 20 decoding the encoded data C. Subsequent to step S227, the decoding program selection process ends. Processing returns to step S205 of FIG. 36 to proceed to step S206.

If it is determined in step S226 of FIG. 37 that the number of currently usable sub CPU cores 442 is three or more, processing proceeds to step S228.

In step S228, the decoding program selector 525 selects an encoding program C that implements the allocation method discussed with reference to FIG. 22. As shown in FIG. 22, four different sub CPU cores 442, handled as a set, are allocated to the process of the entropy decoder 21-1 of the decoder 20 decoding the encoded data Y, the process of the inverse wavelet transformer 23-1 of the decoder 20 decoding the encoded data Y, the process of the entropy decoder 21-2 of the decoder 20 decoding the encoded data C, and the process of the inverse wavelet transformer 23-2 of the decoder 20 decoding the encoded data C.

The coefficient buffer 22-1 of the decoder 20 decoding the encoded data Y is formed in the LS 451 of the sub CPU core 442 allocated to the process of the inverse wavelet transformer 23-1. The coefficient buffer 22-2 of the decoder 20 decoding the encoded data C is formed in the LS 451 of the sub CPU core 442 allocated to the process of the inverse wavelet transformer 23-2.

Subsequent to step S228, the decoding program selection process ends. Processing returns to step S205 of FIG. 36 to proceed to step S206.

If it is determined in step S221 of FIG. 37 that the LS 451 has no sufficient usable memory capacity as the coefficient buffer 22, processing proceeds to step S229. In this case, none of the three prepared decoding programs can be selected (implemented) and in step S229, the decoding program selector 525 performs an error process, such as notifying the user that none of the three prepared encoding programs can be selected. Subsequent to step S229, the decoding program selection process ends. Processing returns to step S205 of FIG. 36 to proceed to step S206.

The decoding selection controller 503 thus appropriately allocates the hardware resource based on the image parameter 543 of the encoded data 542, the resource information, the decoding parameter 545, etc. so that the decoder 20 operates efficiently under an actual operating condition.

The resource allocation may be performed by any unit. For example, the resource allocation may be performed by precinct or by picture. In the above discussion, the three allocation methods are prepared and the decoding program selector 525 selects one from the three methods. The number of allocation methods of the prepared hardware resource may be any number. More specifically, the number of the decoding program 547 is optional. The allocation method of the hardware resource is not limited to any particular one. Another method different from the above-described three methods may also be used.

Any one of the eight sub CPU cores 442-1 through 442-8 may be used to operates the above-described decoding programs A through C in parallel. More specifically, the decoding selection controller 503 modifies the allocation of the hardware resource by using a different decoding method for each precinct or picture. The decoding selection controller 503 allocates the hardware resource to each process of the decoder 20 in order to use efficiently the hardware resource. The decoder 20 thus efficiently operates.

Specific examples of the allocation are described below.

In a first example, the image data 541 to be encoded has an image size of 1920 pixels by 1080 pixels, a data structure of Y/C components of a luminance component Y and a color difference component C, and a bit depth of 12 bits. The filter to be used in the wavelet transform is a 5×3 filter, the segmentation level of the wavelet transform is four, and accuracy prioritization is not set. The number of currently usable sub CPU cores 442 is four or more, and the memory capacity of the LS 451 of the sub CPU core 442 is 256 Kbytes.

Lossless encoding and latency are set as encoding conditions in the encoding parameter 544. Latency is prioritized as decoding conditions in the decoding parameter 545.

The calculation accuracy selector 514 selects the calculation accuracy selection process described in the flowchart of FIG. 34. The calculation accuracy selector 514 thus selects the 16-bit fixed point type under the conditions of the 5×3 filter, the lossless encoding, the accuracy not prioritized, and the bit depth of 13 or less. The intermediate calculation buffer usage amount calculator 515 sets "17.5" for a related index under the conditions of the 5×3 filter and the segmentation level of 4 using the wavelet transform related table 531. The intermediate calculation buffer usage amount calculator 515 calculates the intermediate calculation buffer usage amount by multiplying a horizontal size (1920 pixels) of an input image, a calculation accuracy (16 bits) and the related index (7.5).

The coefficient rearranging buffer usage amount calculator 516 sets "42.25" for a related index under the conditions of 5×3 filter and the segmentation level of 4 using the coefficient rearrangement related table 532. The coefficient rearranging buffer usage amount calculator 516 further calculates the coefficient rearranging buffer usage amount by multiplying a horizontal size (1920 pixels) of an input image, a unit size, and the related index (42.25).

The encoding program selector 517 performs the encoding program selection process of FIG. 35 based on the calculation results, the resource information and the like. The usage amount of the LS 451 is sufficient as the intermediate calculation buffer 12 for the two components but insufficient as the intermediate calculation buffer 12 and the coefficient rearranging buffer 13 for the two components. Latency is prioritized and the number of usable sub CPU cores 442 is four. The encoding program selector 517 selects the encoding program D performing the allocation of FIG. 16.

With such an allocation, the encoder 10 performs the encoding process of FIG. 17. More specifically, the encoder 10 performs the encoding process with a low latency.

With the CPU allocated to the decoder 20 under this condition, the decoding program selector 525 performs the decoding program selection process illustrated in the flowchart of FIG. 37. The usage amount of the LS 451 is sufficient as the coefficient buffer 22, latency is prioritized, and the number of usable sub CPU cores 442 is four. The decoding program selector 525 selects the decoding program C performing the allocation of FIG. 22.

With such an allocation, the decoder 20 performs the decoding process of FIG. 23. More specifically, the decoder 20 performs the decoding process with a low latency.

Real-time image exchanging is performed in a video conference system, for example. In such a system, the encoding process and the decoding process need to be performed with a low latency. The encoding selection controller 502 and the decoding selection controller 503 allocate the hardware resource in an appropriate manner so that the encoder 10 and the decoder 20 perform the processes thereof with a low latency.

In a second example, the image data 541 to be encoded has an image size of 1280 pixels by 720 pixels, a data structure of Y/C components of a luminance component Y and a color difference component C, and a bit depth of 12 bits. The filter to be used in the wavelet transform is a 9×7 filter, the segmentation level of the wavelet transform is four, and accuracy is not prioritized. The number of currently usable sub CPU cores 442 is four or more, and the memory capacity of the LS 451 of the sub CPU core 442 is 256 Kbytes.

Throughput is prioritized as encoding conditions in the encoding parameter 544. Throughput is prioritized as decoding conditions in the decoding parameter 545.

The calculation accuracy selector 514 selects the calculation accuracy selection process described in the flowchart of FIG. 34. The calculation accuracy selector 514 thus selects the 32-bit floating point type under the conditions of the 9×7 filter. The intermediate calculation buffer usage amount calculator 515 sets "11.25" for a related index under the conditions of the 9×7 filter and the segmentation level of 4 using the wavelet transform related table 531. The intermediate calculation buffer usage amount calculator 515 calculates the intermediate calculation buffer usage amount by multiplying a horizontal size (1280 pixels) of an input image, a calculation accuracy (32 bits) and the related index (11.25).

The coefficient rearranging buffer usage amount calculator 516 sets "194.75" for a related index under the conditions of the 9×7 filter and the segmentation level of 4 using the coefficient rearrangement related table 532. The coefficient rearranging buffer usage amount calculator 516 further calculates the coefficient rearranging buffer usage amount by multiplying a horizontal size (1280 pixels) of an input image, a unit size, and the related index (94.75).

The encoding program selector 517 performs the encoding program selection process of FIG. 35 based on the calculation results, the resource information and the like. The usage amount of the LS 451 is sufficient as the intermediate calculation buffer 12 for the two components but insufficient as the intermediate calculation buffer 12 and the coefficient rearranging buffer 13 for the two components. Throughput is prioritized. The encoding program selector 517 selects the encoding program B performing the allocation of FIG. 13.

With such an allocation, the encoder 10 performs the encoding process of FIG. 12. More specifically, the encoder 10 performs the encoding process with high throughput.

With the CPU allocated to the decoder 20 under this condition, the decoding program selector 525 performs the decoding program selection process illustrated in the flowchart of FIG. 37. The usage amount of the LS 451 is sufficient as the coefficient buffer 22, and throughput is prioritized. The usage amount of the LS 451 is sufficient for the coefficient buffer 22 for the two components. The decoding program selector 525 selects the decoding program A performing the allocation of FIG. 18.

With such an allocation, the decoder 20 performs the decoding process of FIG. 19. More specifically, the decoder 20 performs the decoding process with a high throughput.

The encoding process and the decoding process need to be performed at a high speed (at a high throughput) in a system that processes high frame-rate image data. In such a system, the encoding selection controller 502 and the decoding selection controller 503 allocate the hardware resource in an appropriate manner so that the encoder 10 and the decoder 20 perform the processes thereof at a high throughput.

In a third example, the image data 541 to be encoded has an image size of 4096 pixels by 2160 pixels, a data structure of Y/C components of a luminance component Y and a color difference component C, and a bit depth of 12 bits. The filter to be used in the wavelet transform is a 9×7 filter, and the segmentation level of the wavelet transform is four. The number of currently usable sub CPU cores 442 is four or more, and the memory capacity of the LS 451 of the sub CPU core 442 is 256 Kbytes.

Throughput is prioritized as encoding conditions in the encoding parameter 544. Throughput is prioritized as decoding conditions in the decoding parameter 545.

The calculation accuracy selector 514 selects the calculation accuracy selection process described in the flowchart of FIG. 34. The calculation accuracy selector 514 thus selects the 32-bit floating point type under the conditions of the 9×7 filter. The intermediate calculation buffer usage amount calculator 515 sets "11.25" for a related index under the conditions of the 9×7 filter and the segmentation level of 4 using the wavelet transform related table 531. The intermediate calculation buffer usage amount calculator 515 calculates the intermediate calculation buffer usage amount by multiplying a horizontal size (4096 pixels) of an input image, a calculation accuracy (32 bits) and the related index (11.25).

The coefficient rearranging buffer usage amount calculator 516 sets "94.75" for a related index under the conditions of 9×7 filter and the segmentation level of 4 using the coefficient rearrangement related table 532. The coefficient rearranging buffer usage amount calculator 516 further calculates the coefficient rearranging buffer usage amount by multiplying a horizontal size (4096 pixels) of an input image, a unit size, and the related index (94.75).

The encoding program selector 517 performs the encoding program selection process of FIG. 35 based on the calculation results, the resource information and the like. The usage amount of the LS 451 is sufficient as the intermediate calculation buffer 12 for one component but insufficient as the intermediate calculation buffer 12 for two components. The number of usable sub CPU cores 442 is four and throughput is prioritized. The encoding program selector 517 selects the encoding program C performing the allocation of FIG. 14.

With such an allocation, the encoder 10 performs the encoding process of FIG. 15. More specifically, the encoder 10 performs the encoding process with a throughput higher than the throughput in the encoding program D and with a latency lower than the latency in the encoding program B.

With the CPU allocated to the decoder 20 under this condition, the decoding program selector 525 performs the decoding program selection process illustrated in the flowchart of FIG. 37. The usage amount of the LS 451 is sufficient as the coefficient buffer 22, and throughput is prioritized. The usage amount of the LS 451 is insufficient for the coefficient buffer 22 for the two components. The number of sub CPU cores 442 is four. The decoding program selector 525 selects the decoding program B performing the allocation of FIG. 20.

With such an allocation, the decoder 20 performs the decoding process of FIG. 21. More specifically, the decoder 20 performs the decoding process with a throughput higher than the throughput in the decoding program C and a latency lower than the latency in the decoding program A.

In a system that processes high-resolution image data, the encoding process and the decoding process need to be performed on a large amount of image data at a high speed (at a high throughput). If the encoding process and the decoding process are performed using a single sub CPU core 442 in order to increase throughput, the capacity of the LS 451 becomes insufficient and latency increases. In such a system, the encoding selection controller 502 and the decoding selection controller 503 allocate the hardware resource in an appropriate manner so that the encoder 10 and the decoder 20 perform the processes thereof in a manner such that an increase in latency due to the generation of buffer overflow is controlled and that throughput is increased.

The allocation pattern of the hardware resource is appropriately selected in accordance with the type of an input image signal, parameters of the encoding process and the decoding process (such as required latency and throughput), and usable hardware resource. The encoding process and the decoding process are thus performed efficiently under a variety of conditions. The encoding program and the decoding program are prepared in which the hardware resource allocation patterns are set (limited) so that the encoding process and the decoding process are respectively efficiently performed.

In the above discussion, the encoding program 546 performing the hardware resource allocation performs the wavelet transform by precinct. Alternatively, the encoding program 546 may perform the wavelet transform by picture. Alternatively, the wavelet transform may be performed by tile. The tile is a portion that is obtained by dividing the entire picture by predetermined numbers in a vertical direction and a horizontal direction. The encoder 10 in such a case has the structure illustrated in FIG. 26 in which the coefficient rearrangement is performed by the decoder 20. More specifically, the hardware resource allocation pattern in this case is the arrangement in which the coefficient rearrangement is performed in the decoder 20.

The decoding program 547 decodes the encoded data 542 in accordance with a decoding method corresponding to the encoding method of the encoded data 542. If the encoded data 542 is wavelet transformed by picture, the decoding program 547 decoding the encoded data 542 also inverse wavelet transforms the encoded data 542 by picture. If the encoded data 542 is wavelet transformed by tile, the decoding program 547 decoding the encoded data 542 also inverse wavelet transforms the encoded data 542 by tile. The tile is a portion obtained by dividing the entire picture by predetermined numbers in a vertical direction and a horizontal direction.

Furthermore, the encoding method of the encoding program 546 and the decoding method of the decoding program 547 may be the ones in compliance with moving picture experts group (MPEG) 2 standard or H.246/AVC (advanced video coding) standard.

Figure 38:
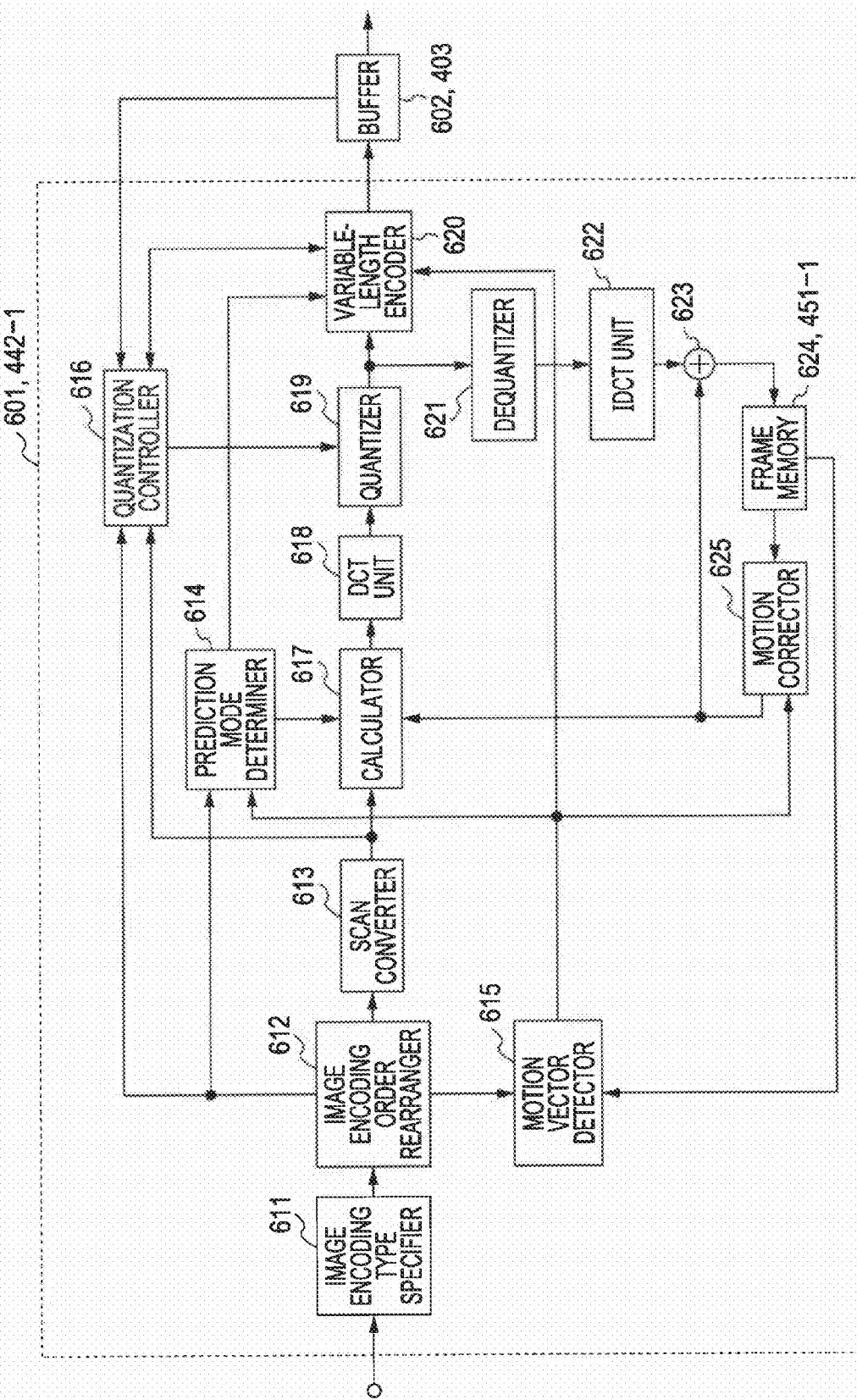
FIG. 38 is a block diagram illustrating another encoder in accordance with one embodiment of the present invention.

FIG. 38 illustrates a process of a software encoder executed by a CPU of a predetermined information processing apparatus. The software encoder constructed of a software program in compliance with the MPEG2 standard generates encoded data by encoding the image data. As shown in FIG. 38, the software encoder includes an encoder 601 encoding the image data in accordance with the MPEG2 standard, and a buffer 602 temporarily storing the encoded data output from the encoder 601.

The encoder 601 includes an image encoding type specifier 611, an image encoding order rearranger 612, a scan converter 613, a prediction mode determiner 614, a motion vector detector 615, a quantization controller 616, a calculator 617, a discrete cosine transform (DCT) unit 618, a quantizer 619, a variable-length encoder 620, a dequantizer 621, an inverse discrete cosine transform (IDCT) unit 622, a summing unit 623, a frame memory 624 and a motion corrector 625.

The video signal input to the encoder 601 is supplied to the image encoding type specifier 611. The image encoding type specifier 611 specifies, for each frame of the input image data, one of picture types of I picture, P picture and B picture, and sends the specified picture type to the image encoding order rearranger 612. The encoder 601 handles fifteen frames as 1 group of picture (GOP).

The image encoding order rearranger 612 rearranges the frames in order in accordance with the specified image encoding type and sends the order rearranged frames to the scan converter 613. The image encoding order rearranger 612 also sends information regarding the image encoding type of the image data to each of the prediction mode determiner 614, the motion vector detector 615 and the quantization controller 616. In order to detect a motion vector of a frame currently being encoded, the image encoding order rearranger 612 sends to the motion vector detector 615 a current image, a past image taken prior to the current image (hereinafter referred to as a past reference image) and a future image taken subsequent to the current image (hereinafter referred to as a future reference image).

The scan converter 613 converts the image data into a block format image by frame and divides the resulting one frame image into N slices, each slice composed of sixteen lines. Each slice is divided into M macro blocks, each macro block represented by a luminance signal for 16×16 pixels. Each macro block is sent to each of the quantization controller 616 and the calculator 617.

The motion vector detector 615 manages the image data of each frame as the I picture, the P picture, and the B picture in accordance with the image encoding type in synchronization with each of the image data. More specifically, the image data of the frame processed as the I picture is stored onto a past reference image memory (not shown) storing the past reference image in the motion vector detector 615. The image data of the frame processed as the B picture is stored onto a current image memory (not shown) storing the current image in the motion vector detector 615. The image of the frame processed as the P picture is stored onto a future reference memory (not shown) storing the future reference image in the motion vector detector 615.

At a next timing the frame to be processed as one of the B picture and the P picture is input to the motion vector detector 615, the image data of the first P picture heretofore stored on the future reference image memory is stored onto the past reference image memory. The image data of a next B picture is stored onto the current image memory, and the image data of a next P picture is stored onto the future reference image memory. This operation is successively repeated.

The motion vector detector 615 sends a motion vector in forward prediction and an estimated residual error of the motion vector to the prediction mode determiner 614. In the case of the B picture, the motion vector detector 615 sends a motion vector in backward prediction and an estimated residual error of the motion vector to the prediction mode determiner 614. The prediction mode determiner 614 determines which prediction mode to select from among an intra mode, a forward prediction mode, a backward prediction mode, and a bi-directional prediction mode.

The intra mode causes the image data of a frame to be encoded to be directly transferred as transfer data. The forward prediction mode causes a predictive residual error from the past reference image and a forward motion vector to be transferred. The backward prediction mode causes a predictive residual error from the future reference image and a backward motion vector to be transferred. The bi-directional prediction mode causes a predictive residual error from a mean value of the two images, i.e., the past reference image and the future reference image, and the forward motion vector and the backward motion vector to be transferred. In the case of the B picture, the four prediction modes are switched by micro block.

The prediction mode determiner 614 selects the intra mode in the case of the I picture in accordance with the image encoding type sent from the image encoding order rearranger 612. In the case of the P picture, the prediction mode determiner 614 selects one of the intra mode, and the forward prediction mode. In the case of the B picture, the prediction mode determiner 614 selects one of intra mode, the forward prediction mode, the backward prediction mode, and the bi-directional prediction mode. The prediction mode determiner 614 sends information regarding the selected prediction mode to the calculator 617.

In accordance with the prediction mode, the calculator 617 performs calculation for the intra, the forward prediction, the backward prediction, and the bidirectional prediction on the macro block read from the scan converter 613. When the image data (macro block) to be processed as the I picture is input, the calculator 617 intra-encoded the image data and then sends the encoded image data to the DCT unit 618. The DCT unit 618 converts the intra-encoded image data into a DCT coefficient and sends the DCT coefficient to the quantizer 619.

The quantizer 619 quantizes the DCT coefficient in quantization steps specified by the quantization controller 616 and sends the quantized DCT coefficient to each of the variable-length encoder 620 and the dequantizer 621. The variable-length encoder 620 converts into a variable-length code such as a Huffman code the quantized image data, the prediction mode sent from the prediction mode determiner 614, and the motion vector sent from the motion vector detector 615. The variable-length encoder 620 then outputs the variable-length code as encoding data to the buffer 602.

The dequantizer 621 dequantizes the quantized image data in quantization steps used at the quantization operation and sends the resulting dequantized image data to the IDCT (inverse DCT) unit 622. The IDCT unit 622 inverse DCT processes the output from the dequantizer 621. The output from the IDCT unit 622 is stored onto the past reference image memory (not shown) storing the past reference image in the frame memory 624 via the summing unit 623.

The calculator 617 then receives from the scan converter 613 the image data to be processed as the P picture. If the prediction mode sent from the prediction mode determiner 614 is the intra mode, the calculator 617 intra encodes the image data in a way similar to the I picture and outputs the intra-encoded image data to the buffer 602 via the DCT unit 618, the quantizer 619, and the variable-length encoder 620. The intra-encoded image data is stored onto the past reference image memory (not shown) storing the past reference image in the frame memory 624 via the dequantizer 621, the IDCT unit 622, and the summing unit 623.

If the prediction mode is the forward prediction mode, the image data stored on the past reference image memory in the frame memory 624 (the image data of the I picture in this case) is read and sent to the motion corrector 625. The motion corrector 625 motion corrects the image data in accordance with the forward motion vector sent from the motion vector detector 615.

More specifically, in the case of the forward prediction mode, the motion corrector 625 shifts a read address in the past reference image memory in the frame memory 624 by an extent corresponding to the forward motion vector from a position corresponding to the macro block currently output by the motion vector detector 615 and reads data from the shifted read address. The motion corrector 625 thus generates a predictive reference image and sends the generated predictive reference image to the calculator 617 and the summing unit 623.

The calculator 617 subtracts the image data of the predictive reference image corresponding to the macro block sent from the motion corrector 625 from the data of the macro block of the reference image output from the scan converter 613. The calculator 617 thus obtains difference data as a predictive residual error and sends the difference data to the DCT unit 618. The difference data is output to the buffer 602 via the DCT unit 618, the quantizer 619, and the variable-length encoder 620. The difference data is also partially decoded by the dequantizer 621 and the IDCT unit 622 and then output to the summing unit 623.

The summing unit 623 sums the difference data output from the IDCT unit 622 and the image data of the predictive reference image output from the motion corrector 625. The partially decoded image data of the P picture thus results. The image data of the P picture is stored onto the future reference image memory storing the future reference image in the frame memory 624.

The calculator 617 then receives from the scan converter 613 the image data to be processed as the B picture. If the prediction mode sent from the prediction mode determiner 614 is one of the intra mode and the forward prediction mode, the image data of that frame is processed in the same way as the above-described P picture. If the prediction mode is the backward prediction mode, the image data stored on the future reference image memory of the frame memory 624 (the image data of the P picture in this case) is read and sent to the motion corrector 625. The motion corrector 625 motion corrects the image data in accordance with the backward motion vector sent from the motion vector detector 615.

More specifically, in the case of the backward prediction mode, the motion corrector 625 shifts a read address in the future reference image memory in the frame memory 624 by an extent corresponding to the motion vector from a position corresponding to the macro block currently output by the motion vector detector 615 and reads data from the shifted read address. The motion corrector 625 thus generates a predictive reference image and sends the generated predictive reference image to the calculator 617 and the summing unit 623.

The calculator 617 subtracts the image data of the predictive reference image corresponding to the macro block sent from the motion corrector 625 from the data of the macro block of the reference image output from the scan converter 613. The calculator 617 thus obtains difference data as a predictive residual error and sends the difference data to the DCT unit 618. The difference data is output to the buffer 602 via the DCT unit 618, the quantizer 619, and the variable-length encoder 620. The difference data is also partially decoded by the dequantizer 621 and the IDCT unit 622 and then output to the summing unit 623. The summing unit 623 sums the difference data output from the IDCT unit 622 and the image data of the predictive reference image output from the motion corrector 625. The partially decoded image data of the P picture thus results.

In the case of the bi-directional prediction mode, the image data stored on the past reference image memory of the frame memory 624 (the image data of the I picture in this case) and the image data stored on the future reference image memory of the frame memory 624 (the image data of the P picture in this case) are read and supplied to the motion corrector 625. The motion corrector 625 motion corrects the image data in accordance with the forward motion vector and the backward motion vector, output from the motion vector detector 615.

More specifically, in the bi-directional prediction mode, the motion corrector 625 shifts read addresses in the past reference image memory and the future reference image memory of the frame memory 624 by an extent corresponding to the forward motion vector and the backward motion vector from a position corresponding to the macro block currently output by the motion vector detector 615 and reads data from the shifted read addresses. The motion corrector 625 thus generates a predictive reference image and sends the generated predictive reference image to the calculator 617 and the summing unit 623.

The calculator 617 subtracts the mean value of the image data of the predictive reference image corresponding to the macro block sent from the motion corrector 625 from the data of the macro block of the reference image output from the scan converter 613. The calculator 617 thus obtains difference data as a predictive residual error and sends the difference data to the DCT unit 618. The difference data is output to the buffer 602 via the DCT unit 618, the quantizer 619, and the variable-length encoder 620. The difference data is also partially decoded by the dequantizer 621 and the IDCT unit 622 and then output to the summing unit 623.

The summing unit 623 sums the difference data output from the IDCT unit 622 and the image data of the predictive reference image output from the motion corrector 625. The partially decoded image data of the B picture thus results. The B picture is not used as a predictive image of another image and is not stored onto the frame memory 624.

The quantization controller 616 calculates quantization steps the quantizer 619 uses in quantization of the macro block in accordance with a predetermined quantization control algorithm and supplies the quantization step to the quantizer 619.

The quantization controller 616 receives information relating to an amount of data (code amount) of the encoded data stored on the buffer 602. In response to the code amount, the quantization controller 616 calculates the quantization step and a code amount assigned to each frame. The quantization controller 616 supplies the information regarding the quantization step to the quantizer 619 and the information regarding the assigned code amount to the variable-length encoder 620.

An allocation method of allocating a hardware resource to each process of the software encoder in an information processing system 300 of FIG. 28 is described. The process herein refers to the one to be executed by each element of FIG. 38. For example, the sub CPU core 442-1 is allocated to the entire encoder 601, the LS 451-1 serves as a memory in the encoder 601, such as the frame memory 624, and the XDR-RAM 403 serves as the buffer 602. In such a case, all processes of the encoder 601 are performed by the single sub CPU core 442. During the encoding process, data is stored on the LS 451 as a local memory of the sub CPU core 442 and encoding results are stored on the XDR-RAM 403. Each of the sub CPU cores 442-1 through 442-8 may be allocated to a predetermined processing unit such as 1 GOP in the software encoder. The encoding processes may be performed on the sub CPU cores 442 in parallel.

In the MPEG2 encoder of FIG. 38, the workload in the process of the motion corrector 625 and the motion vector detector 615 is typically heavier than the workload in the process of other elements. A plurality of sub CPU cores 442 may thus be allocated to all processes of the encoder 601 as shown in FIG. 39.

Figure 39:
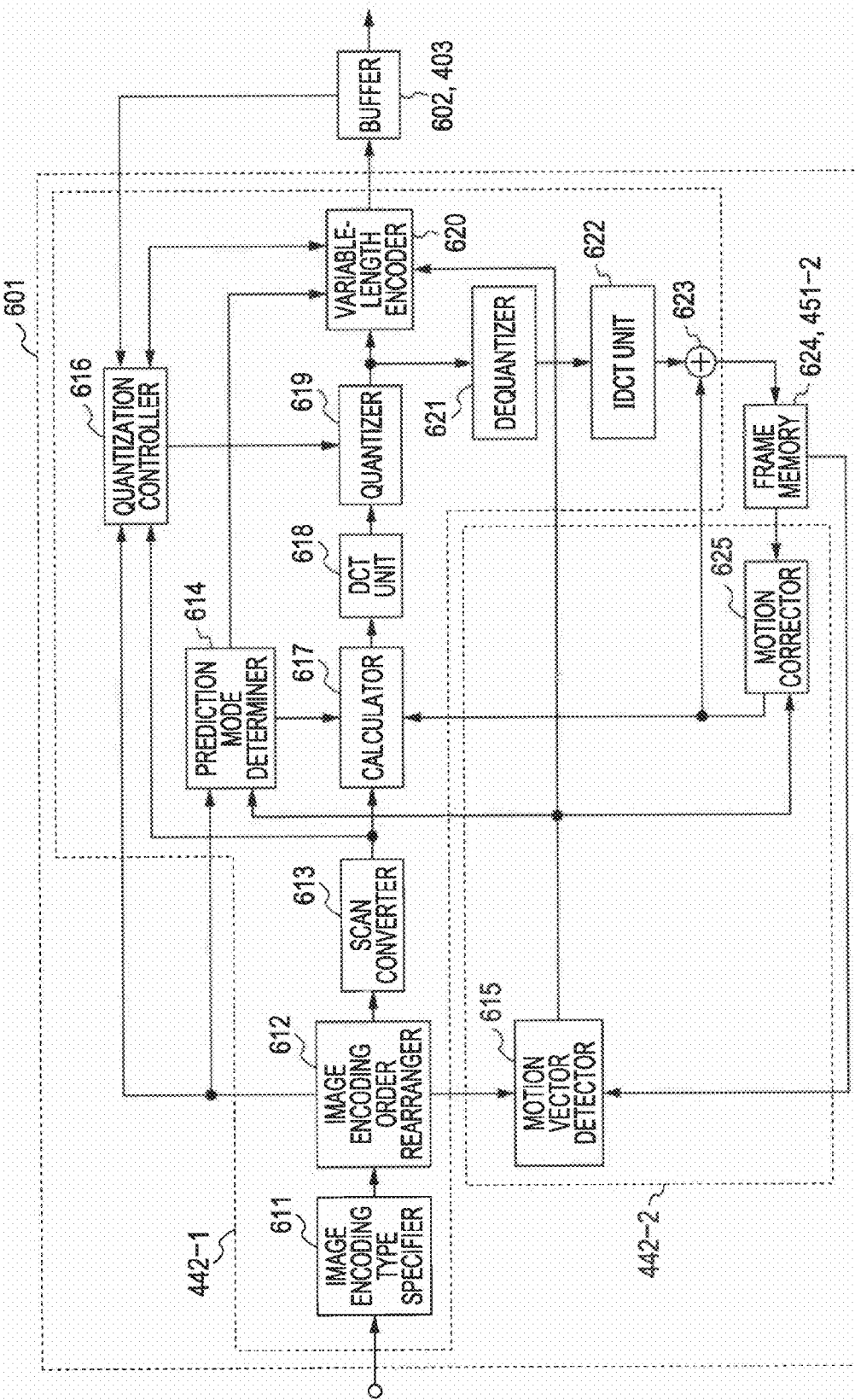
FIG. 39 is a block diagram illustrating yet another encoder in accordance with one embodiment of the present invention.

As shown in FIG. 39, the sub CPU core 442-1 is allocated to the image encoding type specifier 611, the image encoding order rearranger 612, the scan converter 613, the prediction mode determiner 614, the quantization controller 616, the calculator 617, the DCT unit 618, the quantizer 619, the variable-length encoder 620, the dequantizer 621, the IDCT unit 622, and the summing unit 623 in the encoder 601. The sub CPU core 442-2 is allocated to the motion vector detector 615 and the motion corrector 625. The LS 451-2 serves as the frame memory 624 and the XDR-RAM 403 serves as the buffer 602.

Another allocation method may be used. For example, as shown in FIG. 39, a plurality of sub CPU cores 442 may be allocated to the process of the encoder 601. The process having the single sub CPU core 442 allocated thereto may have any structure. An allocation method different from the one illustrated in FIG. 39 may be used. Three or more sub CPU cores 442 may be allocated to the process of the encoder 601. For example, different sub CPU cores 442 may be allocated to processes of the encoder 601.

If the encoding program 546 is a software program of the software encoder complying with MPEG2, a plurality of hardware resource allocation patterns may be prepared. As discussed with reference to FIG. 30, a plurality of encoding programs 546 different in hardware resource allocation patterns may be prepared. As discussed with reference to FIG. 30, the encoding selection controller 502 selects one from among the plurality of encoding programs 546 in accordance with the image parameter 543, the encoding parameter 544 and the resource information. In this case, the intermediate calculation buffer usage amount calculator 515 and the coefficient rearranging buffer usage amount calculator 516 can be omitted.

The flow of the encoding selection control process of the encoding selection controller 502 is described below with reference to a flowchart of FIG. 40. The encoding selection control process is repeated every predetermined process unit, for example, every GOP.

When the encoding selection control process starts, the image parameter acquisition unit 511 in the encoding selection controller 502 acquires the image parameter 543 in step S301. In step S302, the encoding parameter acquisition unit 512 acquires the encoding parameter 544. In step S303, the resource information acquisition unit 513 acquires the resource information. In step S304, the encoding program selector 517 selects a usage encoding program from the encoding programs 546, based on the image parameter 543 acquired in step S301, the encoding parameter 544 acquired in step S302, and the resource information acquired in step S303. In step S305, the program executor 518 executes the usage encoding program selected in step S304. When the usage encoding program is executed, the encoding selection control process ends.

In an actual software program, each process of the MPEG2 encoder 601 illustrated in FIGS. 38 and 39 is constructed of a plurality of functions. It is possible to switch sub CPU cores 442 allocated to the functions within the process. However, if the processes cannot be performed in parallel, the use of different CPUs 101 does not serve to reduce process time but leads to an inefficient operation.

Computers in the related art automatically allocating CPUs to processes, naturally perform allocation with reference to workload status. Such computers do not necessarily allocate the sub CPU core 442 as described above and can perform the encoding process at a substantially reduced efficiency. An encoding program for setting a hardware resource allocation pattern performing the encoding process efficiently is prepared even in the MPEG2 encoder 601. A drop in the efficiency of the encoding process is thus prevented. A plurality of encoding programs different in allocation patterns are prepared. The encoding selection controller 502 selects one from among the encoding programs so that the encoding process is efficiently performed under a variety of conditions.

The hardware resource may be allocated in a plurality of allocation patterns to the decoding program that implements an MPEG2 decoder, corresponding to the encoder 601 of FIG. 38, in an allocation configuration (not shown). In the same manner as shown in FIG. 30, the decoding selection controller 503 selects a usage decoding program from a plurality of decoding programs 547 different in allocation patterns of the hardware resource to the process of the decoding process and executes the selected usage decoding program.

In a manner similar to the encoding process, a decoding program for setting a hardware resource allocation pattern performing the decoding process efficiently is prepared. A plurality of such decoding programs different in the allocation patterns are prepared. The decoding process is efficiently performed under a variety of conditions.

The hardware resource allocation pattern is selected based on the type of the input image signal, parameters of the encoding process and the decoding process (required latency and throughput), and usable hardware resource. The encoding process and the decoding process are performed efficiently under a variety of conditions.

Figure 41:
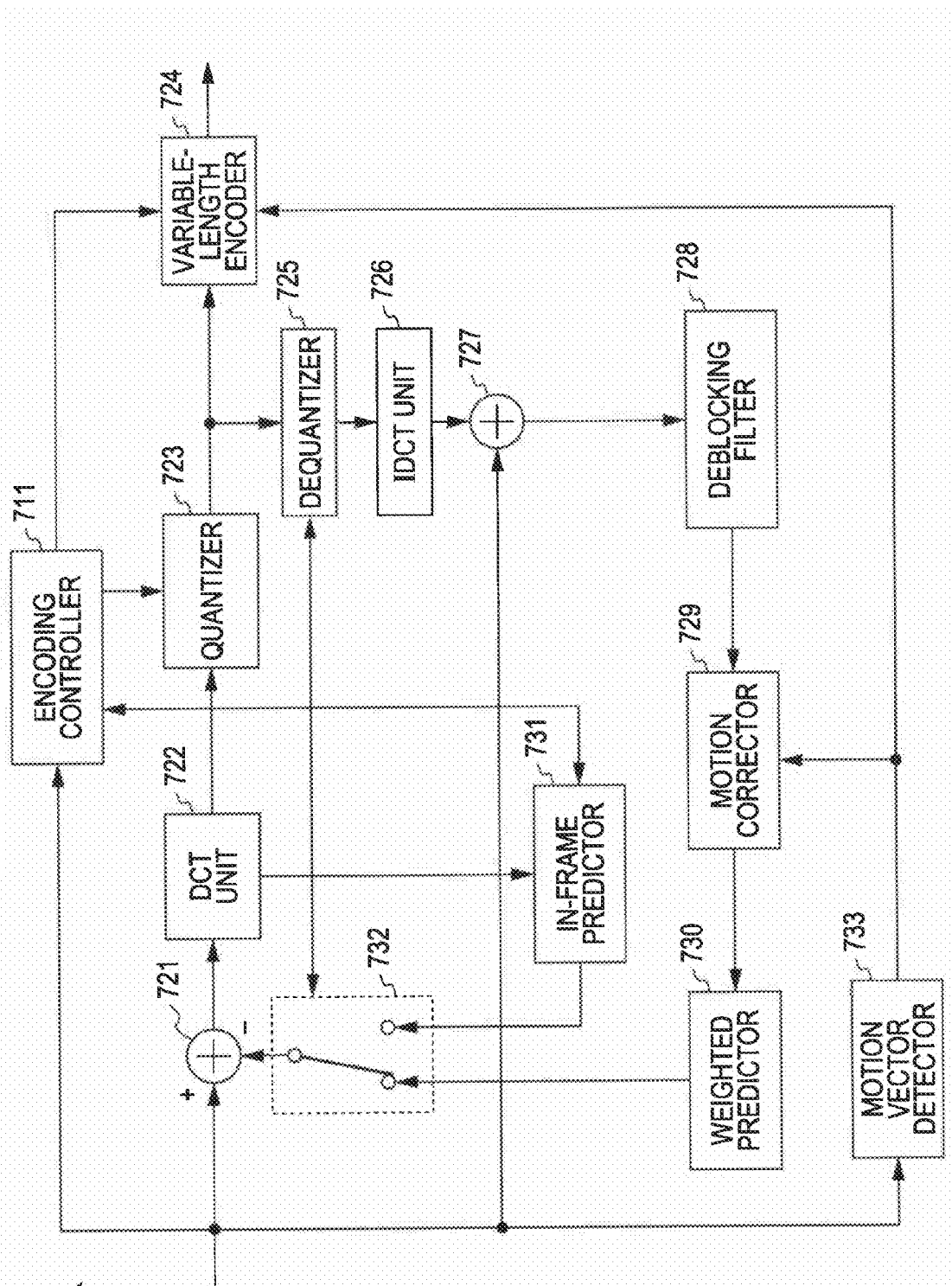
FIG. 41 is a block diagram illustrating still another encoder in accordance with one embodiment of the present invention.

FIG. 41 diagrammatically illustrates a process of an encoder executed by the CPU in a predetermined information processing apparatus. The software encoder composed of a software program in compliance with H.264/AVC standard generates encoded data by encoding the image data. As shown in FIG. 41, the software encoder includes an encoder 700 that encodes the image data in accordance with H.264/AVC method.

The encoder 700 includes an encoding controller 711, a subtractor 721, a DCT unit 722, a quantizer 723, a variable-length encoder 724, an dequantizer 725, an IDCT unit 726, a summing unit 727, a deblocking filter 728, a motion corrector 729, a weighted predictor 730, an in-frame predictor 731, a selector 732, and a motion vector detector 733.

The encoding controller 711 calculates an quantization step size and an assigned code amount of each picture based on the input image data. The encoding controller 711 thus supplies information regarding the quantization step size to the quantizer 723 and information regarding the assigned code amount to the variable-length encoder 724. The encoding controller 711 selects a predictive direction of an in-frame prediction on a per block basis, with each block being a predetermined pixel group and supplies information regarding the predictive direction to the in-frame predictor 731.

The subtractor 721 subtracts the prediction results supplied from the selector 732 from the input image data, and supplies subtraction results to the DCT unit 722. The DCT unit 722 DCT converts the subtraction results supplied from the subtractor 721 and supplies a resulting coefficient to each of the quantizer 723 and the in-frame predictor 731. The quantizer 723 quantizes the output of the DCT unit 722 according to quantization step size and supplies quantization results to each of the variable-length encoder 724 and the dequantizer 725. The variable-length encoder 724 encodes the quantization coefficient supplied from the quantizer 723 in accordance with the assigned code amount supplied from the encoding controller 711 and the motion vector supplied from the motion vector detector 733. The variable-length encoder 724 outputs encoded data.

The dequantizer 725 dequantizes the quantization results in a method corresponding to the quantization of the quantizer 723 and supplies dequantization results to the IDCT unit 726. The IDCT unit 726 inverse DCT transforms the output of the dequantizer 725 and supplies transform results to the summing unit 727. The summing unit 727 sums the IDCT results and the input image data and supplies resulting image data to the deblocking filter 728. The deblocking filter 728 adaptively removes blocking distortion from the output of the summing unit 727 using a filter for reducing blocking distortion caused in the encoding of the image. The deblocking filter 728 supplies filtering results to the motion corrector 729.

The motion corrector 729 uses a plurality of pictures as reference pictures and selects an appropriate picture based on the motion vector supplied from the motion vector detector 733, and corrects motion to the output of the deblocking filter 728. The motion corrector 729 supplies motion correction information to the weighted predictor 730. The weighted predictor 730 multiplies the motion correction information from the motion corrector 729 by a predetermined weight coefficient and adds a predetermined coefficient to multiplication results, thereby generating weighted offset interpolation information. The motion corrector 729 then supplies the weighted offset interpolation information to the selector 732.

The in-frame predictor 731 performs, on the DCT results supplied from the DCT unit 722, in-frame prediction in a predictive direction supplied from the encoding controller 711 and supplies prediction results to the selector 732. Depending on whether control mode is the intra mode, the selector 732 selects between the weighted offset interpolation information supplied from the weighted predictor 730 and the prediction results supplied from the in-frame predictor 731 and supplies the selected results to the subtractor 721.

The motion vector detector 733 detects the motion vector between pictures in response to the input image data and supplies information regarding the motion vector to each of the motion corrector 729 and the variable-length encoder 724.

The method of allocating the hardware resource to the software encoder in the information processing system 300 of FIG. 28 is described below. For example, the sub CPU core 442-1 may be allocated to the entire encoder 700. More specifically, all processes of the encoder 700 are performed by the single sub CPU core 442. During the encoding process, data is stored on the LS 451 as the local memory of the sub CPU core 442 and encoding process results are stored on the XDR-RAM 403 as the shared memory. In this case, the sub CPU cores 442-1 through 442-8 may be allocated to predetermined process units, such as GOPs. The encoding processes of the sub CPU cores 442 may be performed in parallel.

In the H.264/AVC encoder of FIG. 41, the workload of the motion corrector 729 and the motion vector detector 733 is typically heavier than the workload in the process of other elements. A plurality of sub CPU cores 442 may thus be allocated to all processes of the encoder 700 as shown in FIG. 42.

Figure 42:
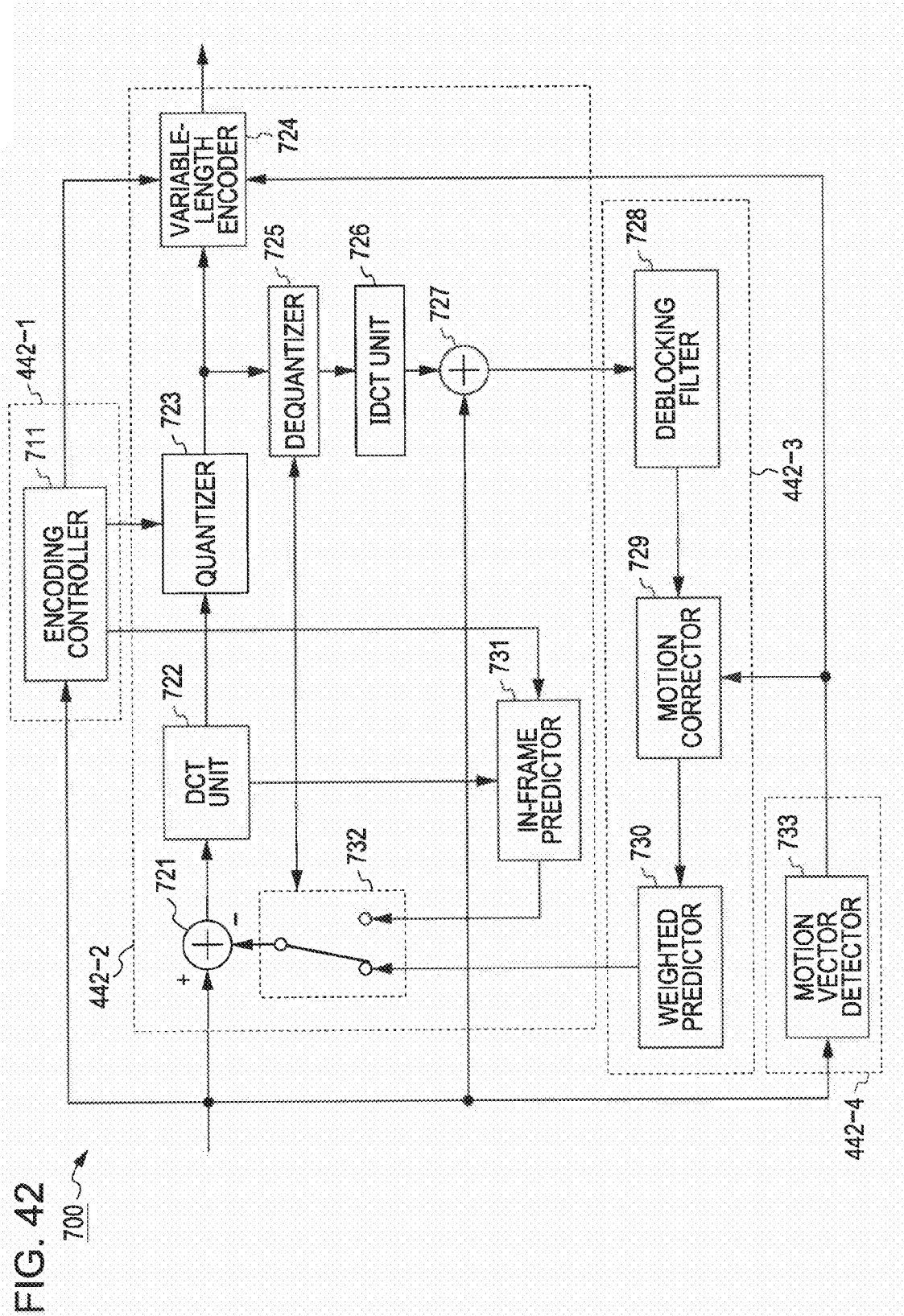
FIG. 42 is a block diagram illustrating still another encoder in accordance with one embodiment of the present invention.

In the encoder 700 as shown in FIG. 42, the sub CPU core 442-1 is allocated to the encoding controller 711, and the sub CPU core 442-2 is allocated to the subtractor 721, the DCT unit 722, the quantizer 723, the variable-length encoder 724, the dequantizer 725, the IDCT unit 726, the summing unit 727, the in-frame predictor 731, and the selector 732. The sub CPU core 442-3 is allocated to the deblocking filter 728, the motion corrector 729, and the weighted predictor 730, and the sub CPU core 442-4 is allocated to the motion vector detector 733.

Another allocation method may be used. For example, as shown in FIG. 42, a plurality of sub CPU cores 442 may be allocated to the process of the encoder 700. The process having the single sub CPU core 442 allocated thereto may have any structure. An allocation method different from the one illustrated in FIG. 42 may be used. Five or more sub CPU cores 442 may be allocated to the process of the encoder 700. For example, different sub CPU cores 442 may be allocated to processes of the encoder 700.

If the encoding program 546 is a software program of the software encoder complying with H.264/AVC, a plurality of hardware resource allocation patterns may be prepared. As discussed with reference to FIG. 30, a plurality of encoding programs 546 different in hardware resource allocation patterns may be prepared. As discussed with reference to FIG. 30, the encoding selection controller 502 selects one from among the plurality of encoding programs 546 in accordance with the image parameter 543, the encoding parameter 544 and the resource information. In this case, the intermediate calculation buffer usage amount calculator 515 and the coefficient rearranging buffer usage amount calculator 516 can be omitted. The flow of the encoding selection control process in that case is identical the MPEG2 encoding program described with reference to FIG. 40 and the discussion thereof is omitted here.

Figure 40:
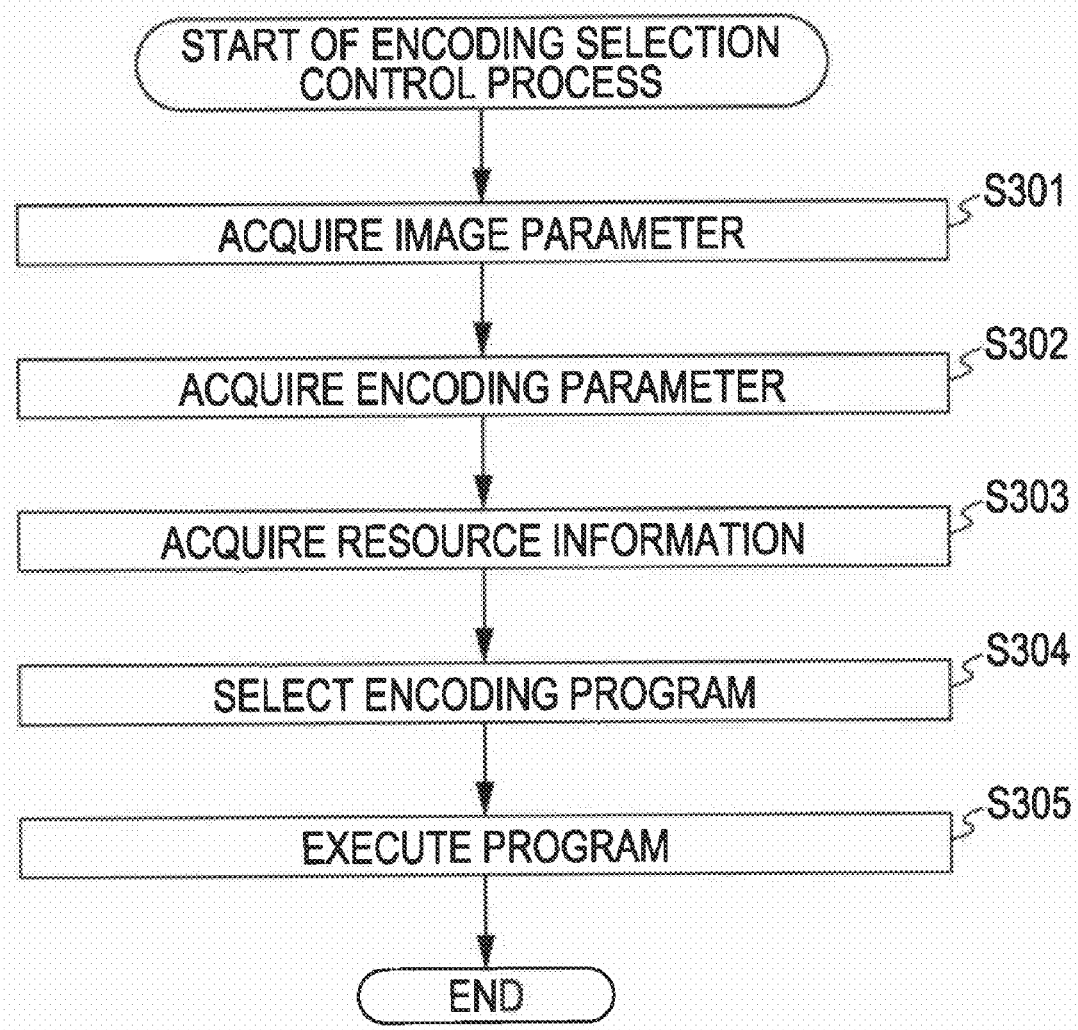
FIG. 40 is a flowchart illustrating an encoding selection control process.

In an actual software program, each process of the MPEG2 encoder 601 illustrated in FIGS. 40 and 41 is constructed of a plurality of functions. It is possible to switch sub CPU cores 442 allocated to the functions within the process. However, if the processes cannot be performed in parallel, the use of different CPUs 101 does not serve to reduce process time but leads to an inefficient operation.

Computers in the related art automatically allocating CPUs to processes, naturally perform allocation with reference to workload status. Such computers do not necessarily allocate the sub CPU core 442 as described above and can perform the encoding process at a substantially reduced efficiency. An encoding program for setting a hardware resource allocation pattern performing the encoding process efficiently is prepared even in the H.264/AVC encoder 700. A drop in the efficiency of the encoding process is thus prevented. A plurality of encoding programs different in allocation patterns are prepared. The encoding selection controller 502 selects one from among the encoding programs so that the encoding process is efficiently performed under a variety of conditions.

The hardware resource may be allocated in a plurality of allocation patterns to the decoding program that implements a H.264/AVC decoder, corresponding to the encoder 700 of FIG. 41, in an allocation configuration (not shown). In the same manner as shown in FIG. 30, the decoding selection controller 503 selects a usage decoding program from a plurality of decoding programs 547 different in allocation patterns of the hardware resource to the process of the decoding process and executes the selected usage decoding program.

In a manner similar to the encoding process, a decoding program for setting a hardware resource allocation pattern performing the decoding process efficiently is prepared. A plurality of such decoding programs different in the allocation patterns are prepared. The decoding process is efficiently performed under a variety of conditions.

The hardware resource allocation pattern is selected based on the type of the input image signal, parameters of the encoding process and the decoding process (required latency and throughput), and usable hardware resource. The encoding process and the decoding process are performed efficiently under a variety of conditions.

The above-described method steps may be preformed using hardware or software.

As shown in FIG. 11, for example, the encoder 10 may include one CPU performing the process of each of the wavelet transformer 11, the coefficient rearranger 14, and the entropy encoder 15, and one memory including the intermediate calculation buffer 12, and the coefficient rearranging buffer 13.

As shown in FIG. 13, for example, the encoder 10 may include one CPU performing the process of each of the wavelet transformer 11, the coefficient rearranger 14, and the entropy encoder 15, a first memory, including the intermediate calculation buffer 12 and performing high-speed writing and writing operations, and a large-capacity second memory including the coefficient rearranging buffer 13.

As shown in FIG. 14, for example, the encoder 10 may include first and second CPUs, and first through third memories. The first CPU performs the process of each of the wavelet transformer 11-1, the coefficient rearranger 14-1, and the entropy encoder 15-1. The first memory, including the intermediate calculation buffer 12-1, performs high-speed writing and reading operations. The second CPU performs the process of each of the wavelet transformer 11-2, the coefficient rearranger 14-2, and the entropy encoder 15-2. The second memory, including the intermediate calculation buffer 12-2, performs high-speed writing and reading operations. The third memory, having a large memory capacity, includes the coefficient rearranging buffer 13-1, and the coefficient rearranging buffer 13-2.

As shown in FIG. 16, for example, the encoder 10 may include first through fourth CPUs and first through third memories. The first CPU performs the process of the wavelet transformer 11-1. The first memory, including the intermediate calculation buffer 12-1, performs high-speed writing and reading operations. The second CPU performs the process of each of the coefficient rearranger 14-1, and the entropy encoder 15-1. The third CPU performs the process of the wavelet transformer 11-2. The second memory, including the intermediate calculation buffer 12-2, performs high-speed writing and reading operations. The fourth CPU performs the process of each of the coefficient rearranger 14-2, and the entropy encoder 15-2. The third memory has a large memory capacity and includes the coefficient rearranging buffer 13-1, and the coefficient rearranging buffer 13-2.

As shown in FIG. 18, for example, the decoder 20 may include one CPU performing the process of each of the entropy decoder 21, and the inverse wavelet transformer 23, and one memory including the coefficient buffer 22.

As shown in FIG. 20, for example, the decoder 20 may include first and second CPUs, and first and second memories. The first CPU performs the process of each of the entropy decoder 21-1 and the inverse wavelet transformer 23-1. The first memory includes the coefficient buffer 22-1. The second CPU performs the process of each of the entropy decoder 21-2 and the inverse wavelet transformer 23-2. The second memory includes the coefficient buffer 22-2.

As shown in FIG. 22, for example, the decoder 20 may include first through fourth CPUs, and first and second memories. The first CPU performs the process of the entropy decoder 21-1. The second CPU performs the process of the inverse wavelet transformer 23-1. The first memory includes the coefficient buffer 22-1. The third CPU performs the process of the entropy decoder 21-2. The fourth CPU performs the process of the inverse wavelet transformer 23-2. The second memory includes the coefficient buffer 22-2.

If the encoder 10 and the decoder 20 are implemented using hardware, the same advantages of the above-described software programs also equally provided.

When a series of method steps are performed using software, a program forming the method steps may be installed from a program recording medium onto a computer contained in a dedicated hardware structure or onto a general-purpose computer that performs a variety of functions with a variety of programs installed thereon or onto an information processing apparatus in an information processing system including a plurality of apparatuses.

The recording medium may be one of the removable medium 131 of FIG. 10 and the removable medium 311 of FIG. 28, each storing the and program and distributed separately from the host apparatus to supply the user with the program. Each of the removable medium 131 and the removable medium 311 may include one of a magnetic disk (including a flexible disk), an optical disk (compact-disk read-only memory (CD-ROM), digital versatile disk (DVD) or the like), a magneto-optical disk (Mini-Disk (MD)(Registered Trademark)), and a semiconductor memory. The recording medium may also be one of the ROM 102, a hard disk loaded onto one of the storage unit 123 and the storage device 303, and the HDD 405, each storing the program and supplied in the host apparatus to the user.

The above-described method steps describing the program recorded on the recording medium may be performed in the time-series sequence described above. Also, the above-described method steps may be performed in parallel or separately.

The word system refers to an entire apparatus composed a plurality of devices.

The apparatus described as a single unit may be divided into a plurality of apparatuses. Apparatuses described a plurality of units may be integrated into a single unit. Another arrangement may be attached to the structure of the above-described apparatus. If the structure and operation of the system remain unchanged, part of one apparatus may be integrated into another apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for encoding image data, comprising:
    filtering means for performing a filtering operation on the image data in a layer fashion to generate a plurality of subbands including coefficient data segmented on a per frequency band basis;
    intermediate data storage means for storing intermediate data generated in a middle of the filtering operation of the filtering means;
    coefficient storage means for storing the coefficient data generated in the filtering operation of the filtering means;
    coefficient rearranging means for performing a rearranging operation to rearrange the coefficient data stored on the coefficient storage means so that the coefficient data is output in a predetermined order; and
    control means for controlling an allocation of the coefficient storage means among a cache memory and an external memory external to the cache memory, based on a segmentation level, a size of the image data, and a usage amount of the cache memory, the cache memory writing and reading data thereon at a speed higher than the external memory and being smaller in a storage capacity than the external memory.

2. The information processing apparatus according to claim 1, wherein the filtering means performs the filtering operation on the image data on a per lineblock basis, each lineblock including the image data of the number of lines used to generate the coefficient data of one line of a subband of at least a lowest frequency component, the intermediate data storage means stores the intermediate data on a per lineblock basis, and the coefficient storage means stores the coefficient data on a per lineblock basis.

3. The information processing apparatus according to claim 2, wherein the coefficient rearranging means rearranges the coefficient data in the order in accordance with which the coefficient data of a plurality of subbands segmented in frequency on a per lineblock basis is synthesized to generate the image data.

4. The information processing apparatus according to claim 3, wherein the coefficient rearranging means rearranges the coefficient data on a per lineblock basis in the order from a low-frequency component to a high-frequency component.

5. The information processing apparatus according to claim 2, further comprising:
    control means, the control means controlling the filtering operation of the filtering means, the rearranging operation of the coefficient rearranging means and an encoding operation to perform the filtering operation, the rearranging operation and the encoding operation in parallel.

6. The information processing apparatus according to claim 5, wherein the control means controls processing a luminance component of the image data and processing a color difference component of the image data so that the luminance component and the color difference component are processed in parallel.

7. The information processing apparatus according to claim 1, further comprising:
    encoding means for encoding the coefficient data rearranged in order by the coefficient rearranging means.

8. The information processing apparatus according to claim 1, further comprising:
    control means for controlling the filtering operation of the filtering means and the rearranging operation of the coefficient rearranging means to perform successively the filtering operation and the rearranging operation.

9. The information processing apparatus according to claim 8, wherein the control means controls processing a luminance component of the image data and processing a color difference component of the image data so that the luminance component and the color difference component are processed in parallel.

10. An information processing method for encoding image data, comprising:
    performing a filtering operation on the image data in a layer fashion to generate a plurality of subbands including coefficient data segmented on a per frequency band basis;
    storing intermediate data generated in a middle of the filtering operation;
    storing the coefficient data generated in the filtering operation; and
    rearranging the stored coefficient data in order so that the coefficient data is output in a predetermined order, wherein
    the storing the coefficient data is allocated among a cache memory and an external memory external to the cache memory, based on a segmentation level, a size of the image data, and a usage amount of the cache memory, the cache memory writing and reading data at a speed higher than the external memory and defined by a storage capacity smaller than the external memory.

11. An information processing apparatus for encoding image data, comprising:
    a filter unit configured to perform a filtering operation on the image data in a layer fashion to generate a plurality of subbands including coefficient data segmented on a per frequency band basis;
    an intermediate data storage unit that stores intermediate data generated in a middle of the filtering operation of the filter unit;
    a coefficient storage unit that stores the coefficient data generated in the filtering operation of the filter unit;
    a coefficient rearranging unit configured to perform a rearranging operation to rearrange the coefficient data stored on the coefficient storage unit so that the coefficient data is output in a predetermined order; and
    a control unit configured to control an allocation of the coefficient storage unit among a cache memory and an external memory external to the cache memory, based on a segmentation level, a size of the image data, and a usage amount of the cache memory, the cache memory writing and reading data thereon at a speed higher than the external memory and being smaller in a storage capacity than the external memory.

* * * * *